(12) United States Patent
Terashita et al.

(10) Patent No.: US 12,147,124 B2
(45) Date of Patent: Nov. 19, 2024

(54) LIQUID CRYSTAL DISPLAY DEVICE HAVING AN IMPROVED CONTRAST RATIO

(71) Applicant: Sharp Display Technology Corporation, Kameyama (JP)

(72) Inventors: Shinichi Terashita, Kameyama (JP); Kouichi Watanabe, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/378,841

(22) Filed: Oct. 11, 2023

(65) Prior Publication Data
US 2024/0168339 A1 May 23, 2024

(30) Foreign Application Priority Data
Nov. 21, 2022 (JP) .................................. 2022-185662

(51) Int. Cl.
*G02F 1/13363* (2006.01)
*G02F 1/1333* (2006.01)
(Continued)

(52) U.S. Cl.
CPC .... *G02F 1/133638* (2021.01); *G02F 1/13338* (2013.01); *G02F 1/133531* (2021.01);
(Continued)

(58) Field of Classification Search
CPC ......... G02F 1/133638; G02F 1/133531; G02F 1/133528; G02F 1/133553;
(Continued)

(56) References Cited

U.S. PATENT DOCUMENTS 6,341,002 B1 1/2002 Shimizu et al.
6,791,640 B1 * 9/2004 Okamoto .......... G02F 1/133528
349/119

(Continued)

FOREIGN PATENT DOCUMENTS

JP  2000-122094 A  4/2000
JP  3394926 B2  4/2003
(Continued)

*Primary Examiner* — Paisley L Wilson
(74) *Attorney, Agent, or Firm* — ScienBiziP, P.C.

(57) ABSTRACT

A liquid crystal display device includes a first substrate, a second substrate disposed on a viewer side relative to the first substrate, a liquid crystal layer provided between the first substrate and the second substrate, a polarizer disposed on the viewer side relative to the liquid crystal layer, and a phase difference layer disposed between the polarizer and the liquid crystal layer, and also includes a plurality of pixels arrayed in a matrix shape. The first substrate includes a reflective layer that reflects light, a first electrode and a second electrode that can generate a transverse electrical field in the liquid crystal layer, and a first horizontal alignment film in contact with the liquid crystal layer. The second substrate includes a second horizontal alignment film in contact with the liquid crystal layer. The liquid crystal layer takes a twist alignment when no voltage is applied.

23 Claims, 45 Drawing Sheets

(51) Int. Cl.
*G02F 1/1335* (2006.01)
*G02F 1/1337* (2006.01)
*G02F 1/1343* (2006.01)
*G02F 1/139* (2006.01)
*G02F 1/137* (2006.01)

(52) U.S. Cl.
CPC .. *G02F 1/133553* (2013.01); *G02F 1/133636* (2013.01); *G02F 1/133738* (2021.01); *G02F 1/134372* (2021.01); *G02F 1/13439* (2013.01); *G02F 1/1398* (2021.01); *G02F 1/133528* (2013.01); *G02F 1/13706* (2021.01); *G02F 1/13712* (2021.01); *G02F 2203/02* (2013.01); *G02F 2203/09* (2013.01); *G02F 2203/64* (2013.01)

(58) Field of Classification Search
CPC ............. G02F 1/134372; G02F 1/1398; G02F 1/1396; G02F 1/133738
See application file for complete search history.

(56) References Cited

U.S. PATENT DOCUMENTS

| | | |
|---|---|---|
| 7,106,400 B1 | 9/2006 | Tsuda et al. |
| 2012/0138922 A1 | 6/2012 | Yamazaki et al. |
| 2013/0214273 A1 | 8/2013 | Yamazaki et al. |
| 2013/0320334 A1 | 12/2013 | Yamazaki et al. |
| 2014/0183532 A1 | 7/2014 | Yamazaki et al. |
| 2014/0286076 A1 | 9/2014 | Aoki et al. |
| 2015/0179805 A1 | 6/2015 | Yamazaki et al. |
| 2016/0240694 A1 | 8/2016 | Yamazaki et al. |
| 2017/0033229 A1 | 2/2017 | Yamazaki et al. |
| 2017/0309751 A1 | 10/2017 | Yamazaki et al. |
| 2017/0309754 A1 | 10/2017 | Yamazaki et al. |
| 2018/0308989 A1 | 10/2018 | Yamazaki et al. |
| 2018/0348553 A1* | 12/2018 | Koide ................... G02F 1/1396 |
| 2021/0159345 A1 | 5/2021 | Yamazaki et al. |
| 2021/0200045 A1* | 7/2021 | Morinaga ............ G09G 3/3648 |

FOREIGN PATENT DOCUMENTS

| | | |
|---|---|---|
| JP | 2003-131268 A | 5/2003 |
| JP | 2012-134475 A | 7/2012 |
| JP | 2014007399 A | 1/2014 |
| JP | 2014-209727 A | 11/2014 |

\* cited by examiner

LIQUID CRYSTAL DISPLAY DEVICE HAVING AN IMPROVED CONTRAST RATIO

CROSS-REFERENCE TO RELATED APPLICATIONS

This application claims the benefit of priority to Japanese Patent Application Number 2022-185662 filed on Nov. 21, 2022. The entire contents of the above-identified application are hereby incorporated by reference.

BACKGROUND

Technical Field

The disclosure relates to a liquid crystal display device.

Liquid crystal display devices are roughly classified into transmissive liquid crystal display devices and reflective liquid crystal display devices. Transmissive liquid crystal display devices perform display in a transmission mode using light emitted from a backlight. Reflective liquid crystal display devices perform display in a reflection mode using ambient light. A liquid crystal display device has been proposed in which each pixel includes a reflective region for displaying in the reflection mode, and a transmissive region for displaying in the transmission mode. Such a liquid crystal display device is referred to as a transflective or a transmissive/reflective liquid crystal display device.

Reflective and transflective liquid crystal display devices are, for example, suitable for use as medium or small display devices for mobile applications used outside. An example of the reflective liquid crystal display device is disclosed in JP 2000-122094 A. An example of the transflective liquid crystal display device is disclosed in JP 2003-131268 A.

The liquid crystal display device used in a smartphone, a tablet, or the like has a touch sensor function. Various types, such as a resistive film type, an electrostatic capacitance type, and an optical type, are known as the types of the touch sensor.

A liquid crystal display device including a touch sensor (hereinafter referred to as a "touch screen") is roughly classified into a type in which a touch sensor is externally attached to a liquid crystal display device ("external type") and a type in which a touch sensor is built in a liquid crystal display device ("built-in type"). The built-in type touch screen is more advantageous for thickness and weight reduction, and the like than the external type touch screen, and has the advantage of increasing a transmittance of light.

The built-in type touch screen includes an "on-cell type" and an "in-cell type". In this case, the term "cell" refers to a display panel. The display panel includes an active matrix substrate (TFT substrate), a counter substrate disposed to face the TFT substrate, and a liquid crystal layer provided between the TFT substrate and the counter substrate. In the "in-cell type", a layer to impart a touch sensor function is disposed in the display panel. In the "on-cell type", a layer to impart a touch sensor function is disposed between the display panel and a polarizer provided at a viewer side of the display panel.

SUMMARY

In principle, the in-cell type makes it possible to achieve the thinnest and lightest touch screen. As described above, the liquid crystal display device capable of displaying in the reflection mode is suitable for outdoor use. Accordingly, an in-cell type touch screen capable of displaying in the reflection mode is desired but has not yet been achieved. The reason for this is as follows: one of a pair of electrodes (referred to as a "counter electrode" or "common electrode") for applying a voltage to a liquid crystal layer is provided to a counter substrate side in a liquid crystal display device capable of displaying in the reflection mode.

In a liquid crystal display device of a transverse electrical field mode such as a fringe field switching (FFS) mode, a pair of electrodes (a pixel electrode and a common electrode) for applying a voltage to a liquid crystal layer is provided only to a TFT substrate side. Accordingly, by employing the transverse electrical field mode, it is considered that an in-cell type touch screen capable of displaying in the reflection mode may be achieved.

However, the reflective liquid crystal display device of the transverse electrical field mode has a low reflectivity for the following reason and cannot be put to practical use. In the liquid crystal display device of the transverse electrical field mode, at least one of the pixel electrode and the common electrode is a comb-teeth electrode formed in a comb shape. Since the distribution of liquid crystal alignment occurs in a pixel due to non-uniformity of the electrical field caused by the comb shape, neither the maximum transmittance nor the maximum extraction efficiency of the reflected light can be obtained in the whole pixel, and the average transmittance and the reflection efficiency are lowered. The influence thereof is larger on the reflective type than on the transmissive type. In the reflective type, light enters a polarizer, passes through a phase difference plate and a liquid crystal layer, is reflected by a reflective layer, then passes through the liquid crystal layer and the phase difference plate again, and enters the polarizer. When black is displayed, because retardation $\Delta n \cdot d$ of the liquid crystal layer is set to a ¼-wavelength condition (i.e., 138 nm) in order to achieve a polarization conversion of transmitted light from linear polarization to circular polarization or from circular polarization to linear polarization between the polarizer and the reflective layer, a transmittance variation due to the non-uniformity of the electrical field (and the non-uniformity of the alignment associated therewith) is relatively large, whereby the decrease in the average transmittance also becomes large.

An embodiment of the present disclosure has been made in view of the problems described above, and an object of the disclosure is to improve the contrast ratio of a reflective or transflective liquid crystal display device configured to display in the transverse electrical field mode.

The present specification discloses a liquid crystal display device according to the following items.

Item 1

A liquid crystal display device, including:
 a first substrate;
 a second substrate disposed on a viewer side relative to the first substrate;
 a liquid crystal layer provided between the first substrate and the second substrate;
 a polarizer disposed on the viewer side relative to the liquid crystal layer; and
 a phase difference layer disposed between the polarizer and the liquid crystal layer, the liquid crystal display device further including a plurality of pixels arrayed in a matrix shape,
 in which the first substrate includes a reflective layer configured to reflect light, a first electrode and a second electrode capable of generating a transverse electrical field in the liquid crystal layer, and a first horizontal alignment film in contact with the liquid crystal layer, the second substrate includes a second horizontal alignment film in contact with the liquid crystal layer, and the liquid crystal layer takes a twist alignment when no voltage is applied.

Item 2

The liquid crystal display device according to item 1, in which the liquid crystal layer contains a liquid crystal material of positive-type.

Item 3

The liquid crystal display device according to item 2, in which a twist angle $\theta_1$ of the liquid crystal layer is in a range from 58.3° to 89.9° when no voltage is applied.

Item 4

The liquid crystal display device according to item 2, in which a twist angle $\theta_1$ of the liquid crystal layer is in a range from 64.0° to 84.3° when no voltage is applied.

Item 5

The liquid crystal display device according to item 2, in which a twist angle $\theta_1$ of the liquid crystal layer is in a range from 68.4° to 79.4° when no voltage is applied.

Item 6

The liquid crystal display device according to item 2, in which a twist angle $\theta_1$ of the liquid crystal layer is in a range from 71.4° to 76.6° when no voltage is applied.

Item 7

The liquid crystal display device according to any one of items 2 to 6, in which an angle $\theta_2$ formed by a light absorption axis of the polarizer with an orientation direction of a liquid crystal molecule defined by the first horizontal alignment film in a twist direction of the liquid crystal layer is in a range from 110.80 to 132.3°.

Item 8

The liquid crystal display device according to any one of items 2 to 6, in which an angle $\theta_2$ formed by a light absorption axis of the polarizer with an orientation direction of a liquid crystal molecule defined by the first horizontal alignment film in a twist direction of the liquid crystal layer is in a range from 114.4° to 129.3°.

Item 9

The liquid crystal display device according to any one of items 2 to 6, in which an angle $\theta_2$ formed by a light absorption axis of the polarizer with an orientation direction of a liquid crystal molecule defined by the first horizontal alignment film in a twist direction of the liquid crystal layer is in a range from 117.90 to 126.1°.

Item 10

The liquid crystal display device according to any one of items 2 to 6, in which an angle $\theta_2$ formed by a light absorption axis of the polarizer with an orientation direction of a liquid crystal molecule defined by the first horizontal alignment film in a twist direction of the liquid crystal layer is in a range from 120.10 to 124.2°.

Item 11

The liquid crystal display device according to any one of items 2 to 10, in which the phase difference layer includes a $\lambda/2$ plate, and an angle $\theta_3$ formed by a slow axis of the $\lambda/2$ plate with an orientation direction of a liquid crystal molecule defined by the first horizontal alignment film in the twist direction of the liquid crystal layer is in a range from 132.4° to 143.6°.

Item 12

The liquid crystal display device according to any one of items 2 to 10, in which the phase difference layer includes a $\lambda/2$ plate, and an angle $\theta_3$ formed by a slow axis of the $\lambda/2$ plate with an orientation direction of a liquid crystal molecule defined by the first horizontal alignment film in the twist direction of the liquid crystal layer is in a range from 134.0° to 141.4°.

Item 13

The liquid crystal display device according to any one of items 2 to 10, in which the phase difference layer includes a $\lambda/2$ plate, and an angle $\theta_3$ formed by a slow axis of the $\lambda/2$ plate with an orientation direction of a liquid crystal molecule defined by the first horizontal alignment film in the twist direction of the liquid crystal layer is in a range from 135.5° to 139.7°.

Item 14

The liquid crystal display device according to any one of items 2 to 10, in which the phase difference layer includes a $\lambda/2$ plate, and an angle $\theta_3$ formed by a slow axis of the $\lambda/2$ plate with an orientation direction of a liquid crystal molecule defined by the first horizontal alignment film in the twist direction of the liquid crystal layer is in a range from 136.5° to 138.5°.

Item 15

The liquid crystal display device according to any one of items 2 to 14, in which the phase difference layer includes a $\lambda/4$ plate, and an angle $\theta_4$ formed by a slow axis of the $\lambda/4$ plate with an orientation direction of a liquid crystal molecule defined by the first horizontal alignment film in the twist direction of the liquid crystal layer is in a range from 144.5° to 163.0°.

Item 16

The liquid crystal display device according to any one of items 2 to 14, in which the phase difference layer includes a $\lambda/4$ plate, and an angle $\theta_4$ formed by a slow axis of the $\lambda/4$ plate with an orientation direction of a liquid crystal molecule defined by the first horizontal alignment film in the twist direction of the liquid crystal layer is in a range from 147.4° to 160.2°.

Item 17

The liquid crystal display device according to any one of items 2 to 14, in which the phase difference layer includes a $\lambda/4$ plate, and an angle $\theta_4$ formed by a slow axis of the $\lambda/4$ plate with an orientation direction of a liquid crystal molecule defined by the first horizontal alignment film in the twist direction of the liquid crystal layer is in a range from 150.4° to 157.3°.

Item 18

The liquid crystal display device according to any one of items 2 to 14, in which the phase difference layer includes a $\lambda/4$ plate, and an angle $\theta_4$ formed by a slow axis of the $\lambda/4$ plate with an orientation direction of a liquid crystal molecule defined by the first horizontal alignment film in the twist direction of the liquid crystal layer is in a range from 152.2° to 155.5°.

Item 19

The liquid crystal display device according to any one of items 2 to 18, in which, when a birefringence index of the liquid crystal material is taken as Δn and a thickness of the liquid crystal layer is taken as d, Δn·d, which is a product of the birefringence index Δn and the thickness d, is in a range from 152.3 nm to 285.8 nm.

Item 20

The liquid crystal display device according to any one of items 2 to 18, in which, when a birefringence index of the liquid crystal material is taken as Δn and a thickness of the liquid crystal layer is taken as d, Δn·d, which is a product of the birefringence index Δn and the thickness d, is in a range from 176.9 nm to 260.8 nm.

Item 21

The liquid crystal display device according to any one of items 2 to 18, in which, when a birefringence index of the liquid crystal material is taken as Δn and a thickness of the liquid crystal layer is taken as d, Δn·d, which is a product of the birefringence index Δn and the thickness d, is in a range from 195.8 nm to 240.5 nm.

Item 22

The liquid crystal display device according to any one of items 2 to 18, in which, when a birefringence index of the liquid crystal material is taken as Δn and a thickness of the liquid crystal layer is taken as d, Δn·d, which is a product of the birefringence index Δn and the thickness d, is in a range from 207.0 nm to 228.5 nm.

Item 23

The liquid crystal display device according to item 1, in which the liquid crystal layer contains a liquid crystal material of negative-type.

Item 24

The liquid crystal display device according to item 23, in which a twist angle $\theta_1$ of the liquid crystal layer is in a range from 58.5° to 89.6° when no voltage is applied.

Item 25

The liquid crystal display device according to item 23, in which a twist angle $\theta_1$ of the liquid crystal layer is in a range from 63.8° to 84.3° when no voltage is applied.

Item 26

The liquid crystal display device according to item 23, in which a twist angle $\theta_1$ of the liquid crystal layer is in a range from 68.10 to 80.0° when no voltage is applied.

Item 27

The liquid crystal display device according to item 23, in which a twist angle $\theta_1$ of the liquid crystal layer is in a range from 71.0° to 77.0° when no voltage is applied.

Item 28

The liquid crystal display device according to any one of items 23 to 27, in which an angle $\theta_2$ formed by a light absorption axis of the polarizer with an orientation direction of a liquid crystal molecule defined by the first horizontal alignment film in a twist direction of the liquid crystal layer is in a range from 111.3° to 133.8°.

Item 29

The liquid crystal display device according to any one of items 23 to 27, in which an angle $\theta_2$ formed by a light absorption axis of the polarizer with an orientation direction of a liquid crystal molecule defined by the first horizontal alignment film in a twist direction of the liquid crystal layer is in a range from 115.1° to 130.4°.

Item 30

The liquid crystal display device according to any one of items 23 to 27, in which an angle $\theta_2$ formed by a light absorption axis of the polarizer with an orientation direction of a liquid crystal molecule defined by the first horizontal alignment film in a twist direction of the liquid crystal layer is in a range from 118.4° to 127.0°.

Item 31

The liquid crystal display device according to any one of items 23 to 27, in which an angle $\theta_2$ formed by a light absorption axis of the polarizer with an orientation direction of a liquid crystal molecule defined by the first horizontal alignment film in a twist direction of the liquid crystal layer is in a range from 120.4° to 125.0°.

Item 32

The liquid crystal display device according to any one of items 23 to 31,
  in which the phase difference layer includes a λ/2 plate, and
  an angle $\theta_3$ formed by a slow axis of the λ/2 plate with an orientation direction of a liquid crystal molecule defined by the first horizontal alignment film in the twist direction of the liquid crystal layer is in a range from 131.4° to 143.3°.

Item 33

The liquid crystal display device according to any one of items 23 to 31,
  in which the phase difference layer includes a λ/2 plate, and
  an angle $\theta_3$ formed by a slow axis of the λ/2 plate with an orientation direction of a liquid crystal molecule defined by the first horizontal alignment film in the twist direction of the liquid crystal layer is in a range from 133.5° to 141.3°.

Item 34

The liquid crystal display device according to any one of items 23 to 31,
  in which the phase difference layer includes a λ/2 plate, and
  an angle $\theta_3$ formed by a slow axis of the λ/2 plate with an orientation direction of a liquid crystal molecule defined by the first horizontal alignment film in the twist direction of the liquid crystal layer is in a range from 135.2° to 139.6°.

Item 35

The liquid crystal display device according to any one of items 23 to 31,
  in which the phase difference layer includes a λ/2 plate, and
  an angle $\theta_3$ formed by a slow axis of the λ/2 plate with an orientation direction of a liquid crystal molecule defined by the first horizontal alignment film in the twist direction of the liquid crystal layer is in a range from 136.3° to 138.6°.

Item 36

The liquid crystal display device according to any one of items 23 to 35,
  in which the phase difference layer includes a λ/4 plate, and
  an angle $\theta_4$ formed by a slow axis of the λ/4 plate with an orientation direction of a liquid crystal molecule defined by the first horizontal alignment film in the twist direction of the liquid crystal layer is in a range from 143.10 to 164.1°.

Item 37
The liquid crystal display device according to any one of items 23 to 35,
in which the phase difference layer includes a λ/4 plate, and
an angle $\theta_4$ formed by a slow axis of the λ/4 plate with an orientation direction of a liquid crystal molecule defined by the first horizontal alignment film in the twist direction of the liquid crystal layer is in a range from 147.0° to 160.4°.

Item 38
The liquid crystal display device according to any one of items 23 to 35,
in which the phase difference layer includes a λ/4 plate, and
an angle $\theta_4$ formed by a slow axis of the λ/4 plate with an orientation direction of a liquid crystal molecule defined by the first horizontal alignment film in the twist direction of the liquid crystal layer is in a range from 150.1° to 157.5°.

Item 39
The liquid crystal display device according to any one of items 23 to 35,
in which the phase difference layer includes a λ/4 plate, and
an angle $\theta_4$ formed by a slow axis of the λ/4 plate with an orientation direction of a liquid crystal molecule defined by the first horizontal alignment film in the twist direction of the liquid crystal layer is in a range from 151.9° to 155.8°.

Item 40
The liquid crystal display device according to any one of items 23 to 39, in which, when a birefringence index of the liquid crystal material is taken as Δn and a thickness of the liquid crystal layer is taken as d, Δn·d, which is a product of the birefringence index Δn and the thickness d, is in a range from 151.2 nm to 285.1 nm.

Item 41
The liquid crystal display device according to any one of items 23 to 39, in which, when a birefringence index of the liquid crystal material is taken as Δn and a thickness of the liquid crystal layer is taken as d, Δn·d, which is a product of the birefringence index Δn and the thickness d, is in a range from 175.9 nm to 259.3 nm.

Item 42
The liquid crystal display device according to any one of items 23 to 39, in which, when a birefringence index of the liquid crystal material is taken as Δn and a thickness of the liquid crystal layer is taken as d, Δn·d, which is a product of the birefringence index Δn and the thickness d, is in a range from 193.8 nm to 240.5 nm.

Item 43
The liquid crystal display device according to any one of items 23 to 39, in which, when a birefringence index of the liquid crystal material is taken as Δn and a thickness of the liquid crystal layer is taken as d, Δn·d, which is a product of the birefringence index Δn and the thickness d, is in a range from 204.7 nm to 229.4 nm.

Item 44
The liquid crystal display device according to any one of items 1 to 43,
in which the first substrate includes a substrate, a backplane circuit provided on the substrate and configured to drive the plurality of pixels, a first interlayer insulating layer provided to cover the backplane circuit, and a second interlayer insulating layer provided on the first interlayer insulating layer,
the reflective layer is provided between the first interlayer insulating layer and the second interlayer insulating layer, and
the first electrode and the second electrode are provided between the second interlayer insulating layer and the first horizontal alignment film.

Item 45
The liquid crystal display device according to item 44,
in which the first substrate includes a dielectric layer provided between the second interlayer insulating layer and the first horizontal alignment film,
one of the first electrode and the second electrode is provided between the second interlayer insulating layer and the dielectric layer, and
the other one of the first electrode and the second electrode is provided between the dielectric layer and the first horizontal alignment film.

Item 46
The liquid crystal display device according to any one of items 1 to 45, in which at least one of the first electrode and the second electrode includes a plurality of belt-shaped portions and at least one slit located between two belt-shaped portions adjacent to each other among the plurality of belt-shaped portions.

Item 47
The liquid crystal display device according to item 46, in which each of the plurality of belt-shaped portions includes a first portion extending in a first direction and a second portion extending in a second direction different from the first direction.

Item 48
The liquid crystal display device according to item 46, in which the plurality of belt-shaped portions include at least one first belt-shaped portion extending in a first direction and at least one second belt-shaped portion extending in a second direction different from the first direction.

Item 49
The liquid crystal display device according to any one of items 1 to 48 configured to perform display in a normally black mode.

Item 50
The liquid crystal display device according to any one of items 1 to 49,
in which one of the first electrode and the second electrode is a pixel electrode provided in each of the plurality of pixels,
the other one of the first electrode and the second electrode is a common electrode including a plurality of segments each capable of functioning as a touch sensor electrode, and
the first substrate includes a plurality of touch wiring lines each connected to the corresponding touch sensor electrode.

Item 51
The liquid crystal display device according to any one of items 1 to 50, in which the first substrate includes a thin film transistor provided in each of the plurality of pixels and including an oxide semiconductor layer.

Item 52
The liquid crystal display device according to item 51,
in which the oxide semiconductor layer includes an In—Ga—Zn—O based semiconductor.

Item 53
The liquid crystal display device according to any one of items 1 to 52, further including an illumination device disposed on a back face side relative to the first substrate or on a viewer side relative to the polarizer.

According to an embodiment of the disclosure, it is possible to improve the contrast ratio of a reflective or transflective liquid crystal display device configured to display in the transverse electrical field mode.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that the embodiments of the disclosure are not limited to those illustrated below.

Figure 1:
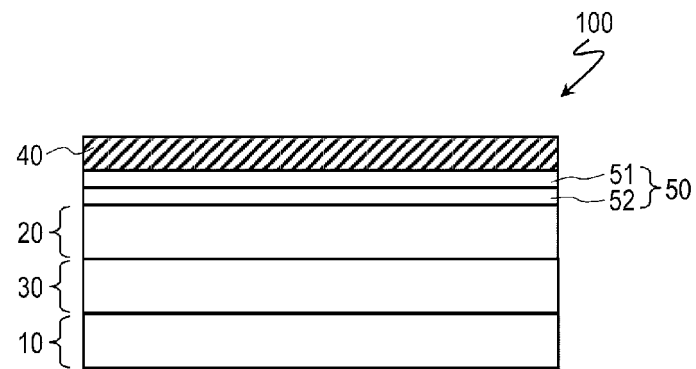
FIG. 1 is a cross-sectional view schematically illustrating a liquid crystal display device 100 according to an embodiment of the disclosure.
Figure 2:
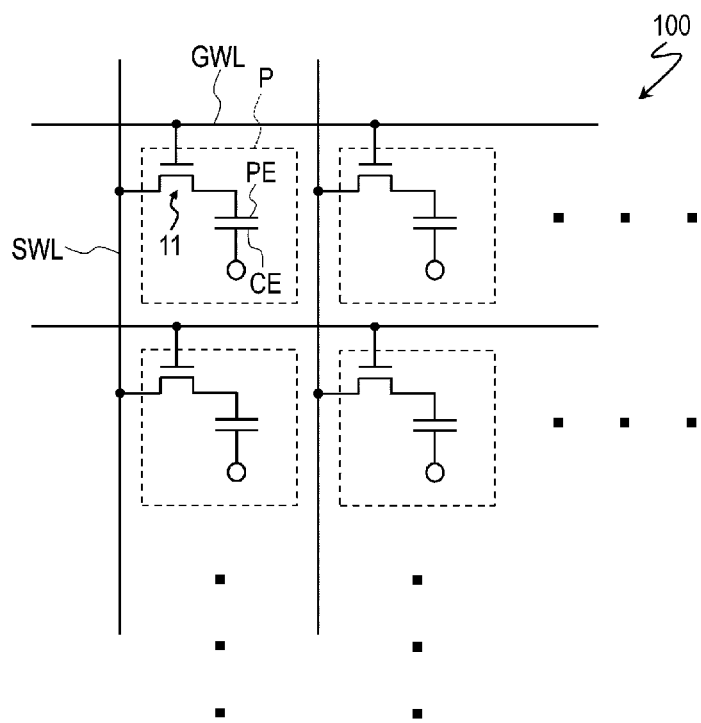
FIG. 2 is an equivalent circuit diagram of a plurality of pixels P included in the liquid crystal display device 100.

A liquid crystal display device 100 according to an embodiment of the disclosure will be described with reference to FIGS. 1 and 2. The liquid crystal display device 100 is a reflective liquid crystal display device performing display in a normally black mode. FIG. 1 is a cross-sectional view schematically illustrating the liquid crystal display device 100. FIG. 2 is an equivalent circuit diagram of a plurality of pixels P included in the liquid crystal display device 100.

As illustrated in FIG. 1, the liquid crystal display device 100 includes an active matrix substrate (hereinafter, referred to as a "TFT substrate") 10, a counter substrate (also referred to as a "color filter substrate") 20 disposed on a viewer side relative to the TFT substrate 10, and a liquid crystal layer 30 provided between the TFT substrate 10 and the counter substrate 20. The liquid crystal display device 100 further includes a polarizer 40 disposed on the viewer side relative to the liquid crystal layer 30, and a phase difference layer 50 disposed between the polarizer 40 and the liquid crystal layer 30. The polarizer 40 is disposed on the viewer side relative to the counter substrate 20, and the phase difference layer 50 is disposed between the polarizer 40 and the counter substrate 20. The polarizer 40 is, specifically, a linear polarizer of an absorption type. The phase difference layer 50 includes a $\lambda/2$ plate 51 and a $\lambda/4$ plate 52.

The liquid crystal display device 100 includes a plurality of pixels P arrayed in a matrix shape as illustrated in FIG. 2. The plurality of pixels P typically include red pixels that display red, green pixels that display green, and blue pixels that display blue. Each pixel P includes a thin film transistor (TFT) 11, and a pixel electrode PE and a common electrode CE that can generate a transverse electrical field in the liquid crystal layer 30. A gate electrode of the TFT 11 is electrically connected to a corresponding gate wiring line (scanning wiring line) GWL. A source electrode of the TFT 11 is electrically connected to a corresponding source wiring line (signal wiring line) SWL. A drain electrode of the TFT 11 is electrically connected to the pixel electrode PE.

Figure 3A:
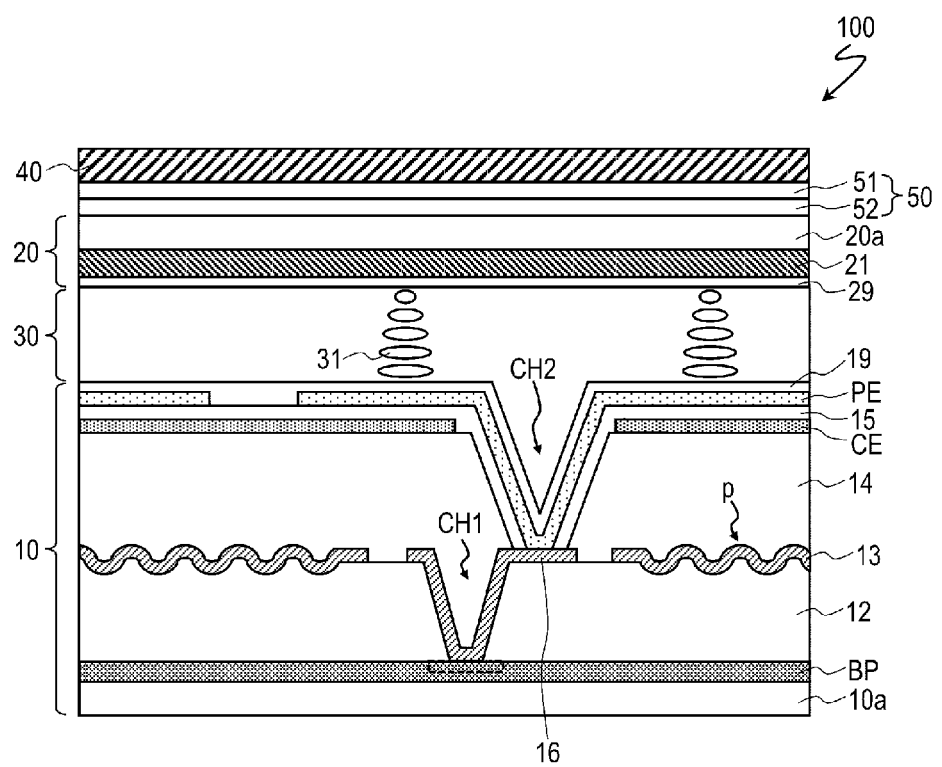
FIG. 3A is a cross-sectional view schematically illustrating the liquid crystal display device 100.

Subsequently, more specific configurations of the TFT substrate 10 and the counter substrate 20 will be described with reference to FIG. 3A. FIG. 3A is a cross-sectional view schematically illustrating the liquid crystal display device 100.

The TFT substrate 10 includes a substrate 10a, a backplane circuit BP, a first interlayer insulating layer 12, and a reflective layer 13. The TFT substrate 10 further includes a second interlayer insulating layer 14, a common electrode CE, a dielectric layer 15, the pixel electrode PE, and a first horizontal alignment film 19.

The substrate 10a supports the backplane circuit BP and the like. The substrate 10a is transparent and has insulating properties. The substrate 10a is, for example, a glass substrate or a plastic substrate.

The backplane circuit BP is provided on the substrate 10a. The backplane circuit BP is a circuit for driving the plurality of pixels P. The backplane circuit BP includes the TFT 11, the gate wiring line GWL, the source wiring line SWL, and the like have been described above.

The first interlayer insulating layer 12 is provided to cover the backplane circuit BP. The first interlayer insulating layer 12 has a surface with an uneven shape. That is, the first interlayer insulating layer 12 has an uneven surface structure. The first interlayer insulating layer 12 having the uneven surface structure may be formed using a photosensitive resin, as described, for example, in JP 3394926 B.

The reflective layer 13 is provided on the first interlayer insulating layer 12. The reflective layer 13 is formed of a material that reflects light. More specifically, the reflective layer 13 is formed of a metal material having high reflectivity. As the material of the reflective layer 13, a silver alloy, aluminum, or an aluminum alloy, for example, may be used.

The surface of the reflective layer 13 has an uneven shape in which the uneven surface structure of the first interlayer insulating layer 12 is reflected. That is, the reflective layer 13 also has an uneven surface structure. The uneven surface structure of the reflective layer 13 is also referred to as a micro reflective structure (MRS) in some cases and is provided to diffuse and reflect ambient light to achieve display close to paper white. The uneven surface structure can, for example, be constituted by a plurality of protruding portions p arranged randomly such that a center spacing between adjacent protruding portions p is from 5 μm to 50 μm, and preferably from 10 μm to 20 μm. When viewed from the normal direction of the substrate 10a, the shapes of the protruding portions p are substantially circular or substantially polygonal. An area of the protruding portions p occupying the pixel P is, for example, from approximately 20% to 40%. A height of the protruding portions p is from 1 μm to 5 μm, for example.

The second interlayer insulating layer 14 is formed over the first interlayer insulating layer 12 to cover the reflective layer 13. Therefore, it can be said that the reflective layer 13 is provided between the first interlayer insulating layer 12 and the second interlayer insulating layer 14.

The common electrode CE is provided on the second interlayer insulating layer 14. Thus, the common electrode CE is provided on the reflective layer 13 with the second interlayer insulating layer 14 interposed therebetween. In other words, the reflective layer 13 is located on the opposite side to the liquid crystal layer 30 relative to the common electrode CE (that is, on the back face side relative to the common electrode CE).

The common electrode CE is formed of a transparent conductive material. As the transparent conductive material, for example, indium tin oxide (ITO), indium zinc oxide (IZO (registered trade name)), or a mixture thereof may be used.

The dielectric layer 15 is provided to cover the common electrode CE.

The pixel electrode PE is provided to each of the plurality of pixels P. The pixel electrode PE is provided on the dielectric layer 15. In other words, the reflective layer 13 is also located on the opposite side to the liquid crystal layer 30 relative to the pixel electrode PE (that is, on the back face side relative to the pixel electrode PE).

The pixel electrode PE is formed of a transparent conductive material. A material similar to that of the common electrode CE may be used as the transparent conductive material for forming the pixel electrode PE. The pixel electrode PE is electrically connected to the backplane circuit BP.

In the illustrated example, the pixel electrode PE is electrically connected to the backplane circuit BP (more specifically, to the drain electrode of the TFT 11) via a contact electrode 16. The contact electrode 16 is formed of the same metal film as the reflective layer 13 (that is, formed in the same layer as the reflective layer 13). In the first interlayer insulating layer 12, there is formed a first contact hole CH1 to expose part of the backplane circuit BP (more specifically, at least part of the drain electrode of the TFT 11), and the contact electrode 16 is connected to the backplane circuit BP in the first contact hole CH1. Further, a second contact hole CH2 to expose part of the contact electrode 16 is formed in the second interlayer insulating layer 14, and the pixel electrode PE is connected to the contact electrode 16 in the second contact hole CH2.

Although not illustrated in FIG. 3A, the pixel electrode PE includes a plurality of belt-shaped portions and at least one slit located between two belt-shaped portions adjacent to each other.

The first horizontal alignment film 19 is provided on the pixel electrode PE and is in contact with the liquid crystal layer 30. Therefore, it can be said that the pixel electrode PE and the common electrode CE are provided between the second interlayer insulating layer 14 and the first horizontal alignment film 19. It can be said that the dielectric layer 15 is also provided between the second interlayer insulating layer 14 and the first horizontal alignment film 19; in this case, the common electrode CE is provided between the second interlayer insulating layer 14 and the dielectric layer 15, and the pixel electrode PE is provided between the dielectric layer 15 and the first horizontal alignment film 19.

The counter substrate 20 includes a substrate 20a, a color filter layer 21, and a second horizontal alignment film 29. Although not illustrated here, the counter substrate 20 further includes a plurality of columnar spacers.

The substrate 20a supports the color filter layer 21 and the like. The substrate 20a is transparent and has insulating properties. The substrate 20a is, for example, a glass substrate or a plastic substrate.

The color filter layer 21 typically includes a red color filter provided in a region corresponding to a red pixel, a green color filter provided in a region corresponding to a green pixel, and a blue color filter provided in a region corresponding to a blue pixel. The red color filter, green color filter, and blue color filter transmit red light, green light, and blue light, respectively.

In a case where color display is not performed, the color filter layer 21 is omitted.

An overcoat layer (flattened layer) that covers the color filter layer 21 may be provided as needed. White display may be yellowish due to the materials used as follows: a transparent conductive material (for the pixel electrode PE and the common electrode CE), an organic insulating material (for the first interlayer insulating layer 12 and the second interlayer insulating layer 14), an inorganic insulating material (for the dielectric layer 15), and an alignment film material (for the first horizontal alignment film 19 and the second horizontal alignment film 29). In this case, chromaticity adjustment (blue shift) may be performed by forming the overcoat layer with a blue resist to bring the chromaticity of white display close to the chromaticity of, for example, a D65 light source.

The columnar spacer defines the thickness (cell gap) of the liquid crystal layer 30. The columnar spacers can include a photosensitive resin.

The second horizontal alignment film 29 is provided on the color filter layer 21 and is in contact with the liquid crystal layer 30.

The liquid crystal layer 30 includes a nematic liquid crystal material whose dielectric anisotropy $\Delta\varepsilon$ is positive (i.e., positive-type), or a nematic liquid crystal material whose dielectric anisotropy $\Delta\varepsilon$ is negative (i.e., negative-type). The dielectric anisotropy $\Delta\varepsilon$ is a difference between a dielectric constant $\varepsilon_{//}$ in the major axis direction and a dielectric constant $\varepsilon_\perp$ in the minor axis direction of a liquid crystal molecule 31 (i.e., $\varepsilon_{//}-\varepsilon_\perp$). The liquid crystal layer 30 may further include a chiral agent as necessary. The liquid crystal layer 30 can be formed, for example, by the falling drop method.

From the viewpoint of reliability, it is preferable to use a positive-type liquid crystal material. When the liquid crystal material is positive-type, the birefringence index $\Delta n$ of the liquid crystal material is, for example, 0.07 or less, and the dielectric anisotropy $\Delta\varepsilon$ of the liquid crystal material is, for example, 10 or more.

The thickness of the liquid crystal layer 30 is not particularly limited, but may be 3 µm or more, for example.

Each of the first horizontal alignment film 19 and the second horizontal alignment film 29 has been subjected to alignment treatment and defines an orientation direction of the liquid crystal molecule 31 included in the liquid crystal layer 30. The orientation direction defined by the first horizontal alignment film 19 and the orientation direction defined by the second horizontal alignment film 29 are different from each other.

Since the first horizontal alignment film 19 and the second horizontal alignment film 29 are provided on both sides of the liquid crystal layer 30, the liquid crystal molecule 31 of the liquid crystal layer 30 is horizontally aligned (that is, the pre-tilt angle is substantially 0°) at least in a state where no voltage is applied to the liquid crystal layer 30. As described above, since the orientation direction defined by the first horizontal alignment film 19 and the orientation direction defined by the second horizontal alignment film 29 are different from each other, as illustrated in FIG. 3A, the liquid crystal layer 30 takes a twist alignment when no voltage is applied. When a voltage is applied to the liquid crystal layer 30, that is, when a transverse electrical field is generated in the liquid crystal layer 30 by the pixel electrode PE and the common electrode CE, the alignment state of the liquid crystal layer 30 is changed by the transverse electrical field (fringe electrical field).

In this case, the configuration in which the pixel electrode PE is provided above the common electrode CE is exemplified, but conversely, the common electrode CE may be provided above the pixel electrode PE. Hereinafter, of the common electrode CE and the pixel electrode PE, the electrode relatively located on the upper side may be referred to as an "upper layer electrode", while the electrode relatively located on the lower side may be referred to as a "lower layer electrode". In order to generate the transverse electrical field, at least the upper layer electrode includes a plurality of belt-shaped portions and at least one slit located between two belt-shaped portions adjacent to each other.

Figure 3B:
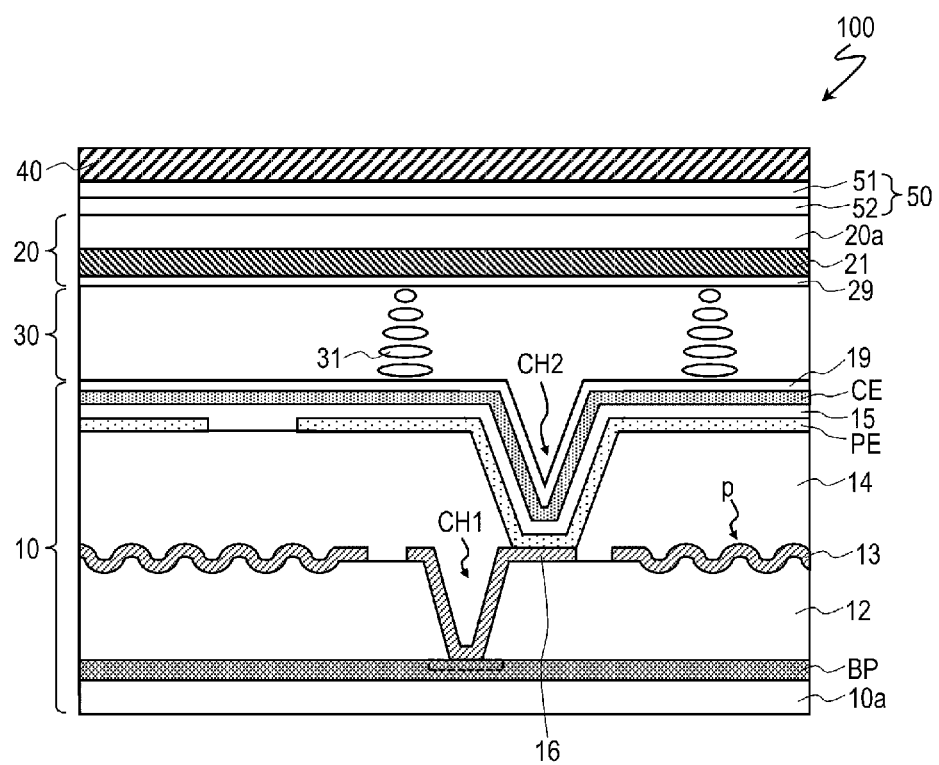
FIG. 3B is a cross-sectional view schematically illustrating the liquid crystal display device 100.

An example of the configuration in which the common electrode CE is provided above the pixel electrodes PE is illustrated in FIG. 3B. In the example illustrated in FIG. 3B, the pixel electrode PE is provided on the second interlayer insulating layer 14, and the dielectric layer 15 is provided to cover the pixel electrode PE. The common electrode CE is provided on the dielectric layer 15. In the example illustrated in FIG. 3B as well, the reflective layer 13 is located on the opposite side to the liquid crystal layer 30 relative to the pixel electrode PE and the common electrode CE (that is, located on the back face side relative to the pixel electrode PE and the common electrode CE). In addition, also in the example illustrated in FIG. 3B, it can be said that the pixel electrode PE and the common electrode CE are provided between the second interlayer insulating layer 14 and the first horizontal alignment film 19, and it can be said that the dielectric layer 15 is also provided between the second interlayer insulating layer 14 and the first horizontal alignment film 19. In the example illustrated in FIG. 3B, the pixel electrode PE is provided between the second interlayer insulating layer 14 and the dielectric layer 15, and the common electrode CE is provided between the dielectric layer 15 and the first horizontal alignment film 19.

Although not illustrated in FIG. 3B, the common electrode CE includes, for each pixel P, a plurality of belt-shaped portions and at least one slit located between two belt-shaped portions adjacent to each other.

As described above, in the configuration in which the pixel electrode PE is provided above the common electrode CE as illustrated in FIG. 3A, the slit is formed at least in the pixel electrode PE, and in the configuration in which the common electrode CE is provided above the pixel electrode PE as illustrated in FIG. 3B, the slit is formed at least in the common electrodes CE.

In a liquid crystal display device of a relatively large size (that is, an area of the pixel P is relatively large), the pixel electrode PE is preferably provided above the common electrode CE. In the configuration in which the pixel electrode PE is provided above the common electrode CE, it is unnecessary to form a slit in the common electrode CE, and therefore an increase in resistivity (sheet resistivity) of the common electrode CE is more suppressed than in the configuration in which the common electrode CE is provided above the pixel electrode PE. When the resistivity of the common electrode CE increases, the fringe electrical field applied to the liquid crystal layer becomes weak. In the configuration in which the pixel electrode PE is provided above the common electrode CE, since it is necessary to form a slit in the pixel electrode PE, the resistivity of the pixel electrode PE increases. However, since a voltage input from the outside is applied to the pixel electrode PE, it is easy to reduce the influence of the increase in resistivity (that is, it is easy to suppress a situation in which the fringe electrical field becomes weak). In order to suppress the increase in resistivity of the common electrode CE, it is conceivable to use a low-resistance wiring line formed of a metal material (connecting the low-resistance wiring line to the common electrode CE). However, in such a configuration, an adverse effect on display (for example, glare, rainbow-color diffraction, or interference patterns) due to regular reflection or the like by the low-resistance wiring line occurs, and thus it is necessary to block light with a black matrix or the like, thereby reducing the reflection aperture ratio. In the configuration in which the pixel electrode PE is provided above the common electrode CE, since the common electrode CE is not present in a region where the second contact hole CH2 is formed, the region does not contribute to reflective display, and the reflectivity may be lowered compared to the configuration in which the common electrode CE is provided above the pixel electrode PE. An area of the region that does not contribute to the reflective display, such as the contact hole, is required to have a specific size regardless of the area size of the pixel P. Accordingly, the proportion of the region that does not contribute to the reflective display in the pixel P increases as the area of the pixel P is smaller (that is, as the definition increases), and the above-discussed reduction in reflectivity becomes larger. Conversely, in the case of a relatively large-size liquid crystal display device, the proportion of the region that does not contribute to the reflective display in the pixel P is likely to be lowered, and thus the above-discussed reduction in reflectivity is likely to be suppressed. For these reasons, in a relatively large-size liquid crystal display device (where an area of the pixel P is relatively large), the configuration in which the pixel electrode PE is provided above the common electrode CE is advantageous.

As described above, the reduction in reflectivity due to the non-contribution of the region where the second contact hole CH2 is formed to the reflective display is larger as the area of the pixel P is smaller (that is, as the definition increases). Accordingly, in a liquid crystal display device having relatively high definition (that is, the area of the pixel P is relatively small), the common electrode CE is preferably provided above the pixel electrodes PE.

As described above, in the liquid crystal display device 100 according to the present embodiment, display is performed in the transverse electrical field mode in which the liquid crystal layer 30 takes a twist alignment when no voltage is applied. This makes it possible to achieve a sufficiently improved contrast ratio of the reflective display, as described below. In this case, an FFS mode in which the liquid crystal layer 30 takes a twist alignment when no voltage is applied (referred to as a "TW-FFS mode") is exemplified, but an in-plane switching (IPS) mode in which the liquid crystal layer 30 takes a twist alignment when no voltage is applied (referred to as a "TW-IPS mode") may be employed. When the TW-IPS mode is employed, the pixel electrode PE and the common electrode CE are provided in the same layer, and both the pixel electrode PE and the common electrode CE have a plurality of belt-shaped portions (that is, they may be comb-shaped electrodes).

Hereinafter, preferable settings of a twist angle of the liquid crystal layer 30, a light absorption axis of the polarizer 40, a slow axis of the $\lambda/2$ plate 51, a slow axis of the $\lambda/4$ plate 52, and retardation $\Delta n \cdot d$ of the liquid crystal layer 30 in the liquid crystal display device 100 of the present embodiment will be described for the case where the liquid crystal material of the liquid crystal layer 30 is positive-type and the case where the liquid crystal material of the liquid crystal layer 30 is negative-type. In the specification of the present application, the term "retardation" refers to retardation with respect to light having a wavelength of 550 nm unless otherwise specified.

Case where Liquid Crystal Material is Positive-Type

Figure 4:
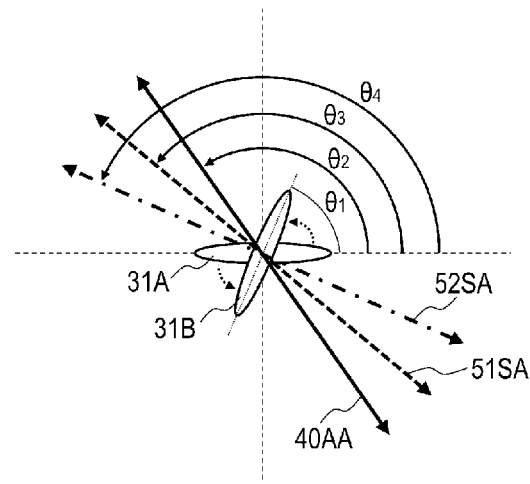
FIG. 4 is a diagram illustrating a liquid crystal molecule 31A near a first horizontal alignment film 19, a liquid crystal molecule 31B near a second horizontal alignment film 29, a light absorption axis 40AA of a polarizer 40, a slow axis 51SA of a λ/2 plate 51, and a slow axis 52SA of a λ/4 plate 52 when no voltage is applied.

First, in the positive-type case, a preferable configuration from the viewpoint of improving the contrast ratio will be described with reference to FIG. 4. FIG. 4 is a diagram illustrating a liquid crystal molecule 31A near the first horizontal alignment film 19, a liquid crystal molecule 31B near the second horizontal alignment film 29, a light absorption axis 40AA of the polarizer 40, a slow axis 51SA of the $\lambda/2$ plate 51, and a slow axis 52SA of the $\lambda/4$ plate 52 when no voltage is applied.

A twist angle $\theta_1$ of the liquid crystal layer 30 when no voltage is applied is an angle formed between an orientation direction defined by the first horizontal alignment film 19 and an orientation direction defined by the second horizontal alignment film 29, in other words, an angle formed between the major axis direction of the liquid crystal molecule 31A near the first horizontal alignment film 19 and the major axis direction of the liquid crystal molecule 31B near the second horizontal alignment film 29 in a twist direction. Here, the twist direction is a direction twisted from the orientation direction defined by the first horizontal alignment film 19 to the orientation direction defined by the second horizontal alignment film 29 when the liquid crystal display device 100 is viewed from the viewer side.

The twist angle $\theta_1$ of the liquid crystal layer 30 is preferably in a range from 58.3° to 89.9°, and more preferably from 64.0° to 84.3°. The twist angle $\theta_1$ is more preferably in a range from 68.4° to 79.4°, and most preferably from 71.4° to 76.6°.

When the twist angle $\theta_1$ is in the range from 58.3° to 89.9°, a contrast ratio of 5 or more may be achieved, and when the twist angle $\theta_1$ is in the range from 64.0° to 84.3°, a contrast ratio of 10 or more may be achieved. When the twist angle $\theta_1$ is in the range from 68.4° to 79.4°, a contrast ratio of 20 or more may be achieved, and when the twist angle $\theta_1$ is in the range from 71.4° to 76.6°, a contrast ratio of 30 or more may be achieved.

An angle $\theta_2$ formed by the light absorption axis 40AA of the polarizer 40 with the orientation direction of the liquid crystal molecule 31A defined by the first horizontal alignment film 19 in the twist direction of the liquid crystal layer 30 is preferably in a range from 110.8° to 132.3°, and more preferably from 114.4° to 129.3°. The angle $\theta_2$ is more preferably in a range from 117.9° to 126.1°, and most preferably from 120.1° to 124.2°.

When the angle $\theta_2$ is in the range from 110.8° to 132.3°, a contrast ratio of 5 or more may be achieved, and when the angle $\theta_2$ is in the range from 114.4° to 129.3°, a contrast ratio of 10 or more may be achieved. When the angle $\theta_2$ is in the range from 117.9° to 126.1°, a contrast ratio of 20 or more may be achieved, and when the angle $\theta_2$ is in the range from 120.1° to 124.2°, a contrast ratio of 30 or more may be achieved.

An angle $\theta_3$ formed by the slow axis 51SA of the $\lambda/2$ plate 51 with the orientation direction of the liquid crystal molecule 31A defined by the first horizontal alignment film 19 in the twist direction of the liquid crystal layer 30 is preferably in a range from 132.4° to 143.6°, and more preferably from 134.0° to 141.4°. The angle $\theta_3$ is more preferably in a range from 135.5° to 139.7°, and most preferably from 136.5° to 138.5°.

When the angle $\theta_3$ is in the range from 132.4° to 143.6°, a contrast ratio of 5 or more may be achieved, and when the angle $\theta_3$ is in the range from 134.0° to 141.4°, a contrast ratio of 10 or more may be achieved. When the angle $\theta_3$ is in the range from 135.5° to 139.7°, a contrast ratio of 20 or more may be achieved, and when the angle $\theta_3$ is in the range from 136.5° to 138.5°, a contrast ratio of 30 or more may be achieved.

An angle $\theta_4$ formed by the slow axis 52SA of the $\lambda/4$ plate 52 with the orientation direction of the liquid crystal molecule 31A defined by the first horizontal alignment film 19 in the twist direction of the liquid crystal layer 30 is preferably in a range from 144.5° to 163.0°, and more preferably from 147.4° to 160.2°. The angle $\theta_4$ is more preferably in a range from 150.4° to 157.3°, and most preferably from 152.2° to 155.5°.

When the angle $\theta_4$ is in the range from 144.5° to 163.0°, a contrast ratio of 5 or more may be achieved, and when the angle $\theta_4$ is in the range from 147.4° to 160.2°, a contrast ratio of 10 or more may be achieved. When the angle $\theta_4$ is in the range from 150.4° to 157.3°, a contrast ratio of 20 or more may be achieved, and when the angle $\theta_4$ is in the range from 152.2° to 155.5°, a contrast ratio of 30 or more may be achieved.

When a birefringence index of the liquid crystal material is taken as $\Delta n$ and a thickness of the liquid crystal layer 30 is taken as d, the retardation of the liquid crystal layer 30 is the product of the birefringence index $\Delta n$ and the thickness d (i.e., $\Delta n \cdot d$). The retardation $\Delta n \cdot d$ of the liquid crystal layer 30 is preferably in a range from 152.3 nm to 285.8 nm, and more preferably from 176.9 nm to 260.8 nm. The retardation $\Delta n \cdot d$ of the liquid crystal layer 30 is more preferably in a range from 195.8 nm to 240.5 nm, and most preferably from 207.0 nm to 228.5 nm.

When the retardation $\Delta n \cdot d$ of the liquid crystal layer 30 is in the range from 152.3 nm to 285.8 nm, a contrast ratio of 5 or more may be achieved, and when the retardation $\Delta n \cdot d$ of the liquid crystal layer 30 is in the range from 176.9 nm to 260.8 nm, a contrast ratio of 10 or more may be achieved. When the retardation $\Delta n \cdot d$ of the liquid crystal layer 30 is in the range from 195.8 nm to 240.5 nm, a contrast ratio of 20 or more may be achieved, and when the retardation $\Delta n \cdot d$ of the liquid crystal layer 30 is in the range from 207.0 nm to 228.5 nm, a contrast ratio of 30 or more may be achieved.

Case where Liquid Crystal Material is Negative-Type

Figure 5:
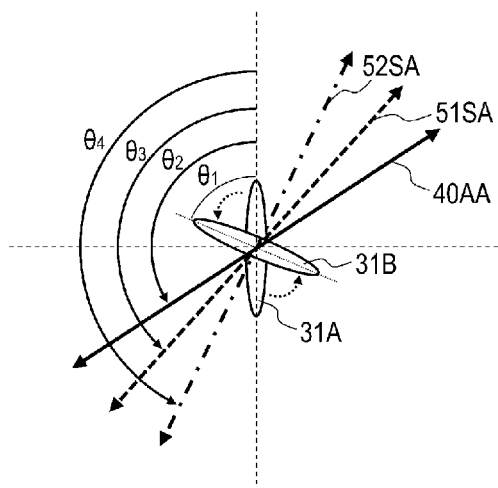
FIG. 5 is a diagram illustrating the liquid crystal molecule 31A near the first horizontal alignment film 19, the liquid crystal molecule 31B near the second horizontal alignment film 29, the light absorption axis 40AA of the polarizer 40, the slow axis 51SA of the λ/2 plate 51, and the slow axis 52SA of the λ/4 plate 52 when no voltage is applied.

Next, in the negative-type case, a preferable configuration from the viewpoint of improving the contrast ratio will be described with reference to FIG. 5. FIG. 5 is a diagram illustrating the liquid crystal molecule 31A near the first horizontal alignment film 19, the liquid crystal molecule 31B near the second horizontal alignment film 29, the light absorption axis 40AA of the polarizer 40, the slow axis 51SA of the $\lambda/2$ plate 51, and the slow axis 52SA of the $\lambda/4$ plate 52 when no voltage is applied.

The twist angle $\theta_1$ of the liquid crystal layer 30 when no voltage is applied thereto is preferably in a range from 58.5° to 89.6°, and more preferably from 63.8° to 84.3°. The twist angle $\theta_1$ is more preferably in a range from 68.1° to 80.0°, and most preferably from 71.0° to 77.0°.

When the twist angle $\theta_1$ is in the range from 58.5° to 89.6°, a contrast ratio of 5 or more may be achieved, and when the twist angle $\theta_1$ is in the range from 63.8° to 84.3°, a contrast ratio of 10 or more may be achieved. When the twist angle $\theta_1$ is in the range from 68.1° to 80.0°, a contrast ratio of 20 or more may be achieved, and when the twist angle $\theta_1$ is in the range from 71.0° to 77.0°, a contrast ratio of 30 or more may be achieved.

The angle $\theta_2$ formed by the light absorption axis 40AA of the polarizer 40 with the orientation direction of the liquid crystal molecule 31A defined by the first horizontal alignment film 19 in the twist direction of the liquid crystal layer 30 is preferably in a range from 111.3° to 133.8°, and more preferably from 115.1° to 130.4°. The angle $\theta_2$ is more preferably in a range from 118.4° to 127.0°, and most preferably from 120.4° to 125.0°.

When the angle $\theta_2$ is in the range from 111.3° to 133.8°, a contrast ratio of 5 or more may be achieved, and when the angle $\theta_2$ is in the range from 115.1° to 130.4°, a contrast ratio of 10 or more may be achieved. When the angle $\theta_2$ is in the range from 118.4° to 127.0°, a contrast ratio of 20 or more may be achieved, and when the angle $\theta_2$ is in the range from 120.4° to 125.0°, a contrast ratio of 30 or more may be achieved.

The angle $\theta_3$ formed by the slow axis 51SA of the $\lambda/2$ plate 51 with the orientation direction of the liquid crystal molecule 31A defined by the first horizontal alignment film 19 in the twist direction of the liquid crystal layer 30 is preferably in a range from 131.4° to 143.3°, and more preferably from 133.5° to 141.3°. The angle $\theta_3$ is more preferably in a range from 135.2° to 139.6°, and most preferably from 136.3° to 138.6°.

When the angle $\theta_3$ is in the range from 131.4° to 143.3°, a contrast ratio of 5 or more may be achieved, and when the angle $\theta_3$ is in the range from 133.5° to 141.3°, a contrast ratio of 10 or more may be achieved. When the angle $\theta_3$ is in the range from 135.2° to 139.6°, a contrast ratio of 20 or more may be achieved, and when the angle $\theta_3$ is in the range from 136.3° to 138.6°, a contrast ratio of 30 or more may be achieved.

The angle $\theta_4$ formed by the slow axis 52SA of the $\lambda/4$ plate 52 with the orientation direction of the liquid crystal molecule 31A defined by the first horizontal alignment film 19 in the twist direction of the liquid crystal layer 30 is preferably in a range from 143.1° to 164.1°, and more preferably from 147.0° to 160.4°. The angle $\theta_4$ is more preferably in a range from 150.1° to 157.5°, and most preferably from 151.9° to 155.8°.

When the angle $\theta_4$ is in the range from 143.1° to 164.1°, a contrast ratio of 5 or more may be achieved, and when the angle $\theta_4$ is in the range from 147.0° to 160.4°, a contrast ratio of 10 or more may be achieved. When the angle $\theta_4$ is in the range from 150.1° to 157.5°, a contrast ratio of 20 or more may be achieved, and when the angle $\theta_4$ is in the range from 151.9° to 155.8°, a contrast ratio of 30 or more may be achieved.

The retardation $\Delta n \cdot d$ of the liquid crystal layer 30 is preferably in a range from 151.2 nm to 285.1 nm, and more preferably from 175.9 nm to 259.3 nm. The retardation $\Delta n \cdot d$ of the liquid crystal layer 30 is more preferably in a range from 193.8 nm to 240.5 nm, and most preferably from 204.7 nm to 229.4 nm.

When the retardation $\Delta n \cdot d$ of the liquid crystal layer 30 is in the range from 151.2 nm to 285.1 nm, a contrast ratio of 5 or more may be achieved, and when the retardation $\Delta n \cdot d$ of the liquid crystal layer 30 is in the range from 175.9 nm to 259.3 nm, a contrast ratio of 10 or more may be achieved. When the retardation $\Delta n \cdot d$ of the liquid crystal layer 30 is in the range from 193.8 nm to 240.5 nm, a contrast ratio of 20 or more may be achieved, and when the retardation $\Delta n \cdot d$ of the liquid crystal layer 30 is in the range from 204.7 nm to 229.4 nm, a contrast ratio of 30 or more may be achieved.

Verification Results of Preferable Settings by Optical Simulation

The above-described preferable settings have been found by verification using optical simulation by the inventors of the disclosure of the present application. The verification results will be described below.

Prior to the verification, the inventors of the disclosure of the present application first found it preferable for the twist angle $\theta_1$ to take a value around 74° as described below.

As described earlier, the reflectivity is low even when the transverse electrical field mode of the related art is simply adopted in a reflective liquid crystal display device. For example, the reflectivity in the case where the FFS mode (the twist angle is 0° when no voltage is applied) is adopted in a reflective liquid crystal display device is about 60% of the reflectivity in the case where a VA mode, which is a kind of vertical electrical field mode, is adopted.

The reflective liquid crystal display device has a unique optical condition that the retardation $\Delta n \cdot d$ of the liquid crystal layer is set to about 138 nm (a $\lambda/4$ condition is satisfied with respect to 550 nm wavelength visible light). Accordingly, when it is attempted to secure a cell thickness of 2.0 μm or more in order to prevent a decrease in yield due to a decrease in cell thickness, it is essential to set the birefringence index $\Delta n$ of the liquid crystal material to 0.069 or less. It is difficult to achieve a high dielectric anisotropy $\Delta \varepsilon$ with a material composition having a low birefringence index $\Delta n$ (that is, to achieve both low $\Delta n$ and high $\Delta \varepsilon$) in terms of practical reliability.

Thus, the inventors of the disclosure of the present application considered adopting a hybrid aligned nematic (HAN) mode in order to decrease an apparent birefringence index $\Delta n$ and increase the cell thickness. However, when a HAN-mode test cell was prepared and verified, it was found that reflectivity of a black display (hereinafter also simply referred to as "black reflectivity") was not sufficiently lowered and the contrast ratio was not sufficiently improved (see Comparative Example 3 described later). Then, the inventors of the disclosure of the present application considered adopting the TW-FFS mode.

First, a configuration including a reflective liquid crystal panel, a polarizer, and a $\lambda/2$ plate (A-plate (uniaxial phase difference plate) having 275 nm retardation) was assumed, and then preferable optical conditions were found by carrying out optical simulation. LCD Master 1D manufactured by SHINTECH Inc. was used as simulation software.

The cell thickness was fixed to 3.0 μm. Then, the light absorption axis angle of the polarizer and the slow axis angle of the $\lambda/2$ plate at which the twist angle and black reflectivity were minimized were determined. However, as a result of verification using a test cell, the black reflectivity was 2% or more and was not reduced to the same level as that in the vertical electrical field mode, which is about 1%. Then, in order to lower the black reflectivity, addition of the $\lambda/4$ plate was further examined.

A configuration including a reflective liquid crystal panel, a polarizer, and a $\lambda/2$ plate and a $\lambda/4$ plate (A-plate (uniaxial phase difference plate)) was assumed, and the cell thickness was fixed to 3.0 μm. Then, the conditions of the twist angle, the light absorption axis angle of the polarizer, the slow axis angle and retardation of the $\lambda/2$ plate, and the slow axis angle and retardation of the $\lambda/4$ plate at which the black reflectivity was minimized were obtained by simulation. As a result, it was found that the black reflectivity was minimized when the twist angle was 74°.

Figure 6A:
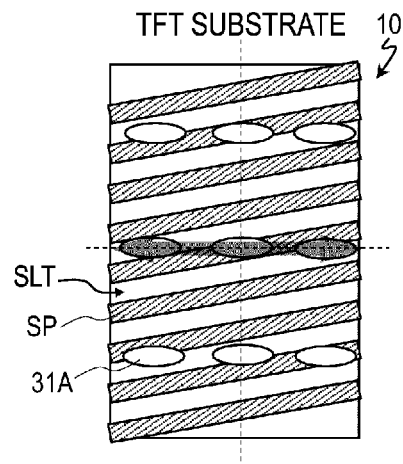
FIG. 6A is a diagram for explaining a mono-domain structure assumed in optical simulation and is a diagram in which a TFT substrate 10 is viewed from the first horizontal alignment film 19 side.
Figure 6B:
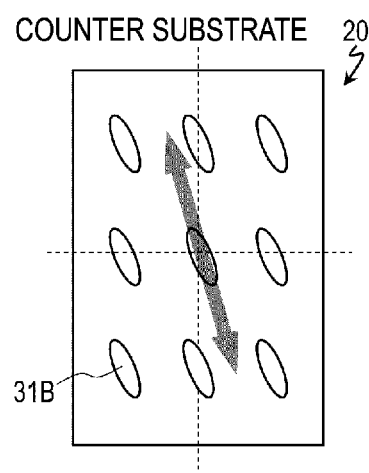
FIG. 6B is a diagram for explaining a mono-domain structure assumed in optical simulation and is a diagram in which a counter substrate 20 is viewed from the second horizontal alignment film 29 side.
Figure 6C:
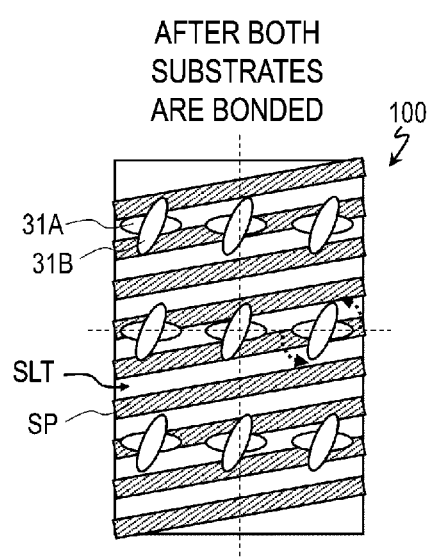
FIG. 6C is a diagram for explaining a mono-domain structure assumed in optical simulation and is also a diagram in which the liquid crystal display device 100 is illustrated when viewed from the counter substrate 20 side after the TFT substrate 10 and the counter substrate 20 are bonded to each other.

Preferable settings in the case where the liquid crystal material was positive-type were determined as follows. For the optical simulation, a liquid crystal cell having a mono-domain structure as illustrated in FIGS. 6A, 6B and 6C was assumed. FIG. 6A is a diagram of the TFT substrate 10 viewed from the first horizontal alignment film 19 side, and FIG. 6B is a diagram of the counter substrate 20 viewed from the second horizontal alignment film 29 side. FIG. 6C is a diagram of the liquid crystal display device 100 viewed from the counter substrate 20 side after the TFT substrate 10 and the counter substrate 20 are bonded to each other. In the following description, assuming that each of FIGS. 6A, 6B, and 6C is to be a watch dial, the 3 o'clock direction is taken as 0°, the clockwise direction is taken as being negative, and the counterclockwise direction is taken as being positive.

The orientation direction defined by the first horizontal alignment film 19 was set to 0°, and the direction in which each of belt-shaped portions SP of the upper layer electrode extends (which can also be referred to as the direction in which each of slits SLT extends) was set to +10°. The width of each belt-shaped portion SP was 1.6 μm, and the distance between two belt-shaped portions SP adjacent to each other was 3 μm. The orientation direction defined by the second horizontal alignment film 29 was set to +106° in FIG. 6B, and to +74° in FIG. 6C. In other words, the twist angle $\theta_1$ was set to +74°.

LCD Master 1D manufactured by SHINTECH Inc. was used; while the twist angle $\theta_1$ was fixed to 74°, the cell thickness, the angle of the light absorption axis 40AA of the polarizer 40, the angle of the slow axis 51SA and the retardation of the $\lambda/2$ plate 51, and the angle of the slow axis 52SA and the retardation of the $\lambda/4$ plate 52 at which the black reflectivity was minimized were determined as parameters. The calculation was repeated while changing only one of these six parameters and not changing the other parameters.

Figure 7:
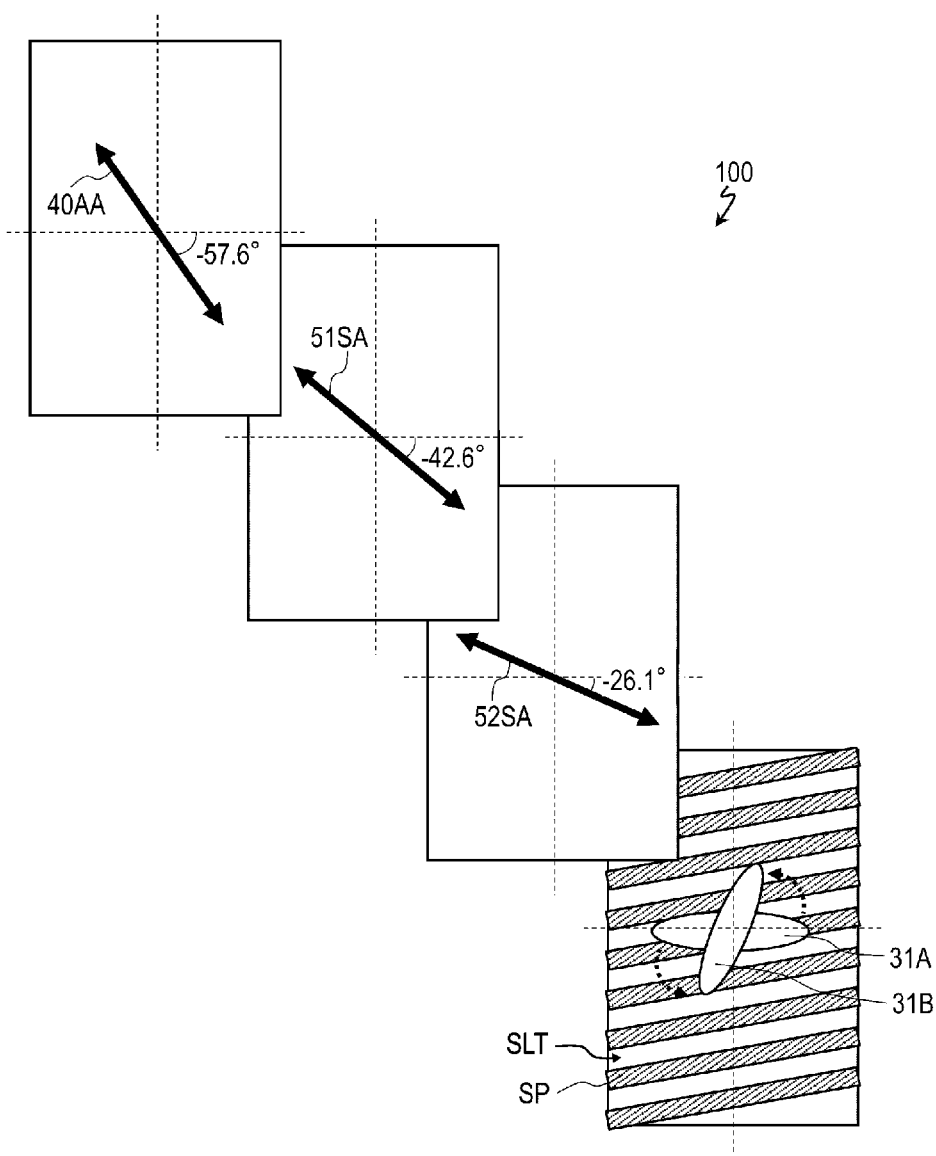
FIG. 7 is a diagram illustrating settings of optical axes of the polarizer 40, the λ/2 plate 51, and the λ/4 plate 52 in such a manner as to make black reflectivity minimized when a liquid crystal material is positive-type.

FIG. 7 illustrates the settings of optical axes of the polarizer 40, the $\lambda/2$ plate 51, and the $\lambda/4$ plate 52 in such a manner as to make black reflectivity minimized. As illustrated in FIG. 7, the optimum setting of the light absorption axis 40AA of the polarizer 40 was a −57.6° direction (in other words, +122.4° direction). The optimum setting of the slow axis 51SA of the $\lambda/2$ plate 51 was a −42.6° direction (in other words, +137.4° direction), and the optimum setting of the slow axis 52SA of the $\lambda/4$ plate 52 was a −26.1° direction (in other words, +153.9° direction).

Next, optical simulation was carried out using LCD Master 2D manufactured by SHINTECH Inc. as simulation software to examine preferable ranges of optical conditions.

Simulation was carried out by changing a value of a parameter of interest (a parameter for which a preferable range was to be obtained) with the optimum value (reference value) being centered while fixing other parameters to the optimum values. A graph was created in which the horizontal axis represented the parameter of interest and the vertical axis represented reflection mode efficiency at the time of black display and at the time of white display. The reflection mode efficiency is expressed by the following equation.

Reflection mode efficiency [%]=(luminance with polarizer)/(luminance without polarizer)×100

A correction process of shifting the reflection mode efficiency upward by 1% was performed on the obtained graph, and graphs in which the horizontal axis represented the parameter of interest and the vertical axis represented the contrast ratio were created from the graph after the correction process. The above-described correction process was performed considering that the reflectivity was expected to rise approximately 1% affected by interface reflection in the actual test cell (not considered in the optical simulation).

The graphs thus obtained are depicted in FIGS. 8 to 15. In Table 1 and Table 2, ranges where the contrast ratio is 5 or more, 10 or more, 20 or more, and 30 or more are depicted for each of the parameters.

the liquid crystal layer 30 (the orientation direction of the liquid crystal molecule 31 near the center in the thickness direction when no voltage is applied) is from 29.2° to 45.0°, from 32.0° to 42.1°, from 34.2° to 39.7°, and from 35.7° to 38.3°, respectively.

Figure 9:
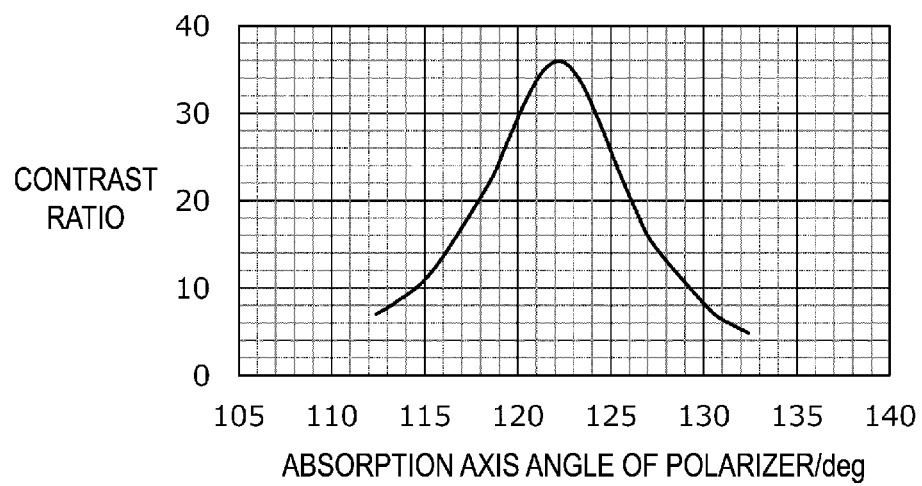
FIG. 9 is a graph depicting a relationship between an angle of the light absorption axis 40AA of the polarizer 40 and the contrast ratio.

From FIG. 9 and Table 1, it can be understood that the contrast ratios of 5 or more, 10 or more, 20 or more, and 30 or more may be achieved when the angle of the light absorption axis 40AA of the polarizer 40 is from 110.8° to 132.3°, from 114.4° to 129.3°, from 117.9° to 126.1°, and from 120.1° to 124.2°, respectively. In this case, the angle of the light absorption axis 40AA of the polarizer 40 can also be referred to as the angle $\theta_2$ formed by the light absorption axis 40AA with the orientation direction defined by the first horizontal alignment film 19 in the twist direction.

Figure 10:
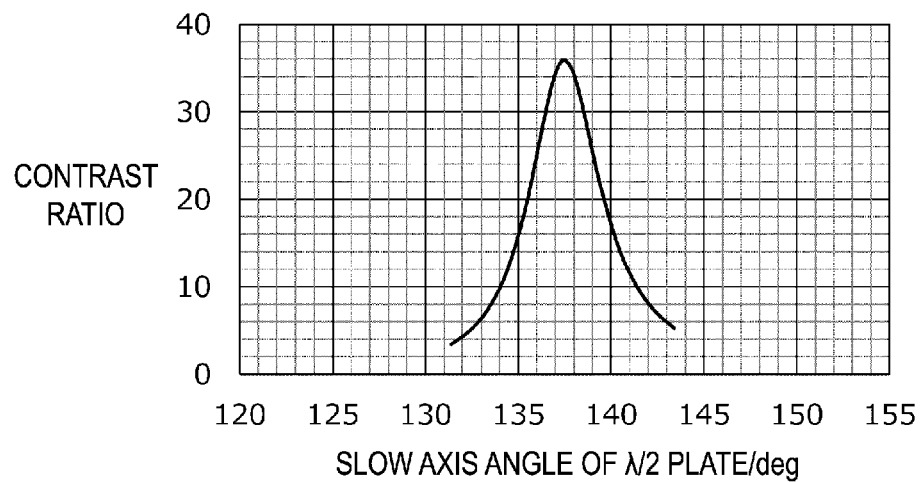
FIG. 10 is a graph depicting a relationship between an angle of the slow axis 51SA of the λ/2 plate 51 and the contrast ratio.

From FIG. 10 and Table 1, it can be understood that the contrast ratios of 5 or more, 10 or more, 20 or more, and 30 or more may be achieved when the angle of the slow axis 51SA of the λ/2 plate 51 is from 132.4° to 143.6°, from 134.0° to 141.4°, from 135.5° to 139.7°, and from 136.5° to 138.5°, respectively. In this case, the angle of the slow axis 51SA of the λ/2 plate 51 can also be referred to as the angle $\theta_3$ formed by the slow axis 51SA with the orientation direction defined by the first horizontal alignment film 19 in the twist direction.

Figure 11:
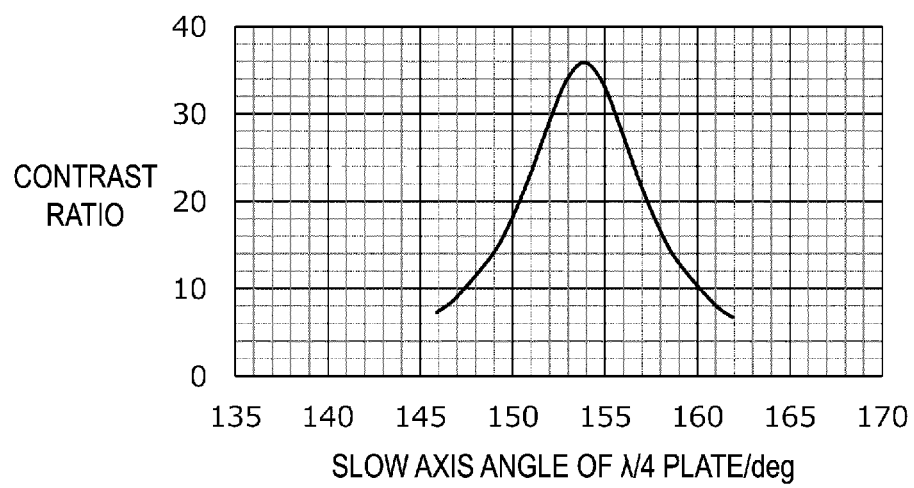
FIG. 11 is a graph depicting a relationship between an angle of the slow axis 52SA of the λ/4 plate 52 and the contrast ratio.

From FIG. 11 and Table 1, it can be understood that the contrast ratios of 5 or more, 10 or more, 20 or more, and 30

TABLE 1

|  | Reference value [deg] | Range of CR ratio being 5 or more | Range of CR ratio being 10 or more | Range of CR ratio being 20 or more | Range of CR ratio being 30 or more |
|---|---|---|---|---|---|
| Twist angle $\theta_1$ of liquid crystal layer | 74.0 | 58.3 to 89.9 | 64.0 to 84.3 | 68.4 to 79.4 | 71.4 to 76.6 |
| Alignment axis center of liquid crystal layer | 37.0 | 29.2 to 45.0 | 32.0 to 42.1 | 34.2 to 39.7 | 35.7 to 38.3 |
| Light absorption axis angle of polarizer (angle $\theta_2$) | 122.4 | 110.8 to 132.3 | 114.4 to 129.3 | 117.9 to 126.1 | 120.1 to 124.2 |
| Slow axis angle of λ/2 plate (angle $\theta_3$) | 137.4 | 132.4 to 143.6 | 134.0 to 141.4 | 135.5 to 139.7 | 136.5 to 138.5 |
| Slow axis angle of λ/4 plate (angle $\theta_4$) | 153.9 | 144.5 to 163.0 | 147.4 to 160.2 | 150.4 to 157.3 | 152.2 to 155.5 |
| Belt-shaped portion angle of upper layer electrode | 10.0 | −0.9 to 20.9 | 1.3 to 18.4 | 5.5 to 14.3 | 7.9 to 12.1 |

TABLE 2

|  | Reference value [nm] | Range of CR ratio being 5 or more | Range of CR ratio being 10 or more | Range of CR ratio being 20 or more | Range of CR ratio being 30 or more |
|---|---|---|---|---|---|
| Retardation Δn · d of liquid crystal layer | 217.5 | 152.3 to 285.8 | 176.9 to 260.8 | 195.8 to 240.5 | 207.0 to 228.5 |
| Retardation of λ/2 plate | 262.0 | 190.5 to 330.9 | 214.7 to 308.2 | 236.4 to 287.3 | 249.7 to 274.3 |
| Retardation of λ/4 plate | 112.0 | 0 to 293.0 | 0 to 264.6 | 28.2 to 207.7 | 74.4 to 157.5 |

Figure 8:
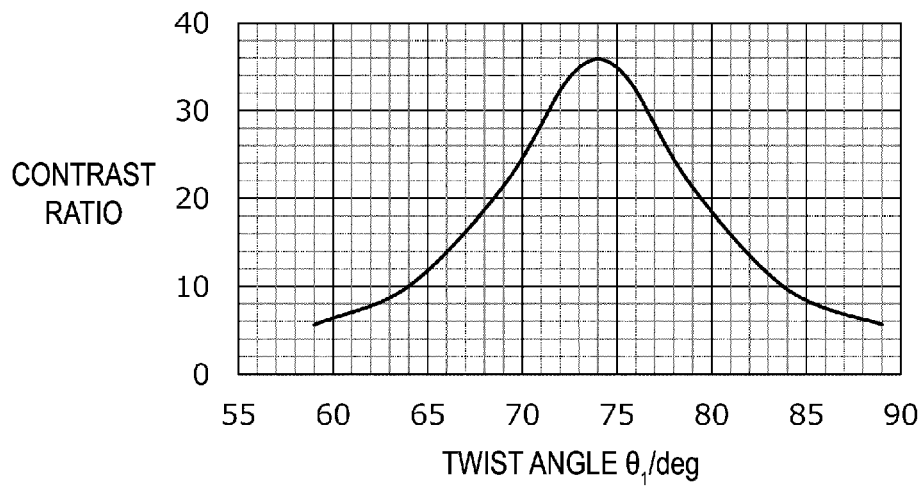
FIG. 8 is a graph depicting a relationship between a twist angle $\theta_1$ of a liquid crystal layer 30 and a contrast ratio.

It can be understood from FIG. 8 and Table 1 that the contrast ratios of 5 or more, 10 or more, 20 or more, and 30 or more may be achieved when the twist angle $\theta_1$ of the liquid crystal layer 30 is from 58.3° to 89.9°, from 64.0° to 84.3°, from 68.4° to 79.4°, and from 71.4° to 76.6°, respectively.

In addition, it can be understood from Table 1 that the contrast ratios of 5 or more, 10 or more, 20 or more, and 30 or more may be achieved when an alignment axis center of or more may be achieved when the angle of the slow axis 52SA of the λ/4 plate 52 is from 144.5° to 163.0°, from 147.4° to 160.2°, from 150.4° to 157.3°, and from 152.2° to 155.5°, respectively. In this case, the angle of the slow axis 52SA of the λ/4 plate 52 can also be referred to as the angle $\theta_4$ formed by the slow axis 52SA with the orientation direction defined by the first horizontal alignment film 19 in the twist direction.

Figure 12:
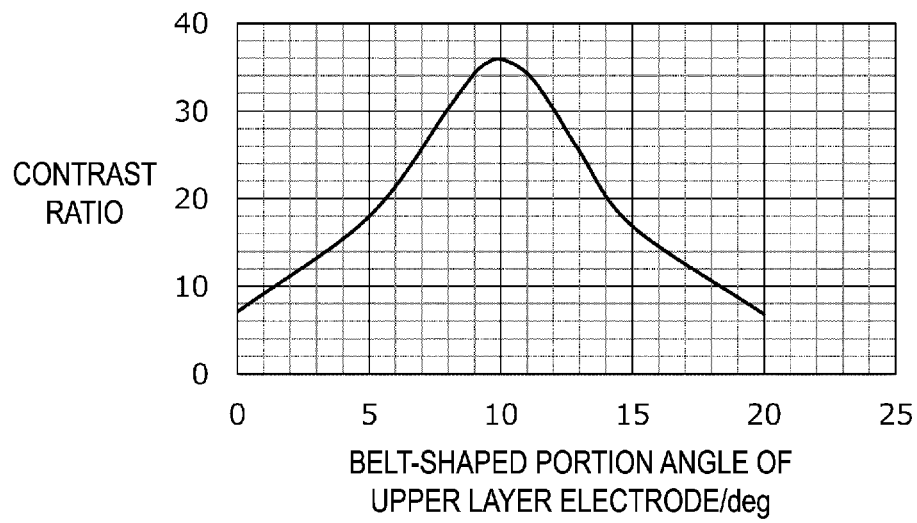
FIG. 12 is a graph depicting a relationship between an angle of a belt-shaped portion SP of an upper layer electrode and the contrast ratio.

From FIG. 12 and Table 1, it can be understood that the contrast ratios of 5 or more, 10 or more, 20 or more, and 30 or more may be achieved when the angle (extending direction) of the belt-shaped portion SP of the upper layer electrode is from −0.9° to 20.9°, from 1.3° to 18.4°, from 5.5° to 14.3°, and from 7.9° to 12.1°, respectively.

Figure 13:
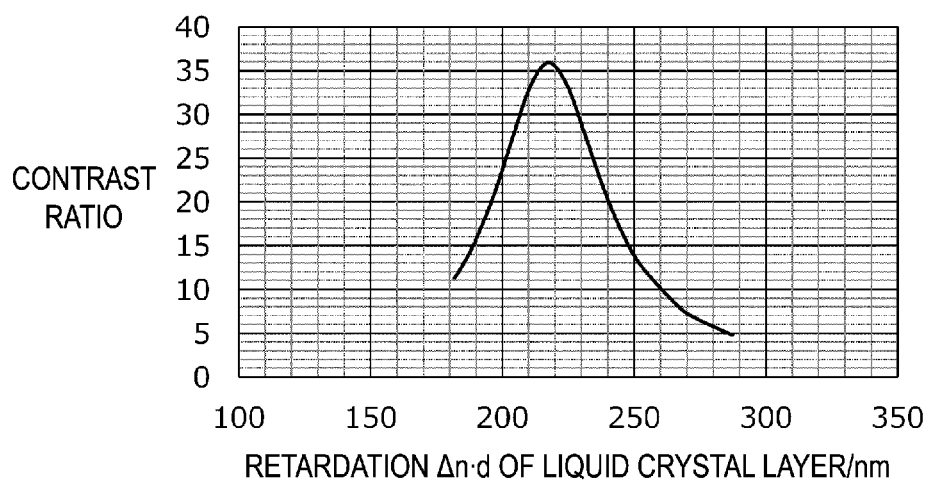
FIG. 13 is a graph depicting a relationship between retardation Δn·d of the liquid crystal layer 30 and the contrast ratio.

From FIG. 13 and Table 2, it can be understood that the contrast ratios of 5 or more, 10 or more, 20 or more, and 30 or more may be achieved when the retardation Δn·d of the liquid crystal layer 30 is from 152.3 nm to 285.8 nm, from 176.9 nm to 260.8 nm, from 195.8 nm to 240.5 nm, and from 207.0 nm to 228.5 nm, respectively.

Figure 14:
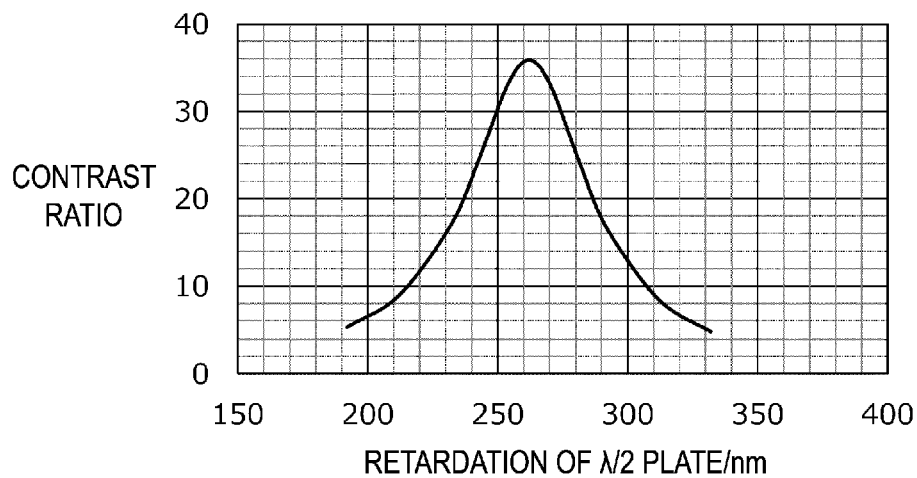
FIG. 14 is a graph depicting a relationship between retardation of the λ/2 plate 51 and the contrast ratio.

From FIG. 14 and Table 2, it can be understood that the contrast ratios of 5 or more, 10 or more, 20 or more, and 30 or more may be achieved when the retardation of the λ/2 plate 51 is from 190.5 nm to 330.9 nm, from 214.7 nm to 308.2 nm, from 236.4 nm to 287.3 nm, and from 249.7 to 274.3 nm, respectively.

Figure 15:
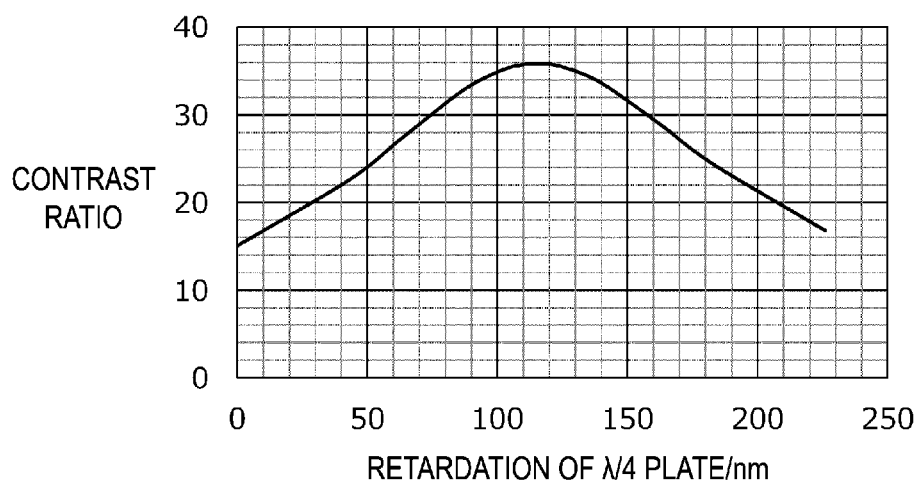
FIG. 15 is a graph depicting a relationship between retardation of the λ/4 plate 52 and the contrast ratio.

From FIG. 15 and Table 2, it can be understood that the contrast ratios of 5 or more, 10 or more, 20 or more, and 30 or more may be achieved when the retardation of the λ/4 plate 52 is from 0 nm to 293.0 nm, from 0 nm to 264.6 nm, from 28.2 nm to 207.7 nm, and from 74.4 nm to 157.5 nm, respectively.

Figure 16A:
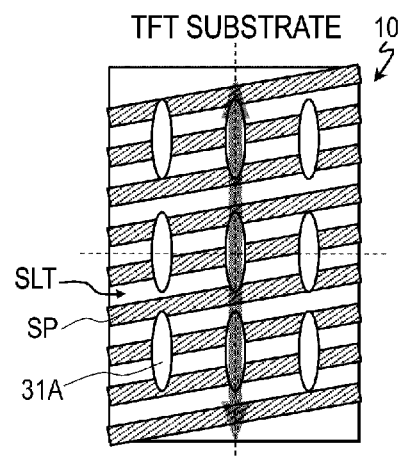
FIG. 16A is a diagram for explaining a mono-domain structure assumed in optical simulation and is a diagram in which the TFT substrate 10 is viewed from the first horizontal alignment film 19 side.
Figure 16B:
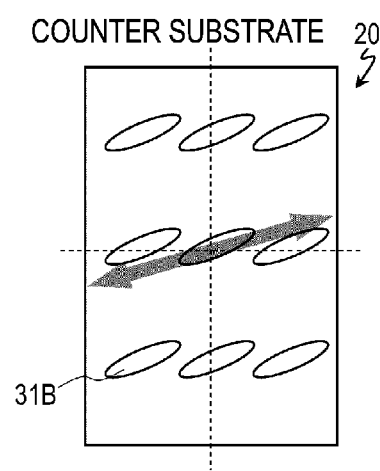
FIG. 16B is a diagram for explaining a mono-domain structure assumed in optical simulation and is a diagram in which the counter substrate 20 is viewed from the second horizontal alignment film 29 side.
Figure 16C:
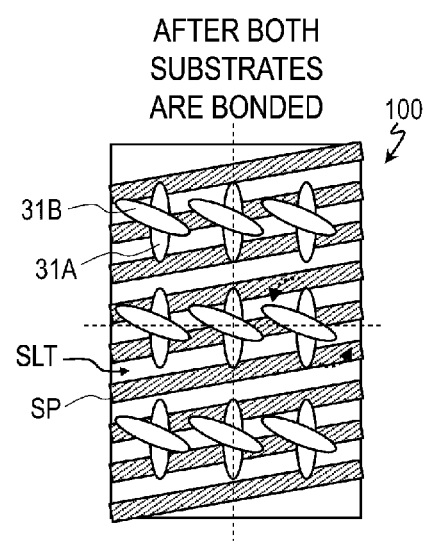
FIG. 16C is a diagram for explaining a mono-domain structure assumed in optical simulation and is also a diagram in which the liquid crystal display device 100 is illustrated when viewed from the counter substrate 20 side after the TFT substrate 10 and the counter substrate 20 are bonded to each other.

Subsequently, preferable settings when the liquid crystal material was negative-type were determined as follows. For the optical simulation, a liquid crystal cell having a mono-domain structure as illustrated in FIGS. 16A, 16B, and 16C was assumed. FIG. 16A is a diagram of the TFT substrate 10 viewed from the first horizontal alignment film 19 side, and FIG. 16B is a diagram of the counter substrate 20 viewed from the second horizontal alignment film 29 side. FIG. 16C is a diagram of the liquid crystal display device 100 viewed from the counter substrate 20 side after the TFT substrate 10 and the counter substrate 20 are bonded to each other.

The orientation direction defined by the first horizontal alignment film 19 was set to 90°, and the direction in which each of the belt-shaped portions SP of the upper layer electrode extends (which can also be referred to as the direction in which each of the slits SLT extends) was set to +10°. The width of each belt-shaped portion SP was 1.6 μm, and the distance between two belt-shaped portions SP adjacent to each other was 3 μm. The orientation direction defined by the second horizontal alignment film 29 was set to +160 in FIG. 16B, and to +1640 in FIG. 16C. In other words, the twist angle θ₁ was set to +74°.

LCD Master 1D manufactured by SHINTECH Inc. was used; while the twist angle θ₁ was fixed to 74°, the cell thickness, the angle of the light absorption axis 40AA of the polarizer 40, the angle of the slow axis 51SA and the retardation of the λ/2 plate 51, and the angle of the slow axis 52SA and the retardation of the λ/4 plate 52 at which the black reflectivity was minimized were determined as parameters. The calculation was repeated while changing only one of these six parameters and not changing the other parameters.

Figure 17:
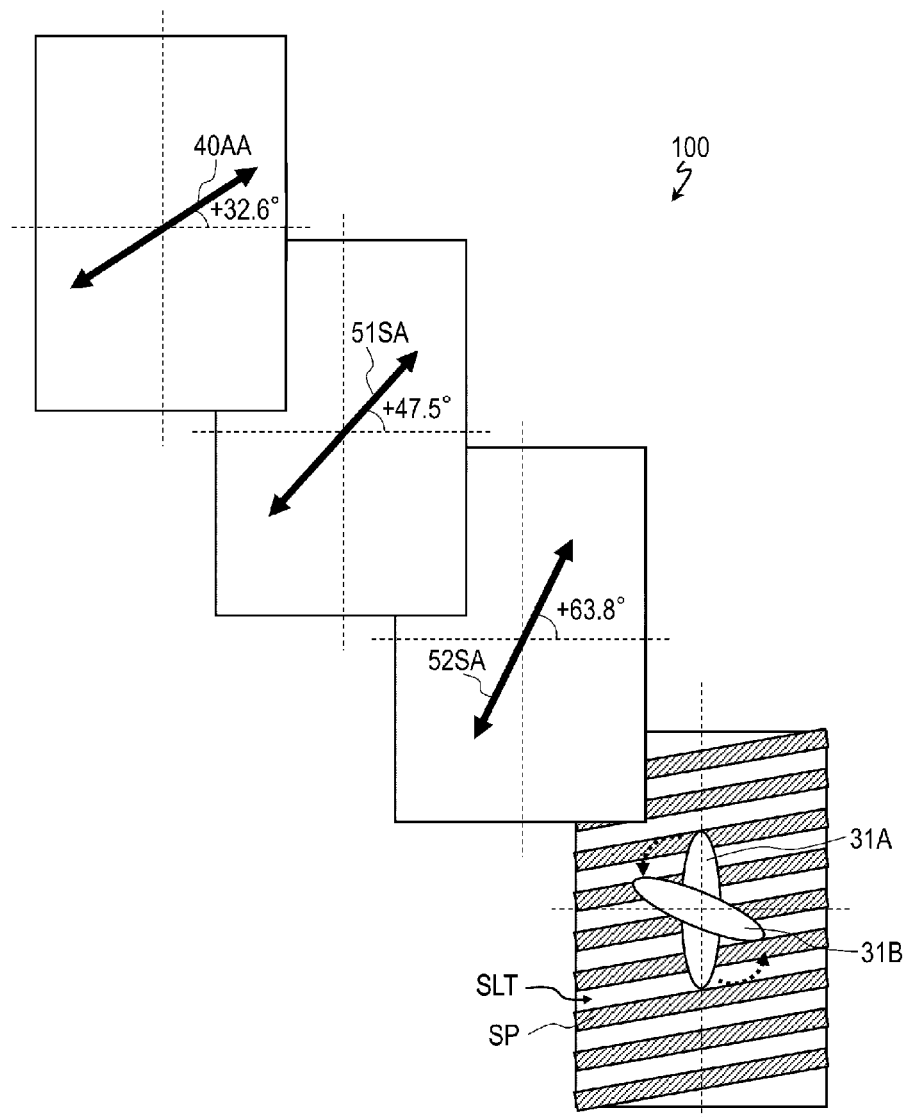
FIG. 17 is a diagram illustrating settings of optical axes of the polarizer 40, the λ/2 plate 51, and the λ/4 plate 52 in such a manner as to make black reflectivity minimized when a liquid crystal material is negative-type.

FIG. 17 illustrates the settings of the optical axes of the polarizer 40, the λ/2 plate 51, and the λ/4 plate 52 in such a manner as to minimize the black reflectivity. As illustrated in FIG. 17, the optimum setting of the light absorption axis 40AA of the polarizer 40 was a +32.6° direction. The optimum setting of the slow axis 51SA of the λ/2 plate 51 was a +47.5° direction, and the optimum setting of the slow axis 52SA of the λ/4 plate 52 was a +63.8° direction.

Next, optical simulation was carried out using LCD Master 2D manufactured by SHINTECH Inc. as simulation software to examine preferable ranges of optical conditions.

Simulation was carried out by changing a value of a parameter of interest (a parameter for which a preferable range was to be obtained) with the optimum value (reference value) being centered while fixing other parameters to the optimum values. A graph was created in which the horizontal axis represented the parameter of interest and the vertical axis represented reflection mode efficiency at the time of black display and at the time of white display.

A correction process of shifting the reflection mode efficiency upward by 1% was performed on the obtained graph, and graphs in which the horizontal axis represented the parameter of interest and the vertical axis represented the contrast ratio were created from the graph after the correction process.

The graphs thus obtained are depicted in FIGS. 18 to 25. In Table 3 and Table 4, ranges where the contrast ratio is 5 or more, 10 or more, 20 or more, and 30 or more are depicted for each of the parameters.

TABLE 3

|  | Reference value [deg] | Range of CR ratio being 5 or more | Range of CR ratio being 10 or more | Range of CR ratio being 20 or more | Range of CR ratio being 30 or more |
|---|---|---|---|---|---|
| Twist angle θ₁ of liquid crystal layer | 74.0 | 58.5 to 89.6 | 63.8 to 84.3 | 68.1 to 80.0 | 71.0 to 77.0 |
| Alignment axis center of liquid crystal layer | 37.0 | 29.2 to 44.8 | 31.9 to 42.2 | 34.0 to 40.0 | 35.5 to 38.5 |
| Light absorption axis angle of polarizer | 32.6 | 21.3 to 43.8 | 25.1 to 40.4 | 28.4 to 37.0 | 30.4 to 35.0 |
| Angle θ₂ | 122.6 | 111.3 to 133.8 | 115.1 to 130.4 | 118.4 to 127.0 | 120.4 to 125.0 |
| Slow axis angle of λ/2 plate | 47.5 | 41.4 to 53.3 | 43.5 to 51.3 | 45.2 to 49.6 | 46.3 to 48.6 |
| Angle θ₃ | 137.5 | 131.4 to 143.3 | 133.5 to 141.3 | 135.2 to 139.6 | 136.3 to 138.6 |
| Slow axis angle of λ/4 plate | 63.8 | 53.1 to 74.1 | 57.0 to 70.4 | 60.1 to 67.5 | 61.9 to 65.8 |
| Angle θ₄ | 153.8 | 143.1 to 164.1 | 147.0 to 160.4 | 150.1 to 157.5 | 151.9 to 155.8 |
| Belt-shaped portion angle of upper layer electrode | 10.0 | −1.0 to 21.1 | 1.3 to 18.5 | 5.5 to 14.3 | 7.6 to 12.2 |

TABLE 4

| | Reference value [nm] | Range of CR ratio being 5 or more | Range of CR ratio being 10 or more | Range of CR ratio being 20 or more | Range of CR ratio being 30 or more |
|---|---|---|---|---|---|
| Retardation Δn·d of liquid crystal layer | 217.1 | 151.2 to 285.1 | 175.9 to 259.3 | 193.8 to 240.5 | 204.7 to 229.4 |
| Retardation of λ/2 plate | 261.0 | 188.5 to 334.4 | 213.9 to 310.3 | 234.7 to 288.9 | 247.4 to 275.9 |
| Retardation of λ/4 plate | 112.0 | 0 to 286.2 | 0 to 259.1 | 17.8 to 204.8 | 64.0 to 158.2 |

Figure 18:
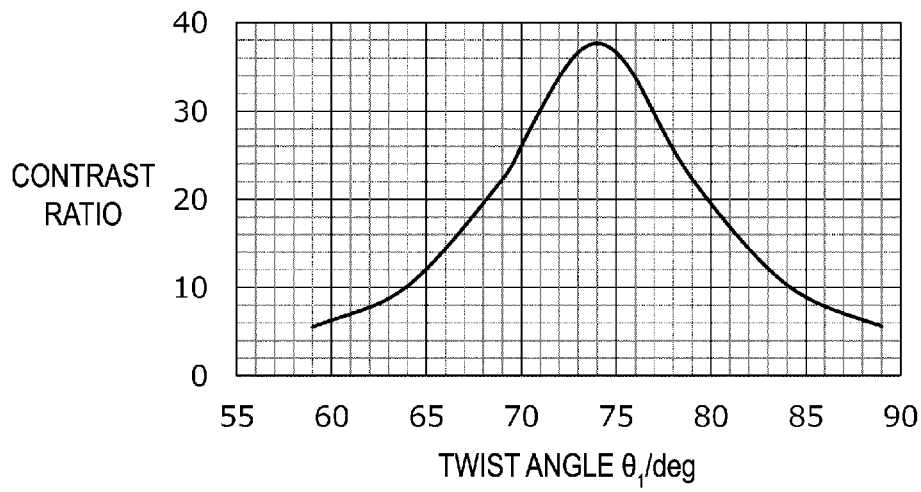
FIG. 18 is a graph depicting a relationship between the twist angle $\theta_1$ of the liquid crystal layer 30 and the contrast ratio.

From FIG. 18 and Table 3, it can be understood that the contrast ratios of 5 or more, 10 or more, 20 or more, and 30 or more may be achieved when the twist angle $\theta_1$ of the liquid crystal layer 30 is from 58.5° to 89.6°, from 63.8° to 84.3°, from 68.1° to 80.0°, and from 71.0° to 77.0°, respectively.

In addition, it can be understood from Table 3 that the contrast ratios of 5 or more, 10 or more, 20 or more, and 30 or more may be achieved when the alignment axis center of the liquid crystal layer 30 (the orientation direction of the liquid crystal molecule 31 near the center in the thickness direction when no voltage is applied) is from 29.2° to 44.8°, from 31.9° to 42.2°, from 34.0° to 40.0°, and from 35.5° to 38.5°, respectively.

Figure 19:
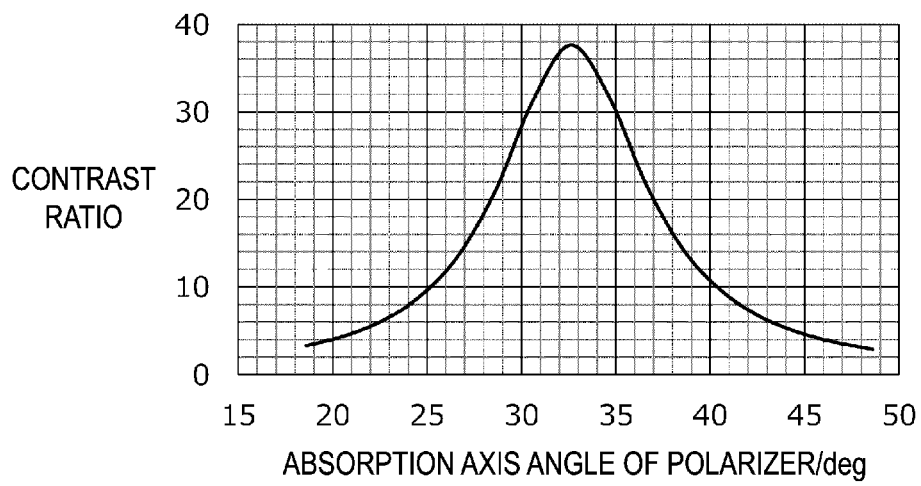
FIG. 19 is a graph depicting a relationship between an angle of the light absorption axis 40AA of the polarizer 40 and the contrast ratio.

From FIG. 19 and Table 3, it can be understood that the contrast ratios of 5 or more, 10 or more, 20 or more, and 30 or more may be achieved when the angle of the light absorption axis 40AA of the polarizer 40 is from 21.3° to 43.8°, from 25.1° to 40.4°, from 28.4° to 37.0°, and from 30.4° to 35.0°, respectively.

Here, an angle obtained by adding 90° to the angle of the light absorption axis 40AA of the polarizer 40 is the angle $\theta_2$ formed by the light absorption axis 40AA with the orientation direction defined by the first horizontal alignment film 19 in the twist direction. Accordingly, the contrast ratios of 5 or more, 10 or more, 20 or more, and 30 or more may be achieved when the angle $\theta_2$ is from 111.30 to 133.8°, from 115.10 to 130.4°, from 118.4° to 127.0°, and from 120.4° to 125.0°, respectively.

Figure 20:
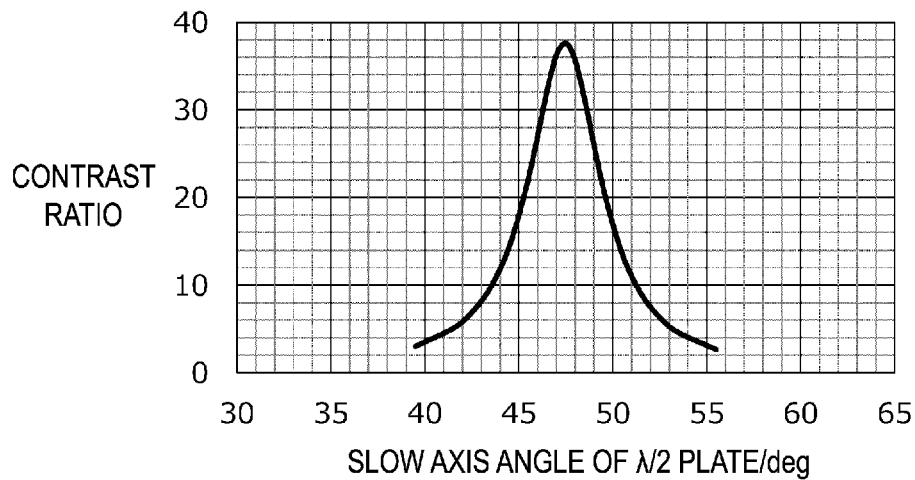
FIG. 20 is a graph depicting a relationship between an angle of the slow axis 51SA of the λ/2 plate 51 and the contrast ratio.

From FIG. 20 and Table 3, it can be understood that the contrast ratios of 5 or more, 10 or more, 20 or more, and 30 or more may be achieved when the angle of the slow axis 51SA of the λ/2 plate 51 is from 41.4° to 53.3°, from 43.5° to 51.3°, from 45.2° to 49.6°, and from 46.3° to 48.6°, respectively.

Here, an angle obtained by adding 90° to the angle of the slow axis 51SA of the λ/2 plate 51 is the angle $\theta_3$ formed by the slow axis 51SA with the orientation direction defined by the first horizontal alignment film 19 in the twist direction. Accordingly, the contrast ratios of 5 or more, 10 or more, 20 or more, and 30 or more may be achieved when the angle $\theta_3$ is from 131.4° to 143.3°, from 133.5° to 141.3°, from 135.2° to 139.6°, and from 136.3° to 138.6°, respectively.

Figure 21:
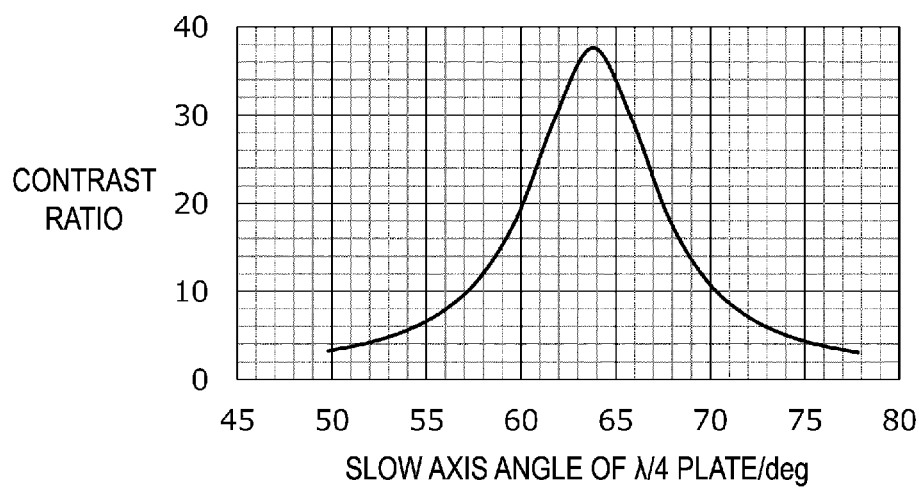
FIG. 21 is a graph depicting a relationship between an angle of the slow axis 52SA of the λ/4 plate 52 and the contrast ratio.

From FIG. 21 and Table 3, it can be understood that the contrast ratios of 5 or more, 10 or more, 20 or more, and 30 or more may be achieved when the angle of the slow axis 52SA of the λ/4 plate 52 is from 53.10 to 74.10, from 57.0° to 70.4°, from 60.10 to 67.5°, and from 61.9° to 65.8°, respectively.

Here, an angle obtained by adding 90° to the angle of the slow axis 52SA of the λ/4 plate 52 is the angle $\theta_4$ formed by the slow axis 52SA with the orientation direction defined by the first horizontal alignment film 19 in the twist direction. Accordingly, the contrast ratios of 5 or more, 10 or more, 20 or more, and 30 or more may be achieved when the angle $\theta_4$ is from 143.10 to 164.10, from 147.0° to 160.4°, from 150.10 to 157.5°, and from 151.9° to 155.8°, respectively.

Figure 22:
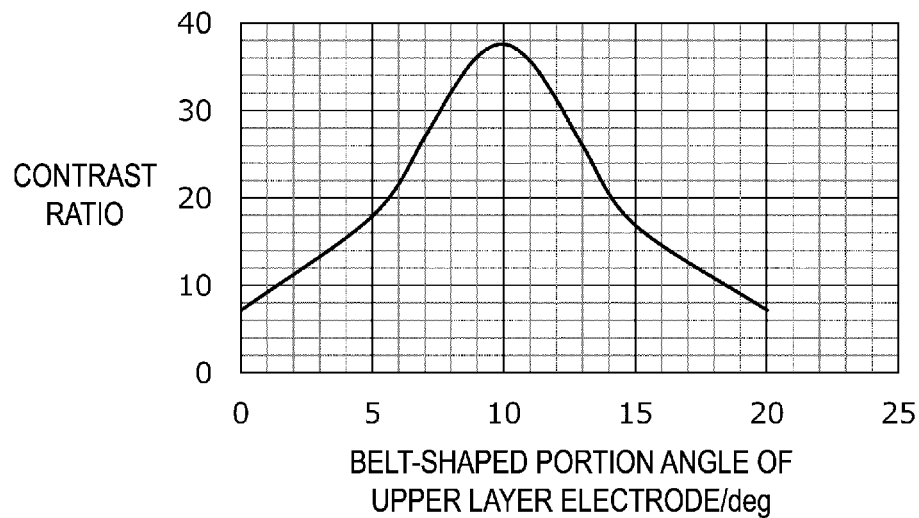
FIG. 22 is a graph depicting a relationship between an angle of the belt-shaped portion SP of the upper layer electrode and the contrast ratio.

From FIG. 22 and Table 3, it can be understood that the contrast ratios of 5 or more, 10 or more, 20 or more, and 30 or more may be achieved when the angle (extending direction) of the belt-shaped portion SP of the upper layer electrode is from −1.0° to 21.1°, from 1.3° to 18.5°, from 5.5° to 14.3°, and from 7.6° to 12.2°, respectively.

Figure 23:
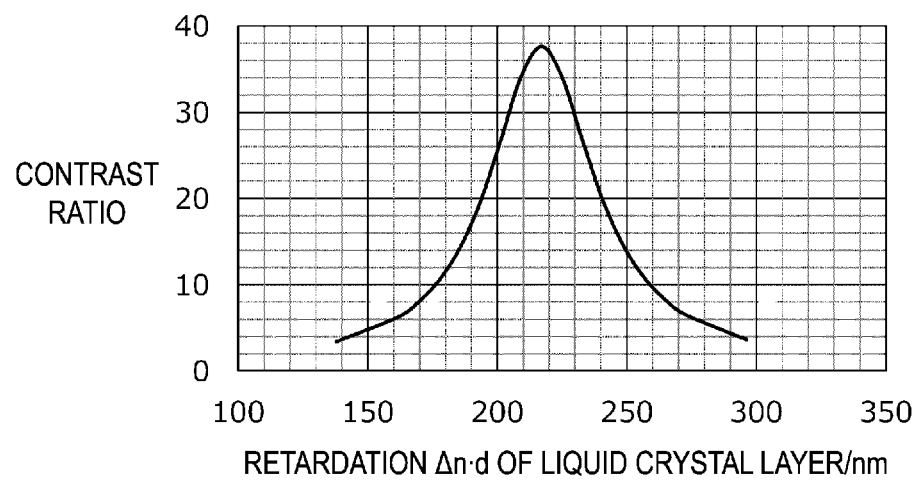
FIG. 23 is a graph depicting a relationship between retardation Δn·d of the liquid crystal layer 30 and the contrast ratio.

From FIG. 23 and Table 4, it can be understood that the contrast ratios of 5 or more, 10 or more, 20 or more, and 30 or more may be achieved when the retardation Δn·d of the liquid crystal layer 30 is from 151.2 nm to 285.1 nm, from 175.9 nm to 259.3 nm, from 193.8 nm to 240.5 nm, and from 204.7 nm to 229.4 nm, respectively.

Figure 24:
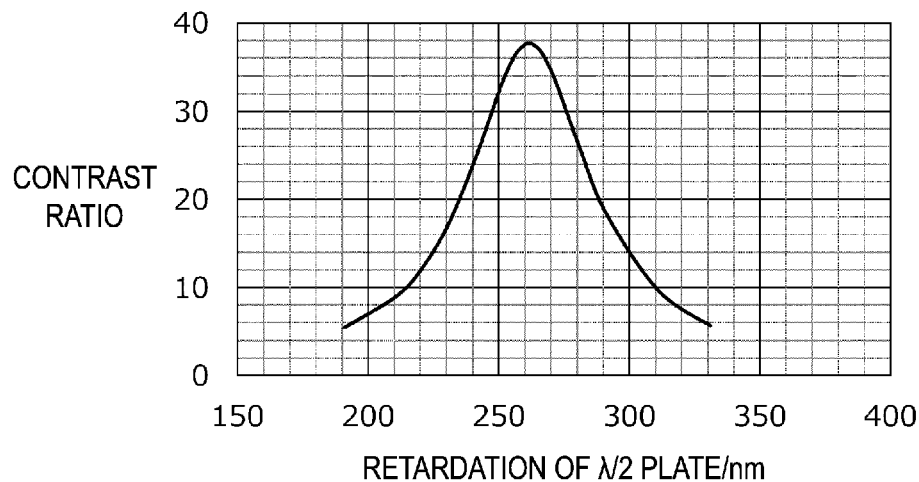
FIG. 24 is a graph depicting a relationship between retardation of the λ/2 plate 51 and the contrast ratio.

From FIG. 24 and Table 4, it can be understood that the contrast ratios of 5 or more, 10 or more, 20 or more, and 30 or more may be achieved when the retardation of the λ/2 plate 51 is from 188.5 nm to 334.4 nm, from 213.9 nm to 310.3 nm, from 234.7 nm to 288.9 nm, and from 247.4 nm to 275.9 nm, respectively.

Figure 25:
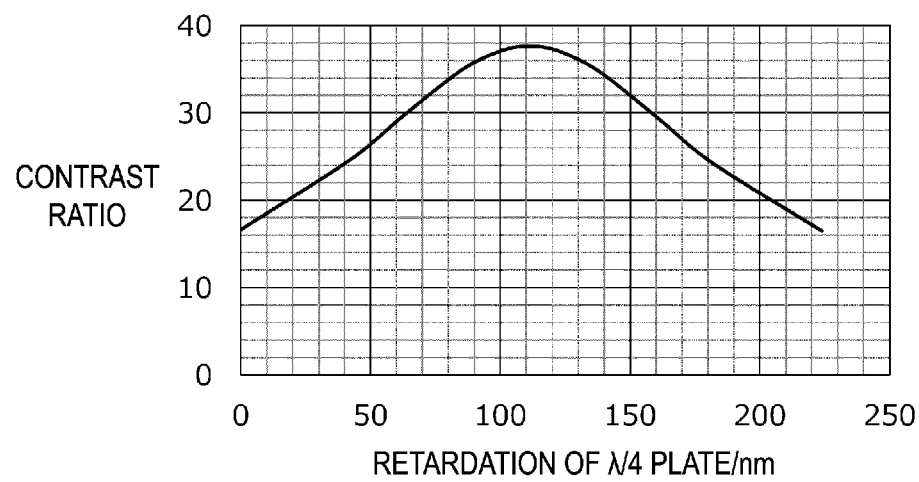
FIG. 25 is a graph depicting a relationship between retardation of the λ/4 plate 52 and the contrast ratio.

Further, from FIG. 25 and Table 4, it can be understood that the contrast ratios of 5 or more, 10 or more, 20 or more, and 30 or more may be achieved when the retardation of the λ/4 plate 52 is from 0 nm to 286.2 nm, from 0 nm to 259.1 nm, from 17.8 nm to 204.8 nm, and from 64.0 nm to 158.2 nm, respectively.

Verification Results by Test Cells

Next, test cells were experimentally produced and reflection mode efficiency was verified. The results of the verification are described below.

Figure 26A:
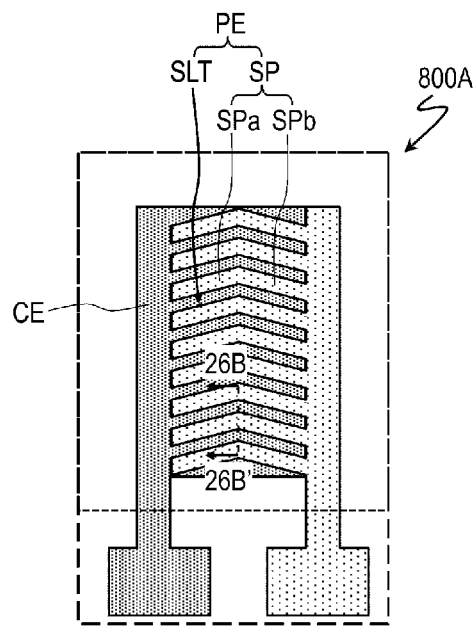
FIG. 26A is a plan view illustrating a test cell 800A used for verification of reflection mode efficiency.
Figure 26B:
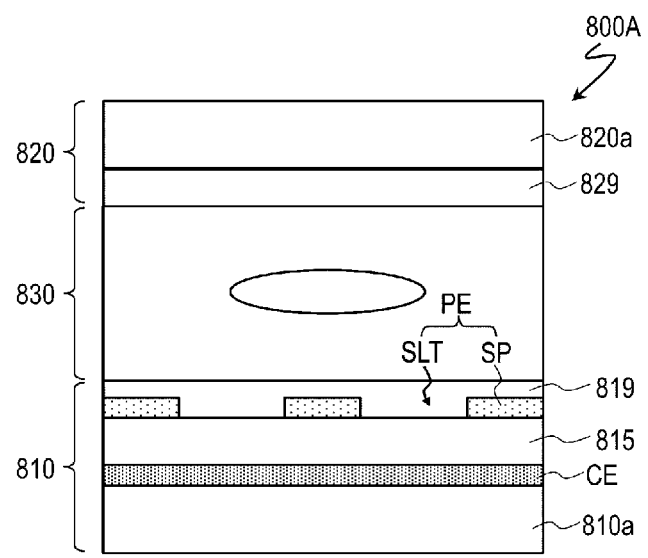
FIG. 26B is a cross-sectional view of the test cell 800A, illustrating a cross section taken along a line 26B-26B' in FIG. 26A.

First, the structure of a test cell 800A will be described with reference to FIGS. 26A and 26B. FIG. 26A is a plan view illustrating the test cell 800A. FIG. 26B is a cross-sectional view of the test cell 800A, illustrating a cross section taken along a line 26B-26B' in FIG. 26A.

The test cell 800A includes a back face substrate 810, a front face substrate 820, and a liquid crystal layer 830 provided between the back face substrate 810 and the front face substrate 820.

The back face substrate 810 includes a glass substrate 810a; and a common electrode CE, an interlayer insulating layer 815, a pixel electrode PE, and a first horizontal alignment film 819, which are layered in that order on the glass substrate 810a. The common electrode CE is formed of ITO. The thickness of the common electrode CE is 100 nm. The interlayer insulating layer 815 is formed of silicon nitride (SiNx). The thickness of the interlayer insulating layer 815 is 300 nm.

The pixel electrode PE is formed of ITO. The thickness of the pixel electrode PE is 100 nm. The pixel electrode PE includes a plurality of belt-shaped portions SP and a plurality of slits SLT. The width of each belt-shaped portion SP is 3 μm, and the width of each slit SLT (a distance between two belt-shaped portions SP adjacent to each other) is 5 μm. Each belt-shaped portion SP is bent in a dogleg shape. That is, each belt-shaped portion SP includes a first portion SPa extending in a certain direction (first direction) and a second portion SPb extending in a direction (second direction) different from the first direction. A bending angle (an angle formed by each of the first portion SPa and the second portion SPb of the belt-shaped portion SP with respect to the left-right direction in FIG. 26A) is 7°.

The front face substrate 820 includes a glass substrate 820a and a second horizontal alignment film 829 provided on the glass substrate 820a.

The thickness (cell gap) of the liquid crystal layer 830 is defined by plastic beads (not illustrated).

With respect to the test cell 800 having such structure, the retardation of the liquid crystal layer 830 was first measured using a polarimeter (AxoScan manufactured by Axometrics Inc.). Subsequently, the cell gap was measured using a cell gap inspection device (RetQC manufactured by Otsuka Electronics Co., Ltd.).

Figure 27A:
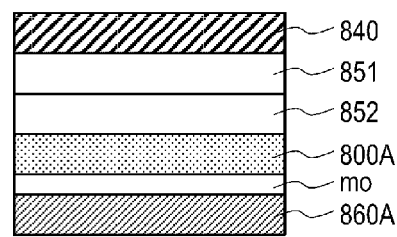
FIG. 27A is a diagram illustrating a layered structure at a time of reflectivity measurement regarding the test cell 800A.

Next, as illustrated in FIG. 27A, a λ/4 plate 852, a λ/2 plate 851, and a polarizer 840 were bonded to the front face substrate 820 side of the test cell 800A in that order. NZF UF01A (retardation: 110 nm) manufactured by Nitto Denko Corporation was used as the λ/4 plate 852, NZF UF01A (retardation: 260 nm) manufactured by Nitto Denko Corporation was used as the λ/2 plate 851, and NPF CRT1794KDUHC3 manufactured by Nitto Denko Corporation was used as the polarizer 840. Thereafter, one drop of matching oil mo for reducing loss due to interface reflection was dropped on a reflector 860A having an uneven surface structure (MRS), and then the test cell 800A was placed on the reflector 860A with the back face substrate 810 side facing downward. In this state, a voltage applied between the pixel electrode PE and the common electrode CE was changed to measure the reflectivity. The voltage application to the pixel electrode PE and the common electrode CE was performed using a function generator (AFG1022 manufactured by TEKTRONIX Inc.) capable of applying a voltage of 0 V to 10 V with a rectangular wave of 30 Hz. The reflectivity was measured using a spectrophotometer (CM-2600d manufactured by MINOLTA Co., Ltd.).

Figure 27B:
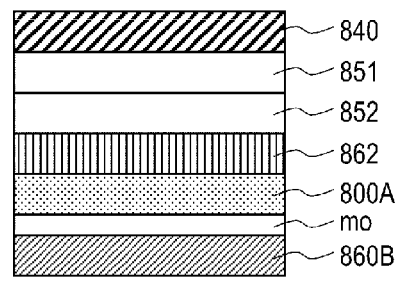
FIG. 27B is a diagram illustrating a layered structure at the time of reflectivity measurement regarding the test cell 800A.
Figure 27C:
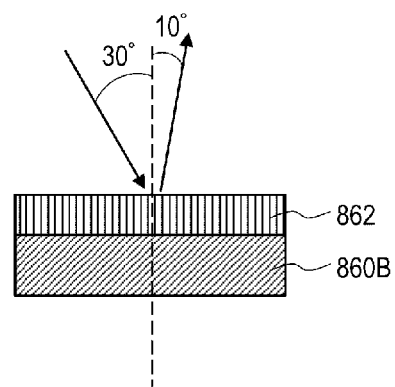
FIG. 27C is a diagram for explaining a function of a light control film 862.

The reflectivity measurement as described above was also performed on a configuration illustrated in FIG. 27B. The configuration illustrated in FIG. 27B is different from the configuration illustrated in FIG. 27A in that a reflector 860B with no MRS is used and a light control film 862 is provided between the test cell 800A and the λ/4 plate 852. As illustrated in FIG. 27C, the light control film 862 is a scattering film that reflects incident light from a direction inclined by 30° relative to the normal direction, in a direction inclined by 10° relative to the normal direction.

The alignment treatment on the first horizontal alignment film 819 and the second horizontal alignment film 829 was performed by optical alignment treatment or rubbing treatment.

In the case of using the optical alignment treatment, an optical alignment film material of a photodecomposition type was used. The optical alignment film material was applied by spin coating, and the thickness of the alignment film was 100 nm. Non-polarized UV light emitted from a UV lamp unit was converted into polarized UV light by a wire grid polarizing plate, and the alignment film was irradiated with the polarized UV light, thereby performing the optical alignment treatment. An extinction ratio by the wire grid polarizing plate was 100:1. The wavelength of the UV light was in a range from 220 nm to 260 nm, and irradiation energy was 300 mJ/cm². The orientation direction of the liquid crystal molecule is a direction orthogonal to the polarization direction of the polarized UV light (transmission axis azimuthal direction of the wire grid polarizing plate).

When the rubbing treatment was used, the alignment treatment was performed by rubbing the formed alignment film with a rubbing roller. As an alignment film material for rubbing treatment, a polyimide-based material is preferable, and a material in which a pre-tilt is not generated by rubbing treatment is commercially available. The orientation direction of the liquid crystal molecules is a direction parallel to the rubbing direction.

Examples 1 and 2 were verified using the test cell 800A.

Figure 28:
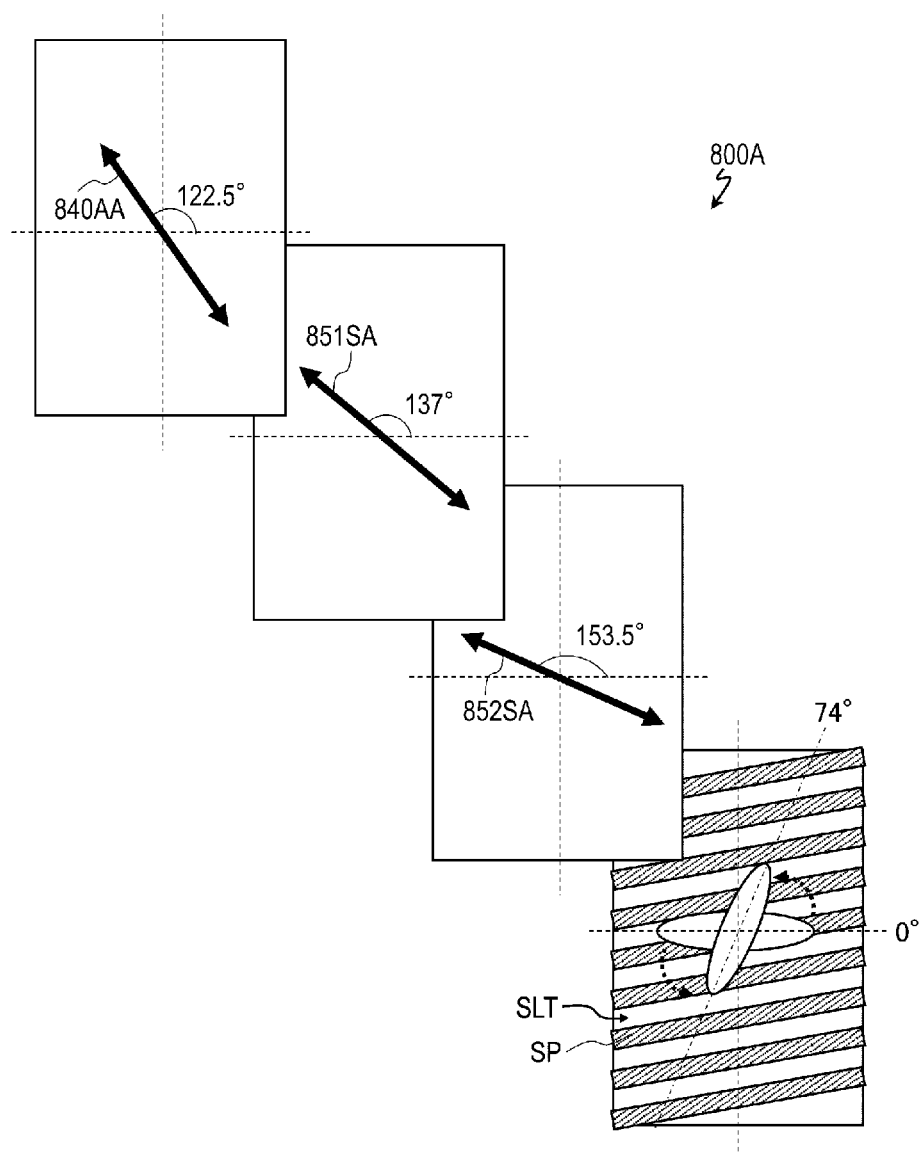
FIG. 28 is a diagram illustrating optical axis settings in Example 1.

In Example 1, the liquid crystal material is positive-type, and the display mode is a TW-FFS mode. In FIG. 28 and Table 5, optical axis settings and specifications of Example 1 are illustrated. As illustrated in FIG. 28 and Table 5, the angle of a light absorption axis 840AA of the polarizer 840 was 122.5°, the angle of a slow axis 851SA of the λ/2 plate 851 was 137°, and the angle of a slow axis 852SA of the λ/4 plate 852 was 153.5°.

TABLE 5

| | Example 1 |
|---|---|
| Liquid crystal material/Display mode | Positive-type/TW-FFS |
| Orientation direction by first horizontal alignment film | 0° |
| Orientation direction by second horizontal alignment film | 74° |
| Twist angle | 74° |
| Light absorption axis angle of polarizer | 122.5° |
| Slow axis angle of λ/2 plate | 137° |
| Slow axis angle of λ/4 plate | 153.5° |
| Belt-shaped portion width of pixel electrode | 3 μm |
| Slit width of pixel electrode | 5 μm |
| Bending angle of belt-shaped portion | 7° |

Figure 29:
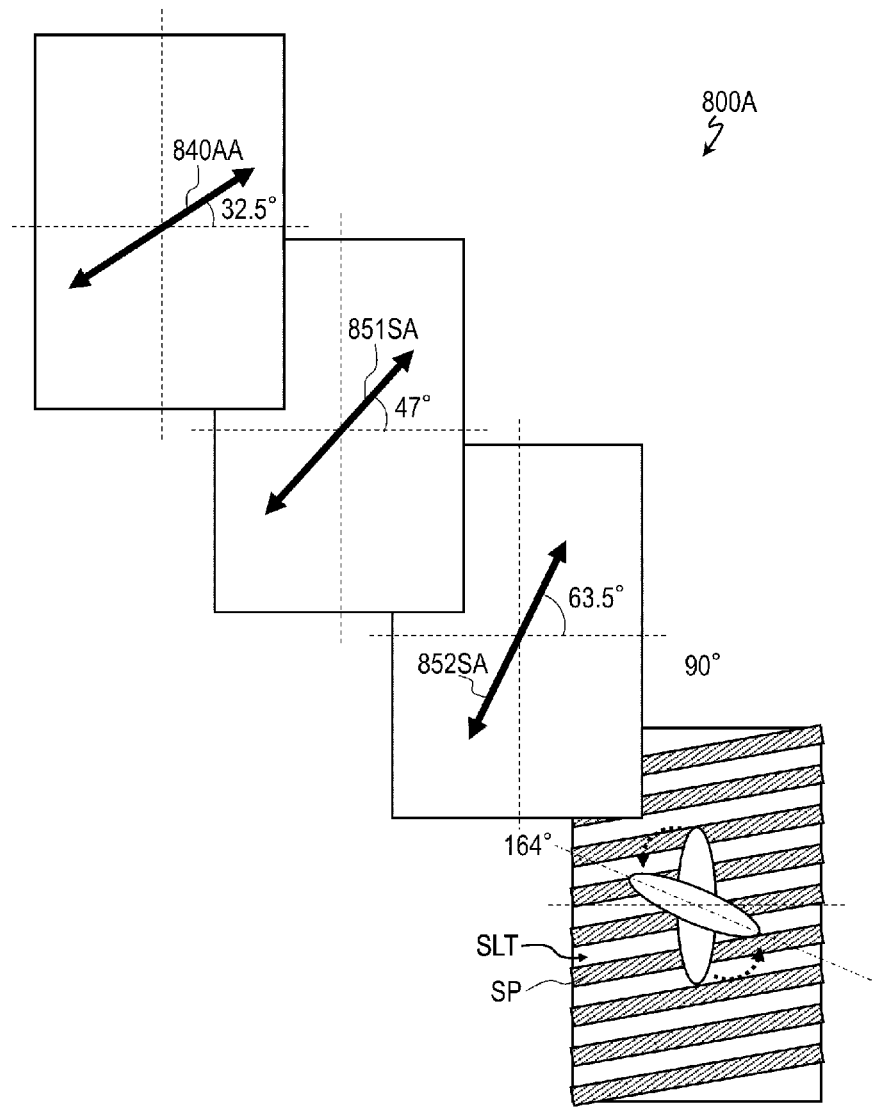
FIG. 29 is a diagram illustrating optical axis settings in Example 2.

In Example 2, the liquid crystal material is negative-type, and the display mode is a TW-FFS mode. In FIG. 29 and Table 6, optical axis settings and specifications of Example 2 are illustrated. As illustrated in FIG. 29 and Table 6, the angle of the light absorption axis 840AA of the polarizer 840 was 32.5°, the angle of the slow axis 851SA of the λ/2 plate 851 was 47°, and the angle of the slow axis 852SA of the λ/4 plate 852 was 63.5°.

TABLE 6

| | Example 2 |
|---|---|
| Liquid crystal material/Display mode | Negative-type/TW-FFS |
| Orientation direction by first horizontal alignment film | 90° |
| Orientation direction by second horizontal alignment film | 164° |
| Twist angle | 74° |
| Light absorption axis angle of polarizer | 32.5° |
| Slow axis angle of λ/2 plate | 47° |
| Slow axis angle of λ/4 plate | 63.5° |
| Belt-shaped portion width of pixel electrode | 3 μm |
| Slit width of pixel electrode | 5 μm |
| Bending angle of belt-shaped portion | 7° |

For comparison, Comparative Examples 1, 2, 3-1, 3-2, and 3-3 were also verified.

Figure 30A:
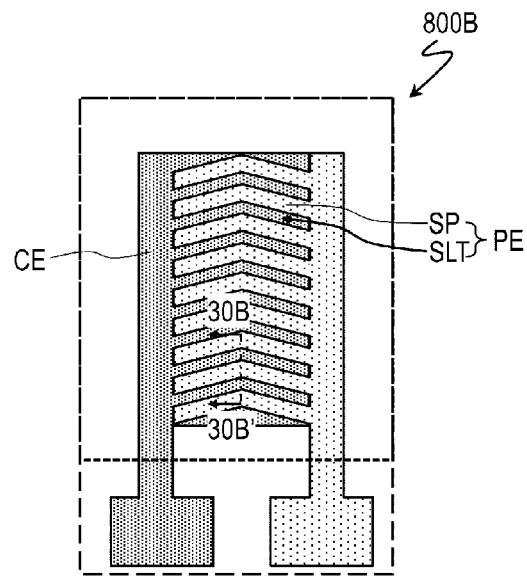
FIG. 30A is a plan view illustrating a test cell 800B.
Figure 30B:
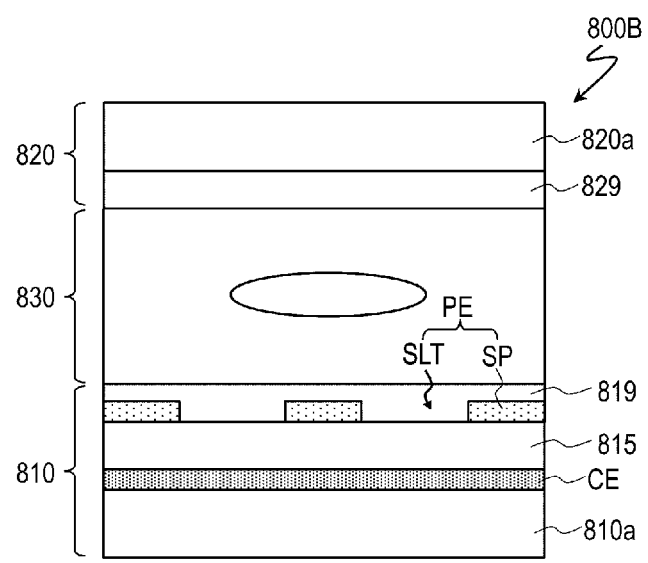
FIG. 30B is a cross-sectional view of the test cell 800B, illustrating a cross section taken along a line 30B-30B' in FIG. 30A.

In Comparative Example 1, the liquid crystal material is negative-type, and the display mode is an FFS mode. In FIGS. 30A and 30B, a test cell 800B prepared for Comparative Example 1 is illustrated. FIG. 30A is a plan view illustrating the test cell 800B. FIG. 30B is a cross-sectional view of the test cell 800B, illustrating a cross section taken along a line 30B-30B' in FIG. 30A.

Similar to the test cell 800A, the test cell 800B includes the back face substrate 810, the front face substrate 820, and the liquid crystal layer 830. The back face substrate 810 includes the glass substrate 810a; and the common electrode CE, the interlayer insulating layer 815, the pixel electrode PE, and the first horizontal alignment film 819, which are layered in that order on the glass substrate 810a. The pixel electrode PE includes the plurality of belt-shaped portions SP and the plurality of slits SLT. The front face substrate 820 includes the glass substrate 820a and the second horizontal alignment film 829 provided on the glass substrate 820a.

Figure 31A:
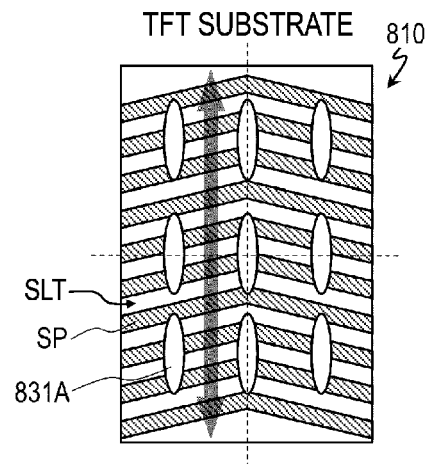
FIG. 31A is a diagram in which a back face substrate 810 of the test cell 800B viewed from the side of a first horizontal alignment film 819 is illustrated.
Figure 31B:
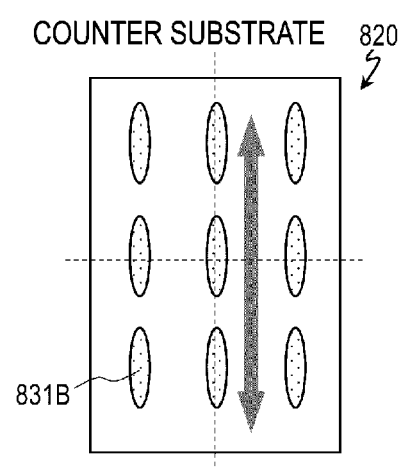
FIG. 31B is a diagram in which a front face substrate 820 of the test cell 800B viewed from the side of a second horizontal alignment film 829 is illustrated.
Figure 31C:
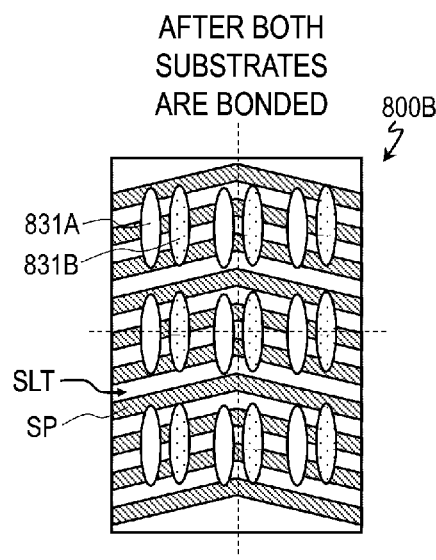
FIG. 31C is a diagram of the test cell 800B when viewed from the front face substrate 820 side after the back face substrate 810 and the front face substrate 820 are bonded to each other.

FIG. 31A is a diagram of the back face substrate 810 viewed from the first horizontal alignment film 819 side, and FIG. 31B is a diagram of the front face substrate 820 viewed from the second horizontal alignment film 829 side. FIG. 31C is a diagram of the test cell 800B when viewed from the front face substrate 820 side after the back face substrate 810 and the front face substrate 820 are bonded to each other.

As illustrated in FIGS. 31A, 31B, and 31C, the orientation direction of a liquid crystal molecule 831A defined by the first horizontal alignment film 819 was set to 0°, and the orientation direction of a liquid crystal molecule 831B defined by the second horizontal alignment film 829 was also set to 0°. In other words, the twist angle was set to 0°.

Figure 32:
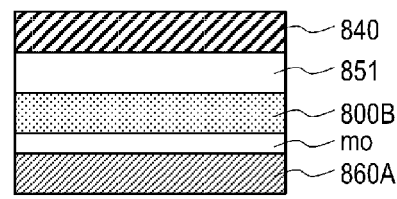
FIG. 32 is a diagram illustrating a layered structure at the time of reflectivity measurement regarding the test cell 800B.

The reflectivity was measured in a state illustrated in FIG. 32. In the state illustrated in FIG. 32, the λ/2 plate 851 and the polarizer 840 are bonded in that order to the front face substrate 820 side of the test cell 800B. The matching oil mo is dropped on the reflector 860A having the MRS, and the test cell 800B is placed thereon with the back face substrate 810 side facing downward.

Figure 33:
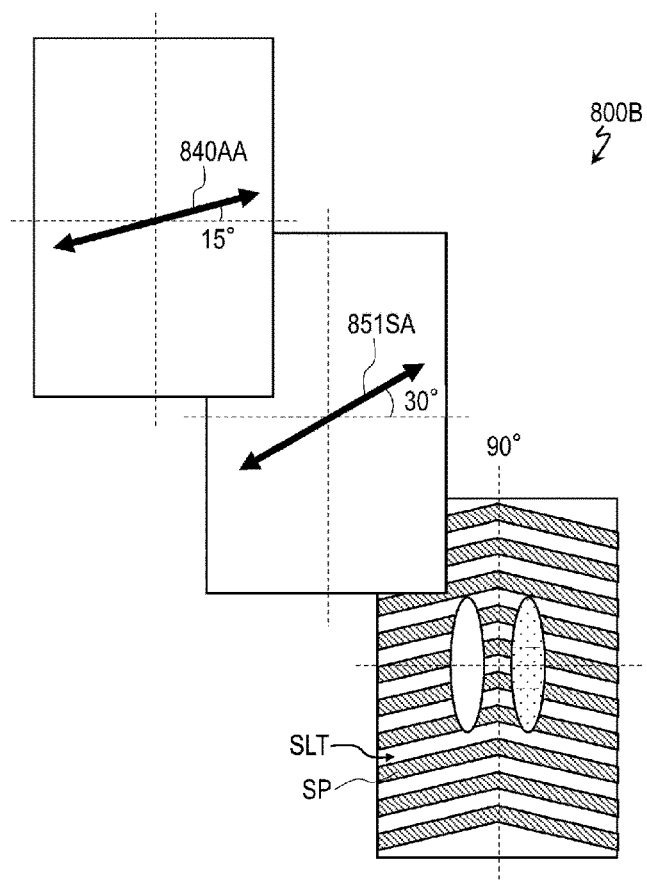
FIG. 33 is a diagram illustrating optical axis settings in Comparative Example 1.

In FIG. 33 and Table 7, optical axis settings and specifications of Comparative Example 1 are illustrated. As illustrated in FIG. 33 and Table 7, the angle of the light absorption axis 840AA of the polarizer 840 was 15°, and the angle of the slow axis 851SA of the λ/2 plate 851 was 30°.

TABLE 7

| Comparative Example 1 | |
|---|---|
| Liquid crystal material/Display mode | Negative-type/FFS |
| Orientation direction by first horizontal alignment film | 90° |
| Orientation direction by second horizontal alignment film | 90° |
| Twist angle | 0° |
| Light absorption axis angle of polarizer | 15° |
| Slow axis angle of λ/2 plate | 30° |
| Belt-shaped portion width of pixel electrode | 3 μm |
| Slit width of pixel electrode | 5 μm |
| Bending angle of belt-shaped portion | 7° |

Figure 34A:
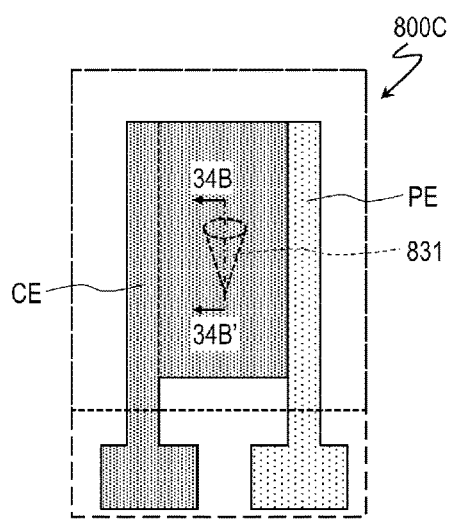
FIG. 34A is a plan view illustrating a test cell 800C.
Figure 34B:
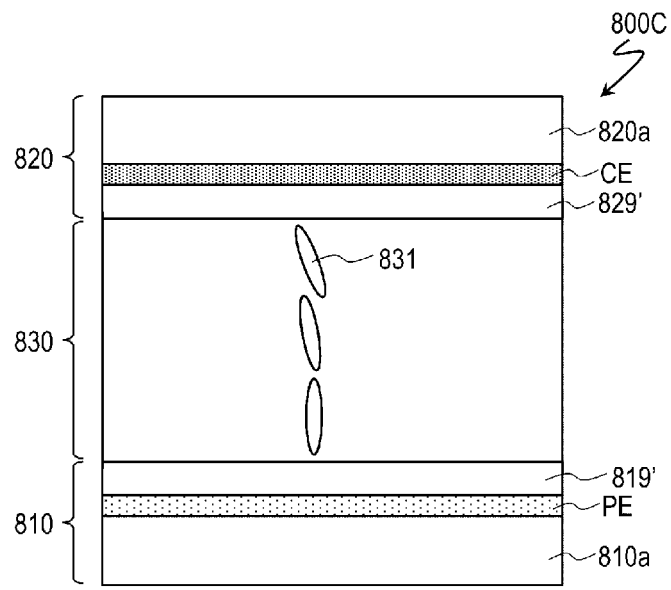
FIG. 34B is a cross-sectional view of the test cell 800C, illustrating a cross section taken along a line 34B-34B' in FIG. 34A.

In Comparative Example 2, the liquid crystal material is negative-type, and the display mode is a VA mode. In FIGS. 34A and 34B, a test cell 800C prepared for Comparative Example 2 is illustrated. FIG. 34A is a plan view illustrating the test cell 800C. FIG. 34B is a cross-sectional view of the test cell 800C, illustrating a cross section taken along a line 34B-34B' in FIG. 34A.

The test cell 800C includes the back face substrate 810, the front face substrate 820, and the liquid crystal layer 830. The back face substrate 810 includes the glass substrate 810a; and the pixel electrode PE and a first vertical alignment film 819' layered in that order on the glass substrate 810a. The front face substrate 820 includes the glass substrate 820a; and the common electrode CE and a second vertical alignment film 829' layered in that order on the glass substrate 820a. Of the first vertical alignment film 819' and the second vertical alignment film 829', only the second vertical alignment film 829' is subjected to optical alignment treatment, and the orientation direction of a liquid crystal molecule 831 defined by the second vertical alignment film 829' is 90° (the pre-tilt angle is 88.4°).

Figure 35:
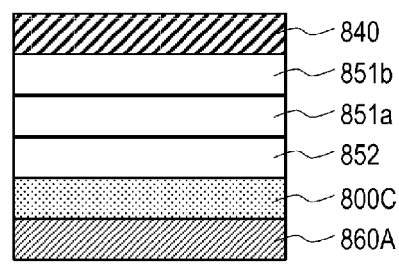
FIG. 35 is a diagram illustrating a layered structure at the time of reflectivity measurement regarding the test cell 800C.

The reflectivity was measured in a state illustrated in FIG. 35. In the state illustrated in FIG. 35, the λ/4 plate 852, a first λ/2 plate 851a, a second λ/2 plate 851b, and the polarizer 840 are bonded in that order to the front face substrate 820 side of the test cell 800C. The test cell 800C is placed on the reflector 860A having the MRS with the back face substrate 810 side facing downward.

Figure 36:
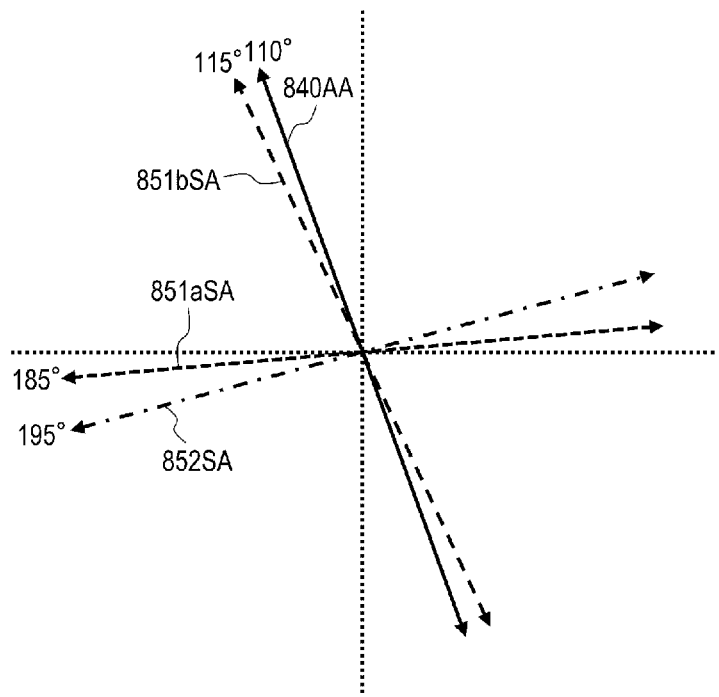
FIG. 36 is a diagram illustrating optical axis settings in Comparative Example 2.

In FIG. 36 and Table 8, optical axis settings and specifications of Comparative Example 2 are illustrated. As illustrated in FIG. 36 and Table 8, the angle of the light absorption axis 840AA of the polarizer 840 was 110°, the angle of a slow axis 851aSA of the first λ/2 plate 851a was 185°, the angle of a slow axis 851bSA of the second λ/2 plate 851b was 115°, and the angle of the slow axis 852SA of the λ/4 plate 852 was 195°.

TABLE 8

| Comparative Example 2 | |
|---|---|
| Liquid crystal material/Display mode | Negative-type/VA |
| Orientation direction by first vertical alignment film | — |
| Orientation direction by second vertical alignment film | 90° |
| Light absorption axis angle of polarizer | 110° |
| Slow axis angle of first λ/2 plate | 185° |
| Slow axis angle of second λ/2 plate | 115° |
| Slow axis angle of λ/4 plate | 195° |

Figure 37A:
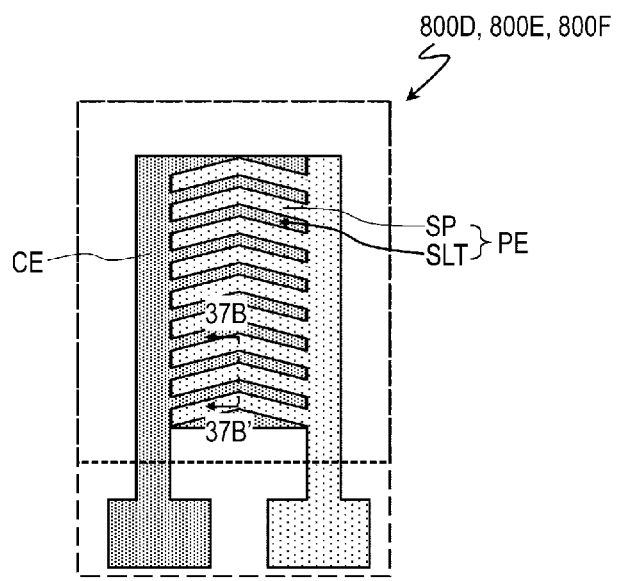
FIG. 37A is a plan view illustrating test cells 800D, 800E, and 800F.
Figure 37B:
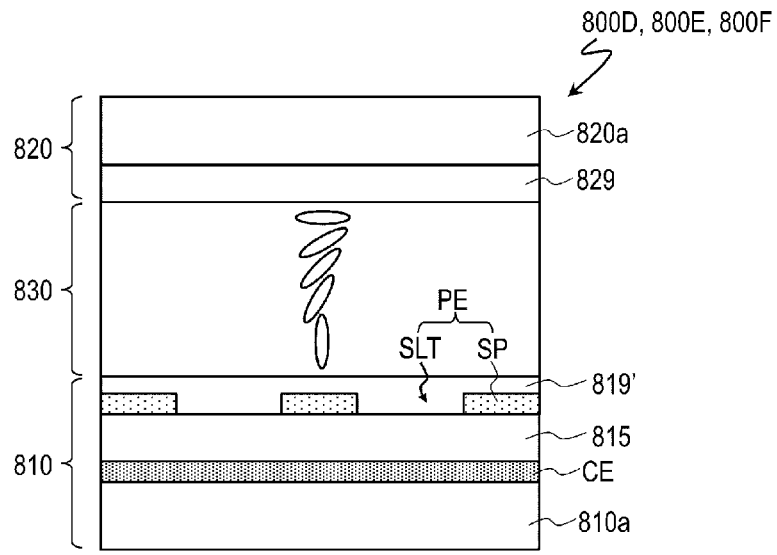
FIG. 37B is a cross-sectional view of the test cells 800D, 800E, and 800F, illustrating a cross section taken along a line 37B-37B' in FIG. 37A.

In Comparative Examples 3-1, 3-2, and 3-3, the liquid crystal material is negative-type, and the display mode is a HAN mode. In FIGS. 37A and 37B, test cells 800D, 800E, and 800F prepared for Comparative Examples 3-1, 3-2, and 3-3, respectively, are illustrated. FIG. 37A is a plan view illustrating the test cells 800D, 800E, and 800F. FIG. 37B is a cross-sectional view of the test cells 800D, 800E, and 800F, illustrating a cross section taken along a line 37B-37B' in FIG. 37A.

The test cells 800D, 800E, and 800F each include the back face substrate 810, the front face substrate 820, and the liquid crystal layer 830. The back face substrate 810 includes the glass substrate 810a; and the common electrode CE, the interlayer insulating layer 815, the pixel electrode PE, and the vertical alignment film 819', which are layered in that order on the glass substrate 810a. The pixel electrode PE includes the plurality of belt-shaped portions SP and the plurality of slits SLT. The front face substrate 820 includes the glass substrate 820a and the horizontal alignment film 829 provided on the glass substrate 820a. In the test cell 800D (Comparative Example 3-1), of the vertical alignment film 819' and the horizontal alignment film 829, only the horizontal alignment film 829 is subjected to optical alignment treatment. In the test cell 800E (Comparative Example 3-2) and the test cell 800F (Comparative Example 3-3), both the vertical alignment film 819' and the horizontal alignment film 829 are subjected to optical alignment treatment.

Figure 38A:
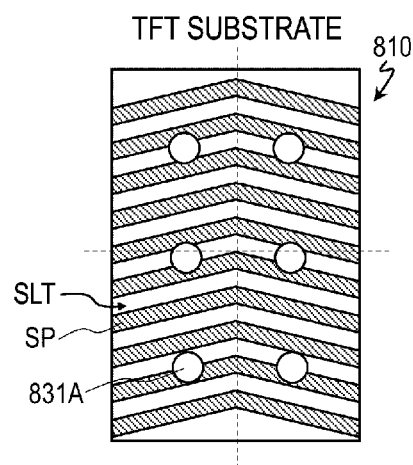
FIG. 38A is a diagram in which the back face substrate 810 of the test cell 800D viewed from the side of a vertical alignment film 819' is illustrated.
Figure 38B:
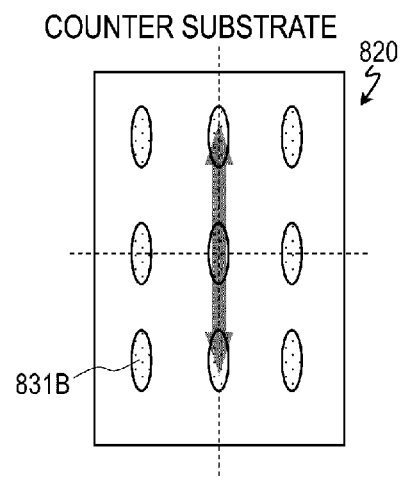
FIG. 38B is a diagram in which the front face substrate 820 of the test cell 800D viewed from the horizontal alignment film 829 side is illustrated.
Figure 38C:
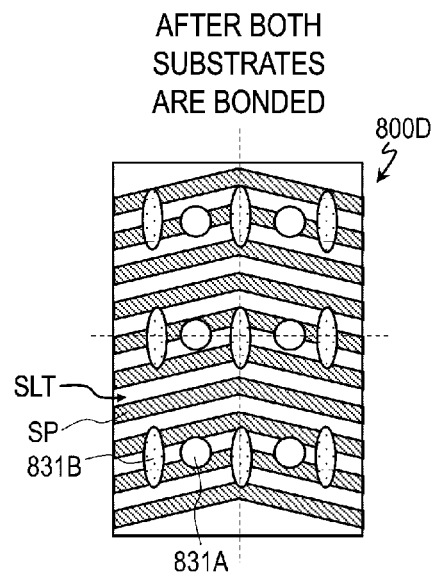
FIG. 38C is a diagram of the test cell 800D when viewed from the front face substrate 820 side after the back face substrate 810 and the front face substrate 820 are bonded to each other.

FIG. 38A is a diagram of the back face substrate 810 of the test cell 800D viewed from the vertical alignment film 819' side, and FIG. 38B is a diagram of the front face substrate 820 of the test cell 800D viewed from the horizontal alignment film 829 side. FIG. 38C is a diagram of the test cell 800D when viewed from the front face substrate 820 side after the back face substrate 810 and the front face substrate 820 are bonded to each other.

As illustrated in FIGS. 38A, 38B, and 38C, in the test cell 800D, the orientation direction of the liquid crystal molecule 831A is not defined by the vertical alignment film 819', and the orientation direction of the liquid crystal molecule 831B defined by the horizontal alignment film 829 is set to 90°.

Figure 39A:
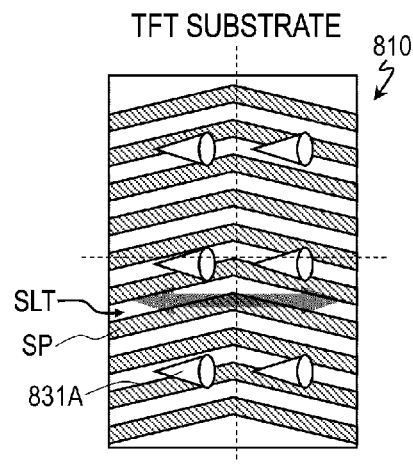
FIG. 39A is a diagram of the back face substrate 810 of the test cell 800E when viewed from the vertical alignment film 819' side.
Figure 39B:
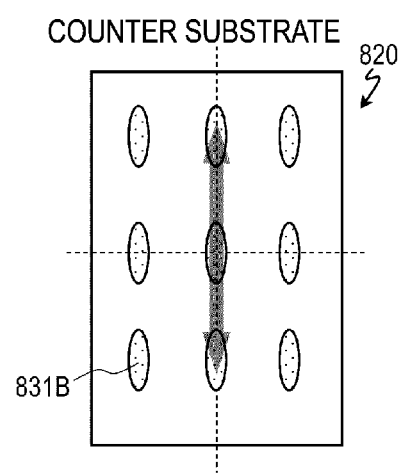
FIG. 39B is a diagram of the front face substrate 820 of the test cell 800E when viewed from the horizontal alignment film 829 side.
Figure 39C:
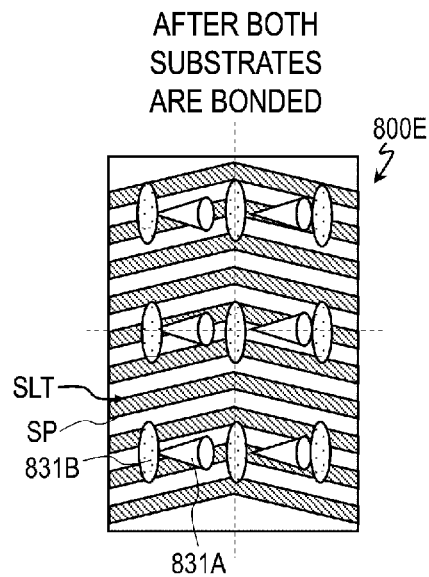
FIG. 39C is a diagram of the test cell 800E when viewed from the front face substrate 820 side after the back face substrate 810 and the front face substrate 820 are bonded to each other.

FIG. 39A is a diagram of the back face substrate 810 of the test cell 800E viewed from the vertical alignment film 819' side, and FIG. 39B is a diagram of the front face substrate 820 of the test cell 800E viewed from the horizontal alignment film 829 side. FIG. 39C is a diagram of the test cell 800E when viewed from the front face substrate 820 side after the back face substrate 810 and the front face substrate 820 are bonded to each other.

As illustrated in FIGS. 39A, 39B, and 39C, in the test cell 800E, the orientation direction of the liquid crystal molecule 831A defined by the vertical alignment film 819' was set to 0°, and the orientation direction of the liquid crystal molecule 831B defined by the horizontal alignment film 829 was set to 90°. In other words, the twist angle was set to 90°.

Figure 40A:
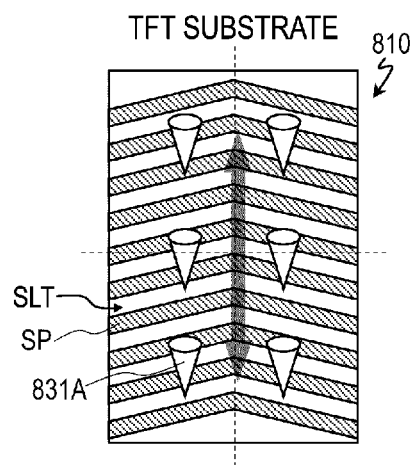
FIG. 40A is a diagram of the back face substrate 810 of a test cell 800F when viewed from the vertical alignment film 819' side.
Figure 40B:
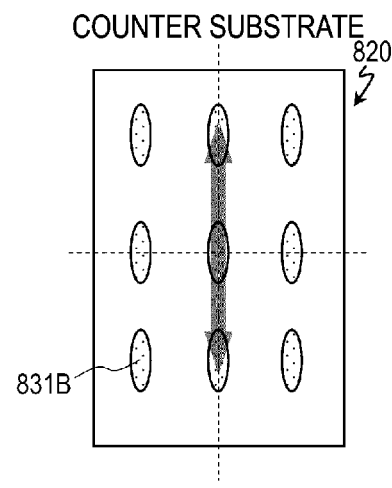
FIG. 40B is a diagram of the front face substrate 820 of the test cell 800F when viewed from the horizontal alignment film 829 side.
Figure 40C:
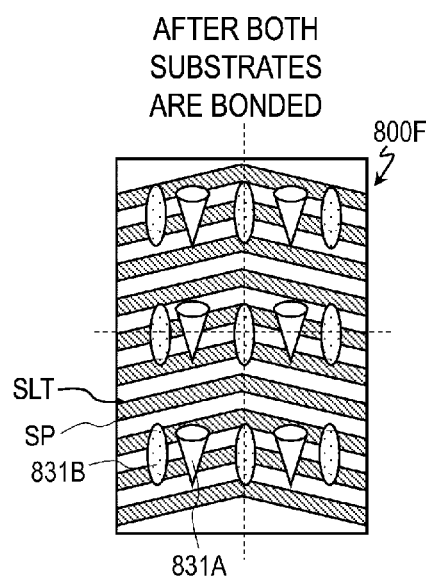
FIG. 40C is a diagram of the test cell 800F when viewed from the front face substrate 820 side after the back face substrate 810 and the front face substrate 820 are bonded to each other.

FIG. 40A is a diagram of the back face substrate 810 of the test cell 800F viewed from the vertical alignment film 819' side, and FIG. 40B is a diagram of the front face substrate 820 of the test cell 800F viewed from the horizontal alignment film 829 side. FIG. 40C is a diagram of the test cell 800F when viewed from the front face substrate 820 side after the back face substrate 810 and the front face substrate 820 are bonded to each other.

As illustrated in FIGS. 40A, 40B, and 40C, in the test cell 800F, the orientation direction of the liquid crystal molecule 831A defined by the vertical alignment film 819' was set to 90°, and the orientation direction of the liquid crystal molecule 831B defined by the horizontal alignment film 829 was also set to 90°. In other words, the twist angle was set to 0°.

Figure 41:
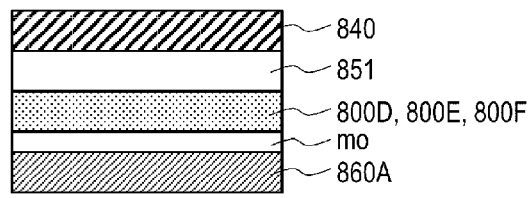
FIG. 41 is a diagram illustrating a layered structure at the time of reflectivity measurement regarding the test cells 800D, 800E, and 800F.

The reflectivity was measured in a state illustrated in FIG. 41. In the state illustrated in FIG. 41, the λ/2 plate 851 and the polarizer 840 are bonded in that order to the front face substrate 820 side of the test cells 800D, 800E, and 800F. The matching oil mo is dropped on the reflector 860A having the MRS, and the test cells 800D, 800E, and 800F are each placed thereon with the back face substrate 810 side facing downward.

Figure 42:
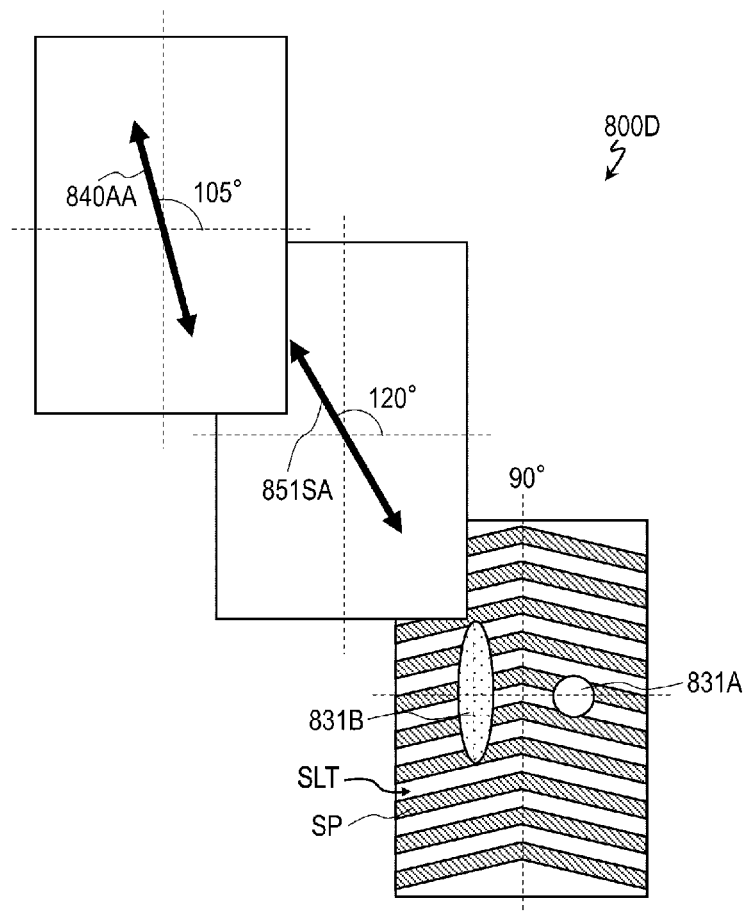
FIG. 42 is a diagram illustrating optical axis settings in Comparative Example 3-1.

In FIG. 42 and Table 9, optical axis settings and specifications of Comparative Example 3-1 are illustrated. As illustrated in FIG. 42 and Table 9, the angle of the light absorption axis 840AA of the polarizer 840 was 105°, and the angle of the slow axis 851SA of the λ/2 plate 851 was 120°.

TABLE 9

| Comparative Example 3-1 | |
|---|---|
| Liquid crystal material/Display mode | Negative-type/HAN |
| Orientation direction by vertical alignment film | — |
| Orientation direction by horizontal alignment film | 90° |
| Twist angle | — |
| Light absorption axis angle of polarizer | 105° |
| Slow axis angle of λ/2 plate | 120° |
| Belt-shaped portion width of pixel electrode | 3 μm |
| Slit width of pixel electrode | 5 μm |
| Bending angle of belt-shaped portion | 7° |

Figure 43:
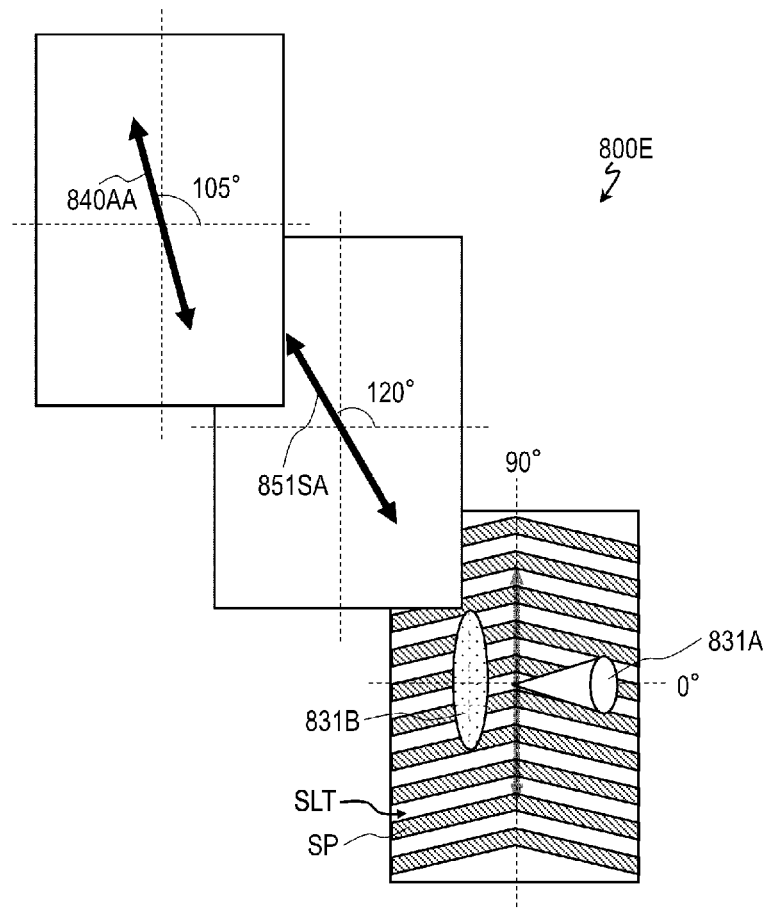
FIG. 43 is a diagram illustrating optical axis settings in Comparative Example 3-2.

In FIG. 43 and Table 10, optical axis settings and specifications of Comparative Example 3-2 are illustrated. As illustrated in FIG. 43 and Table 10, the angle of the light absorption axis 840AA of the polarizer 840 was 105°, the angle of the slow axis 851SA of the λ/2 plate 851 was 120°, and the twist angle was 90°.

TABLE 10

| Comparative Example 3-2 | |
|---|---|
| Liquid crystal material/Display mode | Negative-type/HAN |
| Orientation direction by vertical alignment film | 0° |
| Orientation direction by horizontal alignment film | 90° |
| Twist angle | 90° |
| Light absorption axis angle of polarizer | 105° |
| Slow axis angle of λ/2 plate | 120° |
| Belt-shaped portion width of pixel electrode | 3 μm |
| Slit width of pixel electrode | 5 μm |
| Bending angle of belt-shaped portion | 7° |

Figure 44:
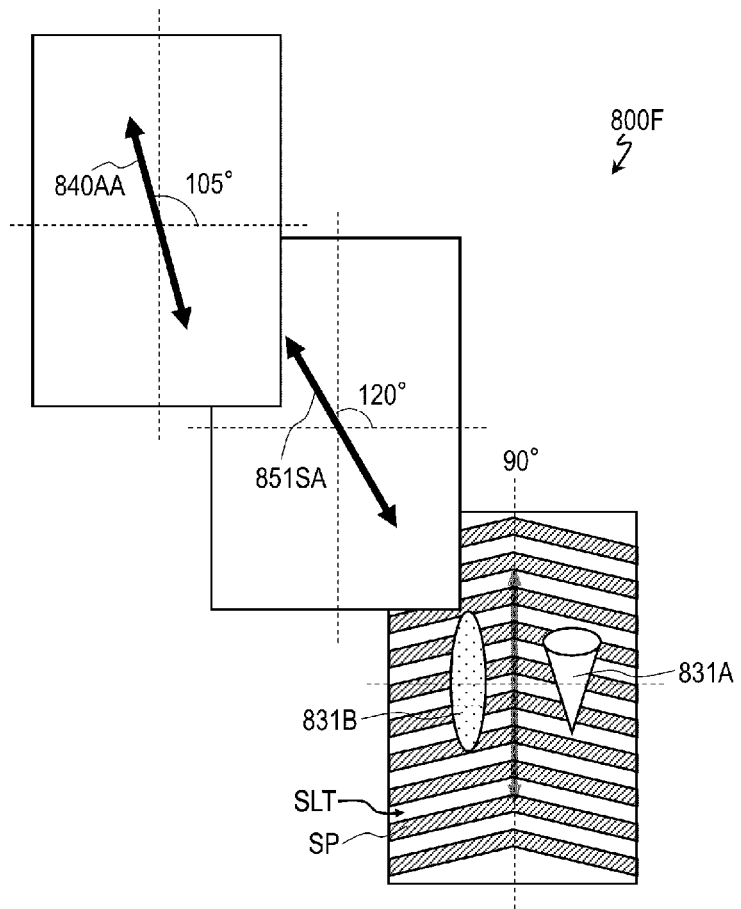
FIG. 44 is a diagram illustrating optical axis settings in Comparative Example 3-3.

In FIG. 44 and Table 11, optical axis settings and specifications of Comparative Example 3-3 are illustrated. As illustrated in FIG. 44 and Table 11, the angle of the light absorption axis 840AA of the polarizer 840 was 105°, the angle of the slow axis 851SA of the λ/2 plate 851 was 120°, and the twist angle was 0°.

TABLE 11

| Comparative Example 3-3 | |
|---|---|
| Liquid crystal material/Display mode | Negative-type/HAN |
| Orientation direction by vertical alignment film | 90° |
| Orientation direction by horizontal alignment film | 90° |
| Twist angle | 0° |
| Light absorption axis angle of polarizer | 105° |

TABLE 11-continued

| Comparative Example 3-3 | | |
|---|---|---|
| Liquid crystal material/Display mode | | Negative-type/HAN |
| Slow axis angle of λ/2 plate | | 120° |
| Belt-shaped portion width of pixel electrode | | 3 μm |
| Slit width of pixel electrode | | 5 μm |
| Bending angle of belt-shaped portion | | 7° |

Figure 45:
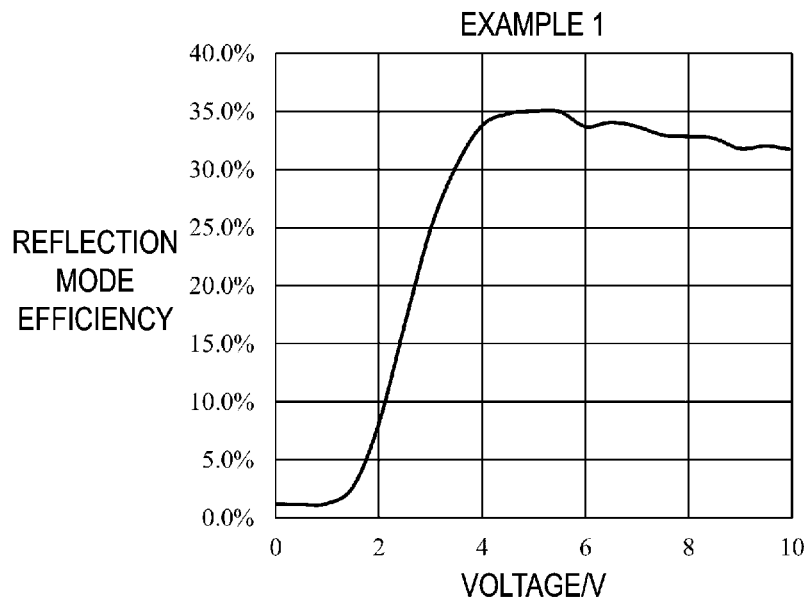
FIG. 45 is a graph depicting results of reflectivity measurement (voltage-reflectivity characteristics) in Example 1.

The results of the reflectivity measurement (voltage-reflectivity characteristics) of Example 1 are depicted in FIG. 45 and Table 12. From FIG. 45 and Table 12, it can be understood that the contrast ratio of Example 1 is 30, and that a sufficiently high contrast ratio is obtained.

TABLE 12

| Example 1 | | |
|---|---|---|
| Reflection mode efficiency | 0 V | 1.2% |
| | 3 V | 24.9% |
| | 5 V | 35.1% |
| Contrast ratio (5 V/0 V) | | 30 |
| Retardation of liquid crystal layer | | 139 nm |
| Black 0 V chromaticity (x, y) | | (0.306, 0.327) |
| White 5 V chromaticity (x, y) | | (0.331, 0.357) |

Figure 46:
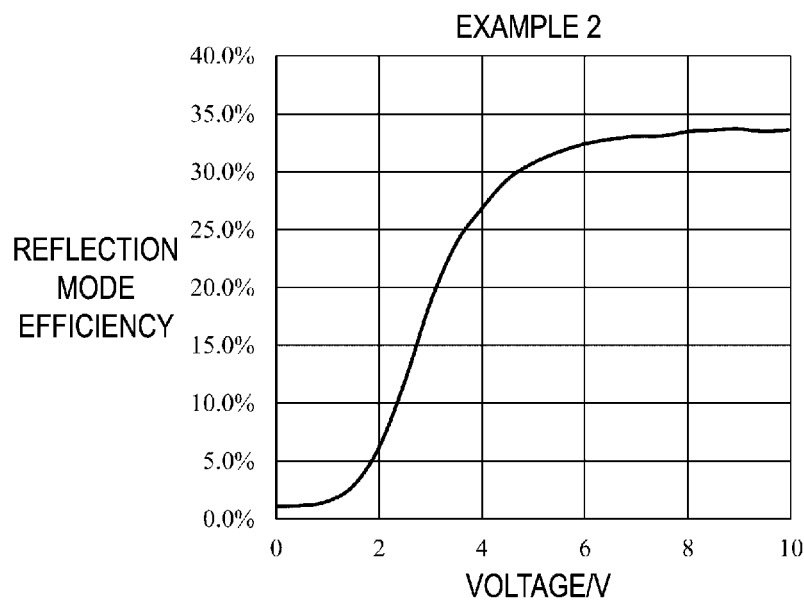
FIG. 46 is a graph depicting results of reflectivity measurement (voltage-reflectivity characteristics) in Example 2.

The results of the reflectivity measurement of Example 2 are depicted in FIG. 46 and Table 13. From FIG. 46 and Table 13, it can be understood that the contrast ratio of Example 2 is 29, and that a sufficiently high contrast ratio is obtained.

TABLE 13

| Example 2 | | |
|---|---|---|
| Reflection mode efficiency | 0 V | 1.1% |
| | 3 V | 18.7% |
| | 5 V | 30.8% |
| Contrast ratio (5 V/0 V) | | 29 |
| Retardation of liquid crystal layer | | 139 nm |
| Black 0 V chromaticity (x, y) | | (0.335, 0.346) |
| White 5 V chromaticity (x, y) | | (0.323, 0.348) |

Figure 47:
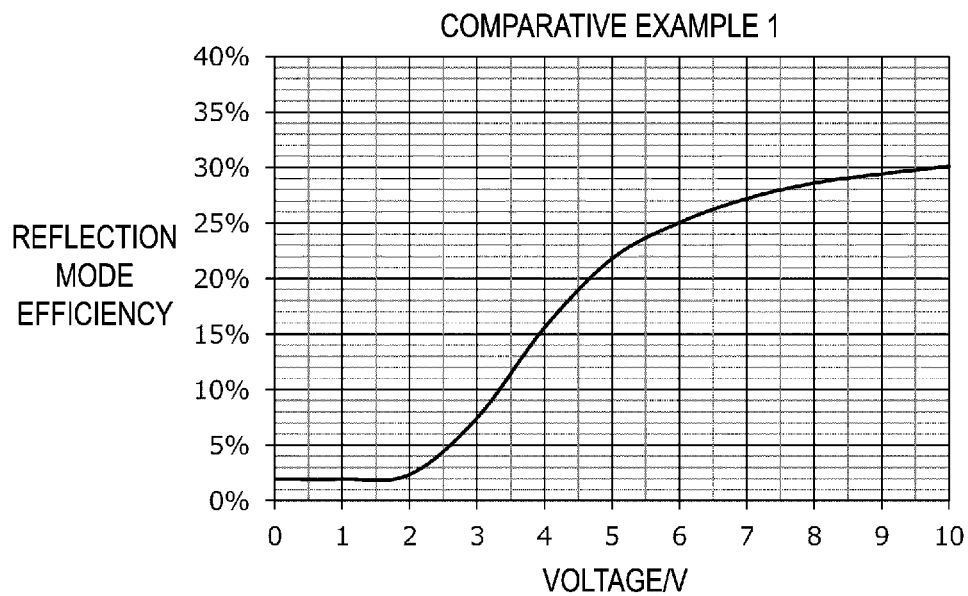
FIG. 47 is a graph depicting results of reflectivity measurement (voltage-reflectivity characteristics) in Comparative Example 1.

The results of the reflectivity measurement of Comparative Example 1 are depicted in FIG. 47 and Table 14. From FIG. 47 and Table 14, it can be understood that the contrast ratio of Comparative Example 1 is 11, and that the contrast ratio is lower than those of Examples 1 and 2.

TABLE 14

| Comparative Example 1 | | |
|---|---|---|
| Reflection mode efficiency | 0 V | 2.4% |
| | 5 V | 21.8% |
| Contrast ratio (5 V/0 V) | | 9 |

Figure 48:
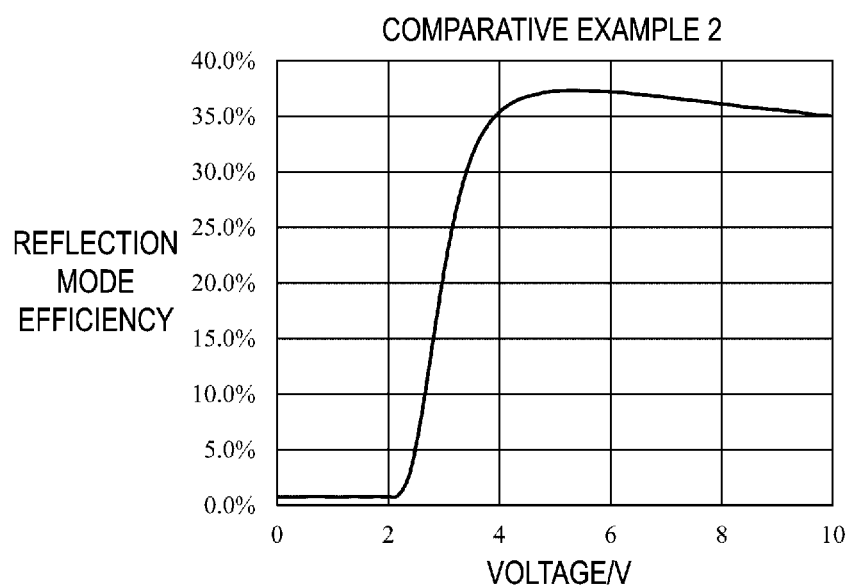
FIG. 48 is a graph depicting results of reflectivity measurement (voltage-reflectivity characteristics) in Comparative Example 2.

The results of the reflectivity measurement of Comparative Example 2 are depicted in FIG. 48 and Table 15. From FIG. 48 and Table 15, it can be understood that the contrast ratio of Comparative Example 2 is 48, and that a sufficiently high contrast ratio is obtained. However, as described above, since the electrodes are provided at the counter substrate side in the VA mode as in Comparative Example 2, it is difficult to employ the VA mode in the in-cell type touch screen.

TABLE 15

| Comparative Example 2 | | |
|---|---|---|
| Reflection mode efficiency | 0 V | 0.8% |
| | 5 V | 37.2% |
| Contrast ratio (5 V/0 V) | | 48 |

Figure 49:
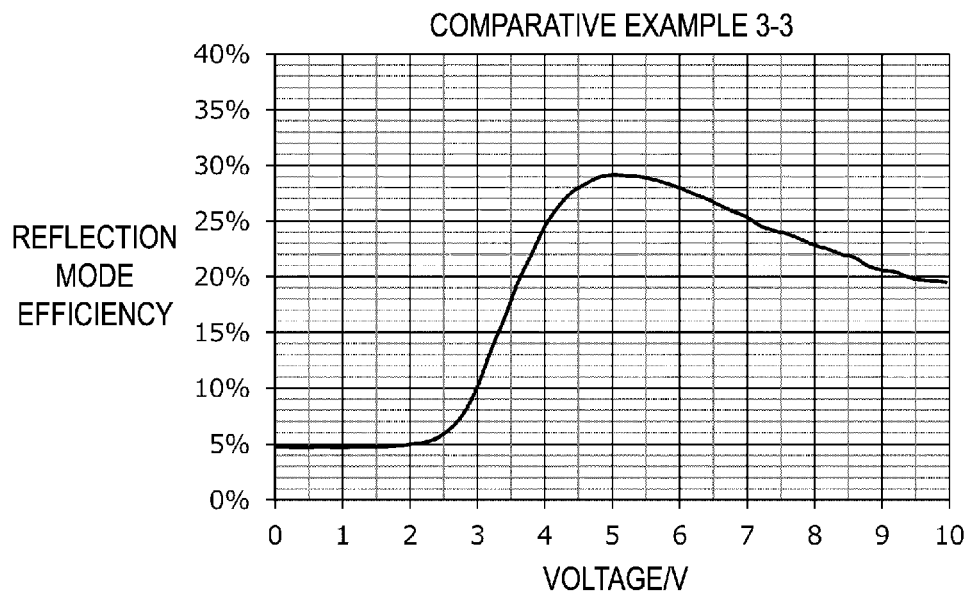
FIG. 49 is a graph depicting results of reflectivity measurement (voltage-reflectivity characteristics) in Comparative Example 3-3.

The results of the reflectivity measurement of Comparative Example 3-3 are depicted in FIG. 49 and Table 16. From FIG. 49 and Table 16, it can be understood that the contrast ratio of Comparative Example 3-3 is 6, and that the contrast ratio is lower than those of Examples 1 and 2.

TABLE 16

| Comparative Example 3-3 | | |
|---|---|---|
| Reflection mode efficiency | 0 V | 4.8% |
| | 5 V | 29.1% |
| Contrast ratio (5 V/0 V) | | 6 |

The contrast ratios in Comparative Examples 3-1 and 3-2 are also lower than those of Examples 1 and 2, as in Comparative Example 3-3. In Comparative Examples 3-1 and 3-2, a plurality of liquid crystal domains having different brightness levels were visually recognized in the black display state. It can be considered that reverse tilt domains or reverse twist domains were generated because the tilt direction or twist direction of the liquid crystal molecule was not uniquely determined.

As can be understood from the above-described verification results, according to the embodiment of the disclosure, the contrast ratio of the reflective type that performs display in the transverse electrical field mode may be improved.

Configuration of Belt-Shaped Portion of Upper Layer Electrode

As described above, of the pixel electrode PE and the common electrode CE, at least an upper layer electrode includes the plurality of belt-shaped portions SP and at least one slit SLT located between two belt-shaped portions SP adjacent to each other.

Figure 50A:
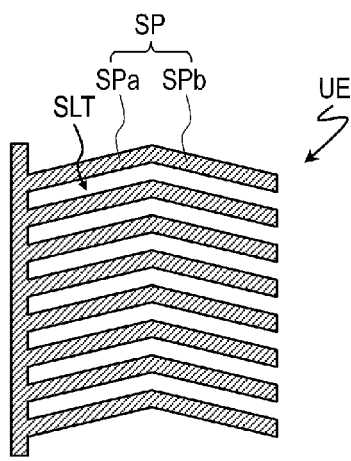
FIG. 50A is a plan view illustrating an example of an upper layer electrode UE.

An example of an upper layer electrode UE is illustrated in FIG. 50A. The upper layer electrode UE illustrated in FIG. 50A includes the plurality of belt-shaped portions SP and the plurality of slits SLT. Each belt-shaped portion SP includes the first portion SPa extending in a certain direction (first direction) and the second portion SPb extending in a direction (second direction) different from the first direction. When the upper layer electrode UE has such configuration, two liquid crystal domains having different orientation directions are formed in each pixel when a voltage is applied (hereinafter referred to as "dual domain alignment"), and thus a color change (coloring of display) or a gray scale change accompanying a change in a viewing angle direction may be suppressed.

Figure 50B:
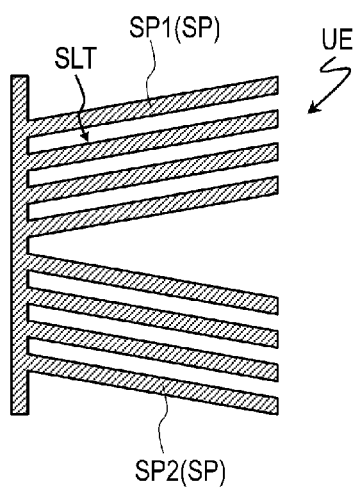
FIG. 50B is a plan view illustrating another example of the upper layer electrode UE.

Another example of the upper layer electrode UE is illustrated in FIG. 50B. The upper layer electrode UE illustrated in FIG. 50B includes the plurality of belt-shaped portions SP and the plurality of slits SLT. The plurality of belt-shaped portions SP include at least one (in this case, four) first belt-shaped portion SP1 extending in a certain direction (first direction) and at least one (in this case, four) second belt-shaped portion SP2 extending in a direction (second direction) different from the first direction. The dual domain alignment may also be achieved by the upper layer electrode UE having the above configuration.

Figure 51A:
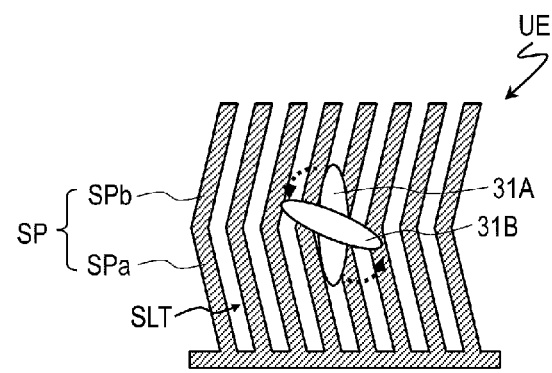
FIG. 51A is a diagram illustrating an example of a relationship between an orientation direction defined by the first horizontal alignment film 19 and a direction in which the belt-shaped portion SP extends in a case where a liquid crystal material is positive-type.
Figure 51B:
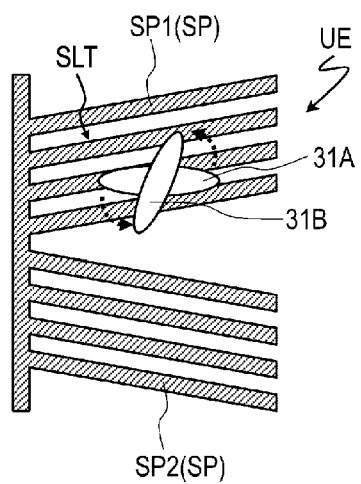
FIG. 51B is a diagram illustrating an example of a relationship between an orientation direction defined by the first horizontal alignment film 19 and a direction in which the belt-shaped portion SP extends in a case where a liquid crystal material is positive-type.

It is sufficient that the direction in which the belt-shaped portion SP extends is determined in accordance with the orientation direction defined by the first horizontal alignment film 19. FIGS. 51A and 51B each illustrate an example of a relationship between the orientation direction defined by the first horizontal alignment film 19 and the direction in which the belt-shaped portion SP extends in the case where the liquid crystal material is positive-type.

In the example illustrated in FIG. 51A, the orientation direction defined by the first horizontal alignment film 19 is 90°, and the belt-shaped portions SP of the upper layer electrode UE extend in the 90° direction as a whole. Note that, however, each of the first portion SPa and the second portion SPb of the belt-shaped portion SP is slightly inclined (for example, +10° or −10°) relative to the 90° direction.

In the example illustrated in FIG. 51B, the orientation direction defined by the first horizontal alignment film 19 is 0°, and the belt-shaped portions SP of the upper layer electrode UE extend substantially in the 0° direction. Note that, however, each of the first belt-shaped portion SP1 and the second belt-shaped portion SP2 is slightly inclined (for example, +100 or −10°) relative to the 0° direction.

Figure 52A:
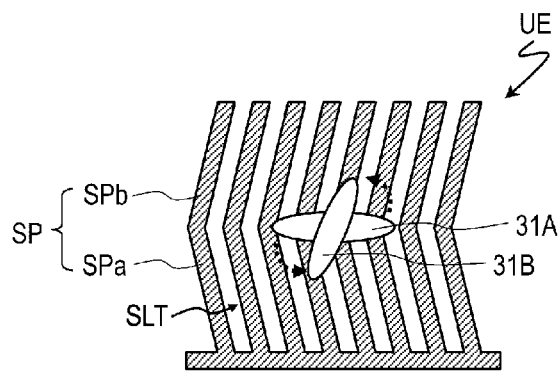
FIG. 52A is a diagram illustrating an example of a relationship between an orientation direction defined by the first horizontal alignment film 19 and a direction in which the belt-shaped portion SP extends in a case where a liquid crystal material is negative-type.
Figure 52B:
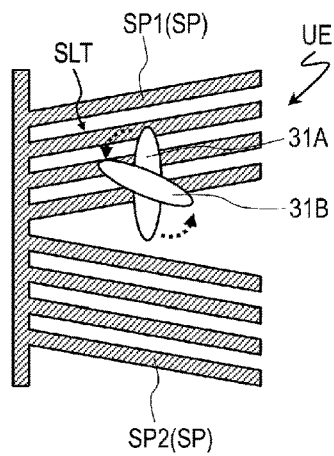
FIG. 52B is a diagram illustrating an example of a relationship between an orientation direction defined by the first horizontal alignment film 19 and a direction in which the belt-shaped portion SP extends in a case where a liquid crystal material is negative-type.

FIGS. 52A and 52B each illustrate an example of a relationship between the orientation direction defined by the first horizontal alignment film 19 and the direction in which the belt-shaped portion SP extends in the case where the liquid crystal material is negative-type.

In the example illustrated in FIG. 52A, the orientation direction defined by the first horizontal alignment film 19 is 0°, and the belt-shaped portions SP of the upper layer electrode UE extend in a 90° direction as a whole. Note that, however, each of the first portion SPa and the second portion SPb of the belt-shaped portion SP is slightly inclined (for example, +10° or −10°) relative to the 90° direction.

In the example illustrated in FIG. 52B, the orientation direction defined by the first horizontal alignment film 19 is 90°, and the belt-shaped portions SP of the upper layer electrode UE extend substantially in 0°. Note that, however, each of the first belt-shaped portion SP1 and the second belt-shaped portion SP2 is slightly inclined (for example, +10° or −10°) relative to the 0° direction.

As discussed above, the direction in which the belt-shaped portion SP extends may be determined in accordance with the orientation direction defined by the first horizontal alignment film 19.

In-Cell Type Touch Screen

Figure 53:
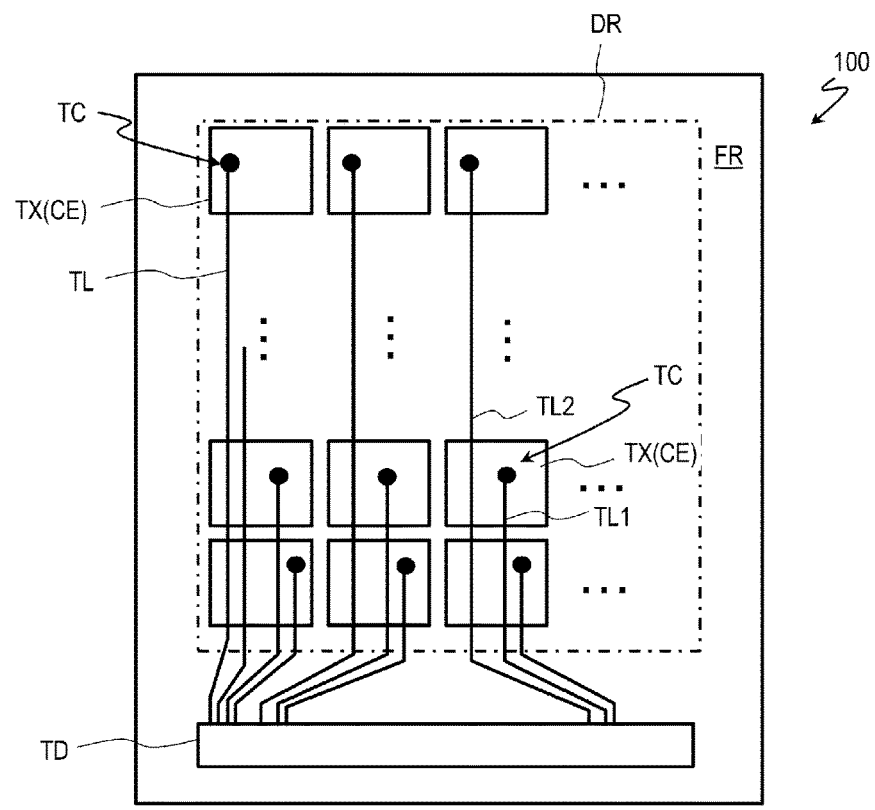
FIG. 53 is a plan view illustrating an example of an arrangement relationship between touch sensor electrodes and touch wiring lines in the liquid crystal display device 100.

An example in which the liquid crystal display device 100 according to the embodiment of the disclosure is used for an in-cell type touch screen will be described with reference to FIG. 53. FIG. 53 is a plan view illustrating an example of an arrangement relationship between touch sensor electrodes and touch wiring lines in the liquid crystal display device 100.

As illustrated in FIG. 53, the liquid crystal display device 100 includes a display region DR and a non-display region FR. The display region DR is defined by the plurality of pixels P arrayed in a matrix shape (see FIG. 2). The non-display region FR is positioned at the periphery of the display region DR, and may be referred to as a "peripheral region" or "frame region".

The common electrode CE is divided into a plurality of segments TX in the display region DR. Each of the segments (common electrode portions) TX functions as a touch sensor electrode. In the example illustrated in FIG. 53, each touch sensor electrode TX is provided corresponding to two or more pixel electrodes P.

The liquid crystal display device 100 (more specifically, the TFT substrate 10) includes a plurality of touch wiring lines TL. Each touch sensor electrode TX is electrically connected to a corresponding touch wiring line TL. A connection section TC between the touch sensor electrode TX and the touch wiring line TL is referred to as a "touch wiring line contact portion".

The touch wiring line TL is connected to a touch drive unit TD provided in the non-display region FR. The touch drive unit TD is configured to switch, for example, between a display mode in which the plurality of touch sensor electrodes TX function as the common electrode CE, and a touch detection mode in which the plurality of touch sensor electrodes TX function as the touch sensor electrode TX, by time sharing. The touch drive unit TD, for example, applies a common signal to the touch sensor electrode TX (common electrode CE) through the touch wiring line TL in the display mode. On the other hand, in the touch detection mode, the touch drive unit TD applies a touch drive signal to the touch sensor electrode TX through the touch wiring line TL.

In the illustrated example, the plurality of touch wiring lines TL extend in the column direction (the same direction as that of the source wiring line SWL). Some touch wiring lines TL extend to the corresponding touch sensor electrodes TX, across one or a plurality of other touch sensor electrodes TX.

When attention is paid to a certain touch sensor electrode TX, a first touch wiring line TL1 for supplying a signal to the above-mentioned touch sensor electrode TX extends to the touch wiring line contact portion TC, and a second touch wiring line TL2 for supplying a signal to another touch sensor electrode TX extends across the above-mentioned touch sensor electrode TX. The second touch wiring line TL2 and the touch sensor electrode TX overlap each other with an insulating layer interposed therebetween. Depending on the position of the touch sensor electrode TX, two or more touch wiring lines TL may be disposed to extend across the touch sensor electrode TX, or no touch wiring line TL may be disposed to cross the touch sensor electrode TX.

Although not illustrated, in the non-display region FR, in addition to the touch drive unit TD, a peripheral circuit including drive circuits such as a gate driver that supplies a gate signal to the gate wiring line GWL, and a source driver that supplies a source signal to the source wiring line SWL is provided. These drive circuits may be, for example, mounted on the TFT substrate 10, or formed integrally (monolithically). A semiconductor chip including some or all of the drive circuits may be mounted on the non-display region FR.

By using the liquid crystal display device 100 according to the embodiment of the disclosure, an in-cell type touch screen capable of displaying in the reflection mode may be suitably achieved.

Oxide Semiconductor TFT

An oxide semiconductor TFT may be suitably used as the TFT 11 provided in each pixel P. The oxide semiconductor TFT includes an oxide semiconductor as an active layer material. That is, the oxide semiconductor TFT includes an oxide semiconductor layer as an active layer. In recent years, an oxide semiconductor has attracted attention as an active layer material in place of amorphous silicon and polycrystalline silicon.

The oxide semiconductor has mobility higher than that of amorphous silicon. Thus, the oxide semiconductor TFT can operate at a higher speed than an amorphous silicon TFT. Further, since the oxide semiconductor layer is formed by a process simpler than that for the polycrystalline silicon layer, the oxide semiconductor layer can be applied to a device that requires a large area.

Since the oxide semiconductor TFT has excellent off-leak characteristics, such a driving method can also be used that performs display with a reduced rewriting frequency of an image. For example, when displaying a still image or the like, the oxide semiconductor TFT can be operated in such a manner that the image data is rewritten at a frequency of once per second. Such a driving method is referred to as a pause drive or a low frequency drive and can significantly reduce the power consumption of the liquid crystal display device.

By adopting the pause drive and performing touch detection in a period in which the rewriting of an image is not performed, it is possible to suppress a decrease in sensitivity of the touch operation due to noise from the drive circuit and to increase an S/N ratio (signal-to-noise ratio) by, for example, about 10 times the S/N ratio of the related art.

Since the oxide semiconductor TFT is advantageous in reducing the size of the TFT, a configuration in which a memory circuit is provided for each pixel P (referred to as "memory in pixels (MIP)") can also be suitably achieved. The specific configuration of the MIP is known, and therefore the description thereof is omitted herein.

An oxide semiconductor included in the active layer (oxide semiconductor layer) of the oxide semiconductor TFT may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to the layer surface.

The oxide semiconductor layer may have a layered structure including two or more layers. The oxide semiconductor layer having a layered structure may include an amorphous oxide semiconductor layer and a crystalline oxide semiconductor layer, and may include a plurality of crystalline oxide semiconductor layers having different crystal structures. The oxide semiconductor layer having a layered structure may include a plurality of amorphous oxide semiconductor layers. In a case where the oxide semiconductor layer has a dual-layer structure including an upper layer and a lower layer, an energy gap of the oxide semiconductor included in the lower layer may be different from an energy gap of the oxide semiconductor included in the upper layer.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

The oxide semiconductor layer may include, for example, at least one metal element selected from In, Ga, and Zn. In the present embodiment, the oxide semiconductor layer includes, for example, an In—Ga—Zn—O-based semiconductor (for example, an indium gallium zinc oxide). Here, the In—Ga—Zn—O based semiconductor is a ternary oxide of indium (In), gallium (Ga), and zinc (Zn), and a ratio (composition ratio) of In, Ga, and Zn is not particularly limited. For example, the ratio includes In:Ga:Zn=2:2:1, In:Ga:Zn=1:1:1, In:Ga:Zn=1:1:2, or the like. Such an oxide semiconductor layer 11 can be formed of an oxide semiconductor film including the In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A described above, JP 2012-134475 A, and JP 2014-209727 A. The entire contents of the disclosure of JP 2012-134475 A and JP 2014-209727 A are incorporated herein by reference. A TFT including an In—Ga—Zn—O based semiconductor layer has a high mobility (more than 20 times as compared to an a-Si TFT) and a low leakage current (less than 1/100 as compared to the a-Si TFT). Thus, such a TFT can be suitably used as a drive TFT (for example, a TFT included in a drive circuit provided in a periphery of a display region including a plurality of pixels, and on the same substrate as the display region) and a pixel TFT (TFT provided in a pixel).

In place of the In—Ga—Zn—O based semiconductor, the oxide semiconductor layer may include another oxide semiconductor. For example, the oxide semiconductor layer may include an In—Sn—Zn—O based semiconductor (for example, $In_2O_3$—$SnO_2$—ZnO; InSnZnO). The In—Sn—Zn—O based semiconductor is a ternary oxide of indium (In), tin (Sn), and zinc (Zn). Alternatively, the oxide semiconductor layer 11 may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

Transflective Type

Figure 54:
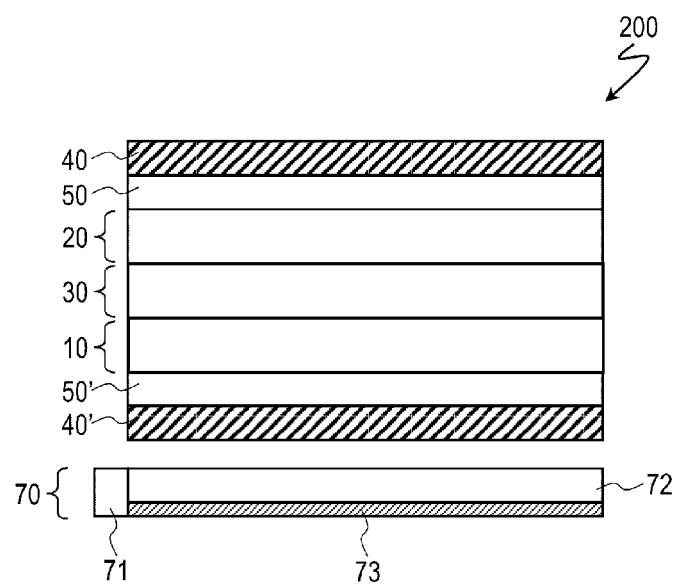
FIG. 54 is a cross-sectional view schematically illustrating another liquid crystal display device 200 according to an embodiment of the disclosure.

The reflective liquid crystal display device 100 has been described thus far as an example. However, the liquid crystal display device according to the embodiment of the disclosure may be transflective. The configuration of a liquid crystal display device 200 of a transflective type will be described with reference to FIG. 54.

The liquid crystal display device 200 is different from the liquid crystal display device 100 illustrated in FIG. 1 and the like in that the liquid crystal display device 200 further includes a polarizer 40', a phase difference layer 50', and an illumination device (backlight) 70.

The polarizer 40' is disposed on the back face side relative to a liquid crystal layer 30. More specifically, the polarizer 40' is disposed on the back face side relative to a TFT substrate 10.

The phase difference layer 50' is disposed between the polarizer 40' and the liquid crystal layer 30. More specifically, the phase difference layer 50' is disposed between the polarizer 40' and the TFT substrate 10. The phase difference layer 50 may include, for example, a λ/2 plate and a λ/4 plate.

The illumination device 70 is disposed on the back face side of the polarizer 40' (the back face side of the TFT substrate 10). In the illustrated example, the illumination device 70 includes a light source (for example, a light emitting diode (LED)) 71 configured to emit light, a light guide plate 72 configured to guide the light from the light source 71 toward the polarizer 40' side, and a reflector 73 disposed at the back face side of the light guide plate 72. The illumination device 70 may further include a prism sheet and a diffuser sheet disposed at the front face side (or back face side) of the light guide plate 72.

Figure 55:
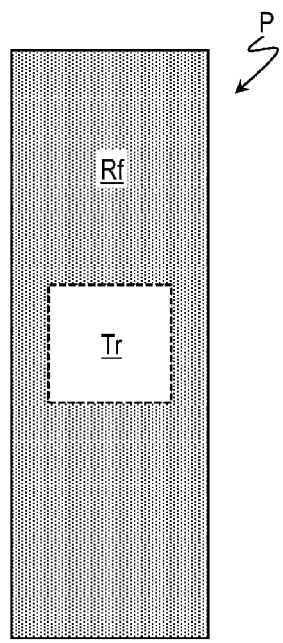
FIG. 55 is a diagram illustrating a reflective region Rf and a transmissive region Tr included in each pixel P of the liquid crystal display device 200.

Each pixel P of the liquid crystal display device 200 includes a reflective region Rf for display in a reflection mode, and a transmissive region Tr for display in a transmission mode, as illustrated in FIG. 55. The reflective layer 13 (see FIG. 3A and FIG. 3B) is disposed in the reflective region Rf. On the other hand, the reflective layer 13 is not disposed in the transmissive region Tr. The area of the transmissive region Tr occupying the pixel P may be appropriately set depending on the application and the like, and is, for example, 20% or more and 90% or less. The position and the shape of the transmissive region Tr within the pixel P may also be appropriately set depending on the application or the like.

In the transflective liquid crystal display device 200 as well, as in the reflective liquid crystal display device 100, display is performed in the transverse electrical field mode in which the liquid crystal layer 30 takes the twist alignment when no voltage is applied, whereby the contrast ratio of the reflective display may be sufficiently improved.

Front Light

Figure 56:
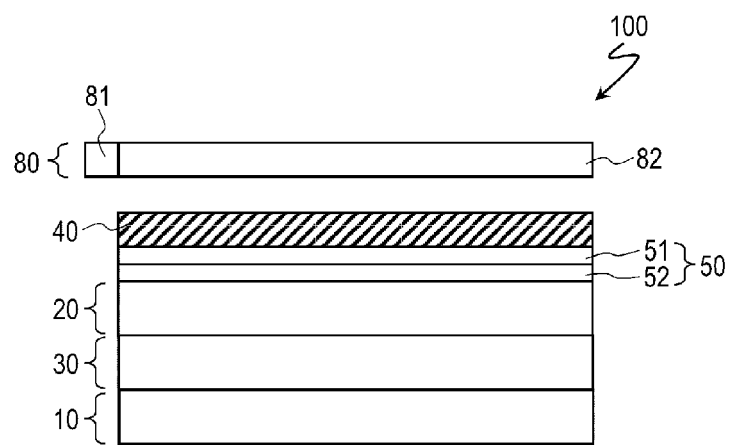
FIG. 56 is a cross-sectional view illustrating a configuration in which the liquid crystal display device 100 includes an illumination device (front light) 80.

As illustrated in FIG. 56, the reflective liquid crystal display device 100 may further include an illumination device (front light) 80 disposed on the viewer side relative to the polarizer 40. In the illustrated example, the illumination device 80 includes a light source (for example, an LED) 81 configured to emit light, and a light guide plate 82 configured to guide the light from the light source 81 toward the polarizer 40 side.

Since the reflective liquid crystal display device 100 includes the above-described illumination device 80, bright reflective display may be performed even in an environment where sufficient ambient light cannot be obtained.

INDUSTRIAL APPLICABILITY

According to the embodiment of the disclosure, it is possible to improve the contrast ratio of a reflective or transflective liquid crystal display device configured to display in the transverse electrical field mode. The liquid crystal display device according to the embodiment of the disclosure may be suitably used for an in-cell type touch screen.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device, comprising:
a first substrate;
a second substrate disposed on a viewer side relative to the first substrate;
a liquid crystal layer provided between the first substrate and the second substrate;
a polarizer disposed on a viewer side relative to the liquid crystal layer;
a phase difference layer disposed between the polarizer and the liquid crystal layer; and
a plurality of pixels arrayed in a matrix shape,
wherein the first substrate includes:
a reflective layer configured to reflect light,
a first electrode and a second electrode capable of generating a transverse electrical field in the liquid crystal layer, and
a first horizontal alignment film in contact with the liquid crystal layer,
the second substrate includes a second horizontal alignment film in contact with the liquid crystal layer,
the liquid crystal layer takes a twist alignment when no voltage is applied,
the liquid crystal layer contains a liquid crystal material of positive-type,
the phase difference layer includes a $\lambda/2$ plate, and
an angle $\theta_3$, formed by a slow axis of the $\lambda/2$ plate with an orientation direction of a liquid crystal molecule defined by the first horizontal alignment film in a twist direction of the liquid crystal layer, is in a range from 132.4° to 143.6°.

2. The liquid crystal display device according to claim 1, wherein a twist angle $\theta_1$ of the liquid crystal layer is in a range from 58.3° to 89.9° when no voltage is applied.

3. The liquid crystal display device according to claim 1, wherein an angle $\theta_2$, formed by a light absorption axis of the polarizer with the orientation direction of the liquid crystal molecule defined by the first horizontal alignment film in the twist direction of the liquid crystal layer, is in a range from 110.8° to 132.3°.

4. The liquid crystal display device according to claim 1, wherein the phase difference layer further includes a $\lambda/4$ plate, and
an angle $\theta_4$, formed by a slow axis of the $\lambda/4$ plate with the orientation direction of the liquid crystal molecule defined by the first horizontal alignment film in the twist direction of the liquid crystal layer, is in a range from 144.5° to 163.0°.

5. The liquid crystal display device according to claim 1, wherein, when a birefringence index of the liquid crystal material is taken as $\Delta n$ and a thickness of the liquid crystal layer is taken as d, $\Delta n \cdot d$, which is a product of the birefringence index $\Delta n$ and the thickness d, is in a range from 152.3 nm to 285.8 nm.

6. The liquid crystal display device according to claim 1, wherein the first substrate further includes:
a substrate,
a backplane circuit provided on the substrate and configured to drive the plurality of pixels,
a first interlayer insulating layer provided to cover the backplane circuit, and
a second interlayer insulating layer provided on the first interlayer insulating layer,
the reflective layer is provided between the first interlayer insulating layer and the second interlayer insulating layer, and
the first electrode and the second electrode are provided between the second interlayer insulating layer and the first horizontal alignment film.

7. The liquid crystal display device according to claim 6, wherein the first substrate further includes a dielectric layer provided between the second interlayer insulating layer and the first horizontal alignment film, one of the first electrode and the second electrode is provided between the second interlayer insulating layer and the dielectric layer, and the other one of the first electrode and the second electrode is provided between the dielectric layer and the first horizontal alignment film.

8. The liquid crystal display device according to claim 1, wherein at least one of the first electrode and the second electrode includes a plurality of belt-shaped portions and at least one slit located between two belt-shaped portions adjacent to each other among the plurality of belt-shaped portions.

9. The liquid crystal display device according to claim 8, wherein each of the plurality of belt-shaped portions includes a first portion extending in a first direction and a second portion extending in a second direction different from the first direction.

10. The liquid crystal display device according to claim 8, wherein the plurality of belt-shaped portions includes at least one first belt-shaped portion extending in a first direction and at least one second belt-shaped portion extending in a second direction different from the first direction.

11. The liquid crystal display device according to claim 1, wherein the liquid crystal display device displays in a normally black mode.

12. The liquid crystal display device according to claim 1, wherein one of the first electrode and the second electrode is a pixel electrode provided in each of the plurality of pixels, the other one of the first electrode and the second electrode is a common electrode including a plurality of segments, each capable of functioning as a touch sensor electrode, and the first substrate further includes a plurality of touch wiring lines, each connected to a corresponding touch sensor electrode.

13. The liquid crystal display device according to claim 1, wherein the first substrate further includes a thin film transistor provided in each of the plurality of pixels and including an oxide semiconductor layer.

14. The liquid crystal display device according to claim 13, wherein the oxide semiconductor layer includes an In—Ga—Zn—O based semiconductor.

15. The liquid crystal display device according to claim 1, further comprising:

an illumination device disposed on a back face side relative to the first substrate or on a viewer side relative to the polarizer.

16. A liquid crystal display device, comprising:
a first substrate;
a second substrate disposed on a viewer side relative to the first substrate;
a liquid crystal layer provided between the first substrate and the second substrate;
a polarizer disposed on a viewer side relative to the liquid crystal layer;
a phase difference layer disposed between the polarizer and the liquid crystal layer; and
a plurality of pixels arrayed in a matrix shape,
wherein the first substrate includes:
a reflective layer configured to reflect light,
a first electrode and a second electrode capable of generating a transverse electrical field in the liquid crystal layer, and a first horizontal alignment film in contact with the liquid crystal layer, the second substrate includes a second horizontal alignment film in contact with the liquid crystal layer, the liquid crystal layer takes a twist alignment when no voltage is applied, the liquid crystal layer contains a liquid crystal material of negative-type, the phase difference layer includes a λ/2 plate, and an angle $θ_3$, formed by a slow axis of the λ/2 plate with an orientation direction of a liquid crystal molecule defined by the first horizontal alignment film in a twist direction of the liquid crystal layer, is in a range from 131.4° to 143.3°.

17. The liquid crystal display device according to claim 16,
wherein a twist angle $θ_1$ of the liquid crystal layer is in a range from 58.5° to 89.6° when no voltage is applied.

18. The liquid crystal display device according to claim 16,
wherein an angle $θ_2$, formed by a light absorption axis of the polarizer with the orientation direction of the liquid crystal molecule defined by the first horizontal alignment film in the twist direction of the liquid crystal layer, is in a range from 111.3° to 133.8°.

19. The liquid crystal display device according to claim 16,
wherein the phase difference layer further includes a λ/4 plate, and
an angle $θ_4$, formed by a slow axis of the λ/4 plate with the orientation direction of the liquid crystal molecule defined by the first horizontal alignment film in the twist direction of the liquid crystal layer, is in a range from 143.1° to 164.1°.

20. The liquid crystal display device according to claim 16,
wherein, when a birefringence index of the liquid crystal material is taken as Δn and a thickness of the liquid crystal layer is taken as d, Δn·d, which is a product of the birefringence index Δn and the thickness d, is in a range from 151.2 nm to 285.1 nm.

21. The liquid crystal display device according to claim 16,
wherein the first substrate further includes:
a substrate,
a backplane circuit provided on the substrate and configured to drive the plurality of pixels,
a first interlayer insulating layer provided to cover the backplane circuit, and
a second interlayer insulating layer provided on the first interlayer insulating layer,
the reflective layer is provided between the first interlayer insulating layer and the second interlayer insulating layer, and
the first electrode and the second electrode are provided between the second interlayer insulating layer and the first horizontal alignment film.

22. The liquid crystal display device according to claim 16,
wherein at least one of the first electrode and the second electrode includes a plurality of belt-shaped portions and at least one slit located between two belt-shaped portions adjacent to each other among the plurality of belt-shaped portions.

23. The liquid crystal display device according to claim 16,
wherein one of the first electrode and the second electrode is a pixel electrode provided in each of the plurality of pixels,
the other one of the first electrode and the second electrode is a common electrode including a plurality of segments, each capable of functioning as a touch sensor electrode, and
the first substrate further includes a plurality of touch wiring lines, each connected to a corresponding touch sensor electrode.

* * * * *